US012568895B2

(12) United States Patent
Olive-Chahinian et al.

(10) Patent No.: US 12,568,895 B2
(45) Date of Patent: ***Mar. 10, 2026

(54) IRRIGATION CONTROL SYSTEMS AND METHODS

(71) Applicant: Rain Bird Corporation, Azusa, CA (US)

(72) Inventors: Ingrid Olive-Chahinian, Cadolive (FR); Myriam Vialleton, Clapiers (FR); Guillaume Barbe, Clapiers (FR)

(73) Assignee: Rain Bird Corporation, Azusa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/581,732

(22) Filed: Feb. 20, 2024

(65) Prior Publication Data

US 2024/0188517 A1 Jun. 13, 2024

Related U.S. Application Data

(63) Continuation of application No. 18/105,528, filed on Feb. 3, 2023, now Pat. No. 11,937,557, which is a (Continued)

(30) Foreign Application Priority Data

Nov. 7, 2012 (EP) .................................... 12306370

(51) Int. Cl.
*A01G 25/16* (2006.01)
(52) U.S. Cl.
CPC ...... *A01G 25/16* (2013.01); *G05B 2219/2625* (2013.01); *Y02A 40/22* (2018.01)
(58) Field of Classification Search
USPC .................................................. 700/284, 17
See application file for complete search history.

(56) References Cited

U.S. PATENT DOCUMENTS 3,114,243 A 12/1963 Winters
3,372,899 A 3/1968 McPherson
(Continued)

FOREIGN PATENT DOCUMENTS

EP 2730159 5/2014
WO 9003724 4/1990
(Continued)

OTHER PUBLICATIONS

U.S. Appl. No. 12/638,932, filed Dec. 15, 2009, Harvey J. Nickerson.
(Continued)

*Primary Examiner* — Emilio J Saavedra
(74) *Attorney, Agent, or Firm* — Fitch, Even, Tabin & Flannery LLP

(57) ABSTRACT

Some embodiments provide irrigation systems comprising: a central irrigation controller; a radio module; a control module; and a radio adaptor in communication with the control module; where the control module comprises: a processor, a first communication interface, and one or more valve drivers, where the control module is configured to implement irrigation commands in implementing at least a portion of irrigation programming such that the one or more valve drivers are each configured to control a different irrigation valve in accordance with the irrigation programming; and the radio adapter comprises: a second communication interface communicationally coupled with the first communication interface, and a wireless radio frequency transceiver configured to provide wireless communication with the radio module where the radio adapter is configured to relay information between the radio module and the control module.

19 Claims, 19 Drawing Sheets

Related U.S. Application Data continuation of application No. 16/405,762, filed on May 7, 2019, now Pat. No. 11,570,956, which is a continuation of application No. 14/073,619, filed on Nov. 6, 2013, now Pat. No. 10,327,397.

(56) References Cited

U.S. PATENT DOCUMENTS

| | | | |
|---|---|---|---|
| 3,599,867 A | 8/1971 | Griswold | |
| 4,176,395 A | 11/1979 | Evelyn-Veere | |
| 4,185,650 A | 1/1980 | Neves | |
| 4,189,776 A | 2/1980 | Kendall | |
| 4,230,989 A | 10/1980 | Buehrle | |
| RE31,023 E | 9/1982 | Hall | |
| 4,545,396 A | 10/1985 | Miller | |
| 4,548,225 A | 10/1985 | Busalacchi | |
| 4,626,984 A | 12/1986 | Unruh | |
| 4,685,920 A | 8/1987 | Fritch | |
| 4,760,547 A | 7/1988 | Duxbury | |
| 4,937,732 A | 6/1990 | Brundisini | |
| 4,962,522 A | 10/1990 | Marian | |
| 4,985,638 A | 1/1991 | Brock | |
| 5,097,861 A | 3/1992 | Hopkins | |
| 5,173,855 A | 12/1992 | Nielsen | |
| 5,208,855 A | 5/1993 | Marian | |
| 5,251,153 A | 10/1993 | Nielsen | |
| 5,333,785 A | 8/1994 | Dodds | |
| 5,400,246 A | 3/1995 | Wilson | |
| 5,427,350 A | 6/1995 | Rinkewich | |
| 5,444,611 A | 8/1995 | Woytowitz | |
| 5,465,904 A | 11/1995 | Vaello | |
| 5,479,338 A | 12/1995 | Ericksen | |
| 5,479,339 A | 12/1995 | Miller | |
| 5,651,500 A | 7/1997 | Patterson | |
| 5,696,671 A | 12/1997 | Oliver | |
| 5,740,031 A | 4/1998 | Gagnon | |
| 5,740,038 A | 4/1998 | Hergert | |
| 5,748,466 A | 5/1998 | McGivern | |
| 5,760,706 A | 6/1998 | Kiss | |
| 5,805,442 A | 9/1998 | Crater | |
| 5,813,606 A | 9/1998 | Ziff | |
| 5,826,619 A * | 10/1998 | Roman | A01G 25/16 |
| | | | 239/69 |
| 5,828,807 A | 10/1998 | Tucker | |
| 5,860,715 A | 1/1999 | Lohde | |
| 5,870,302 A | 2/1999 | Oliver | |
| 5,884,224 A | 3/1999 | McNabb | |
| 5,914,847 A | 6/1999 | Alexanian | |
| 5,921,280 A | 7/1999 | Ericksen | |
| 5,999,908 A | 12/1999 | Abelow | |
| 6,019,290 A | 2/2000 | Grott | |
| 6,061,603 A | 5/2000 | Papadopoulos | |
| 6,088,621 A | 7/2000 | Woytowitz | |
| 6,098,898 A | 8/2000 | Storch | |
| 6,102,061 A | 8/2000 | Addink | |
| 6,108,590 A | 8/2000 | Hergert | |
| 6,123,093 A | 9/2000 | D'Antonio | |
| 6,145,755 A | 11/2000 | Feltz | |
| 6,173,727 B1 | 1/2001 | Davey | |
| 6,218,953 B1 | 4/2001 | Petite | |
| 6,227,220 B1 | 5/2001 | Addink | |
| 6,236,332 B1 | 5/2001 | Conkright | |
| 6,240,336 B1 * | 5/2001 | Brundisini | G05B 19/0426 |
| | | | 700/282 |
| 6,267,298 B1 | 7/2001 | Campbell | |
| 6,283,139 B1 | 9/2001 | Symonds | |
| 6,298,285 B1 | 10/2001 | Addink | |
| 6,314,340 B1 | 11/2001 | Mecham | |
| 6,337,971 B1 | 1/2002 | Abts | |
| 6,437,692 B1 | 8/2002 | Petite | |
| 6,452,499 B1 | 9/2002 | Runge | |
| 6,453,215 B1 | 9/2002 | Lavoie | |
| 6,491,062 B1 | 12/2002 | Croft | |
| 6,507,775 B1 | 1/2003 | Simon | |
| 6,518,980 B1 | 2/2003 | DeMotte | |
| 6,529,589 B1 | 3/2003 | Nelson | |
| 6,553,336 B1 | 4/2003 | Johnson | |
| 6,600,971 B1 * | 7/2003 | Smith | G05B 19/0421 |
| | | | 700/20 |
| 6,708,084 B2 | 3/2004 | Battistutto | |
| 6,721,630 B1 | 4/2004 | Woytowitz | |
| 6,763,287 B2 | 7/2004 | Brundisini | |
| 6,782,310 B2 | 8/2004 | Bailey | |
| 6,782,311 B2 | 8/2004 | Barlow | |
| 6,823,239 B2 | 11/2004 | Sieminski | |
| 6,834,662 B1 | 12/2004 | Olson | |
| 6,850,819 B1 | 2/2005 | Townsend | |
| 6,853,883 B2 | 2/2005 | Kreikemeier | |
| 6,891,838 B1 | 5/2005 | Petite | |
| 6,892,113 B1 | 5/2005 | Addink | |
| 6,895,987 B2 | 5/2005 | Addink | |
| 6,898,467 B1 | 5/2005 | Smith | |
| 6,950,728 B1 | 9/2005 | Addink | |
| 6,963,808 B1 | 11/2005 | Addink | |
| 6,977,351 B1 | 12/2005 | Woytowitz | |
| 6,990,335 B1 | 1/2006 | Shamoon | |
| 6,997,642 B2 | 2/2006 | Bishop | |
| 7,003,357 B1 | 2/2006 | Kreikemeier | |
| 7,010,394 B1 | 3/2006 | Runge | |
| 7,010,395 B1 | 3/2006 | Goldberg | |
| 7,010,396 B2 | 3/2006 | Ware | |
| 7,048,204 B1 | 5/2006 | Addink | |
| 7,050,887 B2 | 5/2006 | Alvarez | |
| 7,053,767 B2 | 5/2006 | Petite | |
| 7,058,478 B2 | 6/2006 | Alexanian | |
| 7,058,479 B2 | 6/2006 | Miller | |
| 7,103,511 B2 | 9/2006 | Petite | |
| 7,123,993 B1 | 10/2006 | Freeman | |
| 7,133,749 B2 | 11/2006 | Goldberg | |
| 7,146,254 B1 | 12/2006 | Howard | |
| 7,181,319 B1 | 2/2007 | Woytowtiz | |
| 7,182,272 B1 | 2/2007 | Marian | |
| 7,203,576 B1 | 4/2007 | Wilson | |
| 7,216,020 B2 | 5/2007 | Marian | |
| 7,216,659 B2 | 5/2007 | Caamano | |
| 7,225,057 B2 | 5/2007 | Froman | |
| 7,245,991 B1 | 7/2007 | Woytowitz | |
| 7,248,945 B2 | 7/2007 | Woytowitz | |
| 7,250,860 B2 | 7/2007 | Smith | |
| 7,257,397 B2 | 8/2007 | Shamoon | |
| 7,264,177 B2 | 9/2007 | Buck | |
| 7,266,428 B2 | 9/2007 | Alexanian | |
| 7,269,829 B2 | 9/2007 | Smith | |
| 7,272,456 B2 | 9/2007 | Farchmin | |
| 7,280,892 B2 | 10/2007 | Van Bavel | |
| 7,286,904 B2 | 10/2007 | Graham | |
| 7,305,280 B2 | 12/2007 | Marian | |
| 7,315,764 B1 | 1/2008 | Sutardja | |
| 7,317,972 B2 | 1/2008 | Addink | |
| 7,328,089 B2 | 2/2008 | Curren | |
| 7,330,796 B2 | 2/2008 | Addink | |
| 7,337,042 B2 | 2/2008 | Marian | |
| 7,359,769 B2 | 4/2008 | Bailey | |
| 7,363,113 B2 | 4/2008 | Runge | |
| 7,383,721 B2 | 6/2008 | Parsons | |
| 7,398,139 B1 | 7/2008 | Woytowitz | |
| 7,400,944 B2 | 7/2008 | Bailey | |
| 7,403,840 B2 | 7/2008 | Moore | |
| 7,406,363 B2 | 7/2008 | Doering | |
| 7,412,303 B1 | 8/2008 | Porter | |
| 7,424,291 B1 | 9/2008 | Lunsford | |
| 7,444,207 B2 | 10/2008 | Nickerson | |
| 7,457,676 B1 | 11/2008 | Sutardja | |
| 7,468,661 B2 | 12/2008 | Petite | |
| 7,469,707 B2 | 12/2008 | Anderson | |
| 7,532,954 B2 | 5/2009 | Evelyn-Veere | |
| 7,546,172 B1 | 6/2009 | Sutardja | |
| 7,558,650 B2 | 7/2009 | Thornton | |
| 7,574,285 B2 | 8/2009 | Kah | |
| 7,584,023 B1 | 9/2009 | Palmer | |
| 7,584,053 B2 | 9/2009 | Abts | |
| 7,590,471 B2 | 9/2009 | Jacobsen | |
| 7,596,429 B2 | 9/2009 | Cardinal | |
| 7,613,546 B2 | 11/2009 | Nelson | |

(56)  References Cited

U.S. PATENT DOCUMENTS

| | | | |
|---|---|---|---|
| 7,620,565 | B2 | 11/2009 | Abelow |
| 7,640,079 | B2 | 12/2009 | Nickerson |
| D607,847 | S | 1/2010 | Elliott |
| 7,643,823 | B2 | 1/2010 | Shamoon |
| 7,650,425 | B2 | 1/2010 | Davis |
| 7,693,582 | B2 | 4/2010 | Bergman |
| 7,701,691 | B2 | 4/2010 | Brundisini |
| 7,711,454 | B2 | 5/2010 | Addink |
| 7,756,086 | B2 | 7/2010 | Petite |
| 7,761,189 | B2 | 7/2010 | Froman |
| 7,778,736 | B2 | 8/2010 | Sutardja |
| 7,792,612 | B2 | 9/2010 | Kah |
| 7,809,475 | B2 | 10/2010 | Kaprielian |
| 7,822,511 | B2 | 10/2010 | Ivans |
| 7,831,321 | B2 | 11/2010 | Ebrom |
| 7,844,367 | B2 | 11/2010 | Nickerson |
| 7,844,368 | B2 | 11/2010 | Alexanian |
| 7,844,369 | B2 | 11/2010 | Nickerson |
| 7,853,363 | B1 | 12/2010 | Porter |
| 7,877,168 | B1 | 1/2011 | Porter |
| 7,883,027 | B2 | 2/2011 | Fekete |
| 7,883,029 | B2 | 2/2011 | Chalemin |
| 7,899,580 | B2 | 3/2011 | Cardinal |
| 7,912,588 | B2 | 3/2011 | Runge |
| 7,913,653 | B2 | 3/2011 | Jordan |
| 7,916,458 | B2 | 3/2011 | Nelson |
| 7,917,249 | B2 | 3/2011 | Jacobsen |
| 7,930,069 | B2 | 4/2011 | Savelle |
| 7,930,070 | B2 | 4/2011 | Imes |
| 7,937,187 | B2 | 5/2011 | Kaprielian |
| 7,953,517 | B1 | 5/2011 | Porter |
| 7,962,244 | B2 | 6/2011 | Alexanian |
| 7,962,245 | B2 | 6/2011 | Runge |
| 7,966,153 | B2 | 6/2011 | Bangalore |
| 7,978,059 | B2 | 7/2011 | Petite |
| 7,987,446 | B2 | 7/2011 | Cypher |
| 7,996,115 | B2 | 8/2011 | Nickerson |
| 7,996,192 | B2 | 8/2011 | Repelli |
| 8,010,238 | B2 | 8/2011 | Ensworth |
| 8,013,732 | B2 | 9/2011 | Petite |
| 8,014,904 | B1 | 9/2011 | Woytowitz |
| 8,019,328 | B2 | 9/2011 | Lunsford |
| 8,019,482 | B2 | 9/2011 | Sutardja |
| 8,024,073 | B2 | 9/2011 | Imes |
| 8,024,074 | B2 | 9/2011 | Stelford |
| 8,024,075 | B2 | 9/2011 | Fekete |
| 8,055,389 | B2 | 11/2011 | Holindrake |
| 8,061,080 | B2 | 11/2011 | Loebl |
| 8,064,412 | B2 | 11/2011 | Petite |
| 8,082,065 | B2 | 12/2011 | Imes |
| 8,099,195 | B2 | 1/2012 | Imes |
| 8,104,993 | B2 | 1/2012 | Hitt |
| 8,108,076 | B2 | 1/2012 | Imes |
| 8,108,077 | B2 | 1/2012 | Smith |
| 8,136,484 | B2 | 3/2012 | Jordan |
| 8,145,359 | B2 | 3/2012 | Addink |
| 8,150,554 | B2 | 4/2012 | Anderson |
| 8,158,248 | B2 | 4/2012 | Hara |
| 8,160,750 | B2 | 4/2012 | Weiler |
| 8,174,381 | B2 | 5/2012 | Imes |
| 8,191,307 | B2 | 6/2012 | Donoghue |
| 8,193,930 | B2 | 6/2012 | Petite |
| 8,209,061 | B2 | 6/2012 | Palmer |
| 8,215,570 | B2 | 7/2012 | Hitt |
| 8,217,781 | B2 | 7/2012 | Ebrom |
| 8,219,935 | B2 | 7/2012 | Hunts |
| 8,224,493 | B2 | 7/2012 | Walker |
| 8,225,810 | B2 | 7/2012 | Blanchard |
| 8,234,014 | B1 | 7/2012 | Ingle |
| 8,244,404 | B2 | 8/2012 | Nickerson |
| 8,250,163 | B2 | 8/2012 | Castaldo |
| 8,265,797 | B2 | 9/2012 | Nickerson |
| 8,265,798 | B2 | 9/2012 | Imes |
| 8,271,144 | B2 | 9/2012 | Kah |
| 8,275,309 | B2 | 9/2012 | Woytowitz |
| 8,285,460 | B2 | 10/2012 | Hoffman |
| 8,301,309 | B1 | 10/2012 | Woytoxitz |
| 8,302,881 | B1 | 11/2012 | Campbell |
| 8,302,882 | B2 | 11/2012 | Nelson |
| 8,311,765 | B2 | 11/2012 | Nielsen |
| 8,321,365 | B2 | 11/2012 | Anderson |
| 8,322,072 | B2 | 12/2012 | Anderson |
| 8,326,440 | B2 | 12/2012 | Christfort |
| 8,335,304 | B2 | 12/2012 | Petite |
| 8,340,828 | B2 | 12/2012 | Danieli |
| 8,341,023 | B2 | 12/2012 | Benisti |
| 8,359,142 | B2 | 1/2013 | Hoffman |
| 8,369,996 | B2 | 2/2013 | Choat |
| 8,374,930 | B2 | 2/2013 | Benisti |
| 8,379,564 | B2 | 2/2013 | Petite |
| 8,392,561 | B1 | 3/2013 | Dyer |
| 8,396,602 | B2 | 3/2013 | Imes |
| 8,396,604 | B2 | 3/2013 | Imes |
| 8,401,705 | B2 | 3/2013 | Alexanian |
| 8,412,382 | B2 | 4/2013 | Imes |
| 8,423,437 | B2 | 4/2013 | Benisti |
| 8,428,782 | B2 | 4/2013 | Imes |
| 8,442,695 | B2 | 5/2013 | Imes |
| 8,446,884 | B2 | 5/2013 | Petite |
| 8,452,457 | B2 | 5/2013 | Matsuoka |
| 8,457,797 | B2 | 6/2013 | Imes |
| 8,473,109 | B1 | 6/2013 | Imes |
| 8,477,021 | B2 | 7/2013 | Slack |
| 8,498,572 | B1 | 7/2013 | Schooley |
| 8,498,749 | B2 | 7/2013 | Imes |
| 8,504,180 | B2 | 8/2013 | Imes |
| 8,504,183 | B2 | 8/2013 | Mckinley |
| 8,509,683 | B2 | 8/2013 | Woytowitz |
| 8,509,954 | B2 | 8/2013 | Imes |
| 8,538,592 | B2 | 9/2013 | Alexanian |
| 8,548,632 | B1 | 10/2013 | Porter |
| 8,554,380 | B2 | 10/2013 | Nourian |
| 8,565,904 | B2 | 10/2013 | Kantor |
| 8,571,518 | B2 | 10/2013 | Imes |
| 8,573,049 | B1 | 11/2013 | Ware |
| 8,583,263 | B2 | 11/2013 | Hoffberg |
| 8,588,990 | B2 | 11/2013 | Caceres |
| 8,600,564 | B2 | 12/2013 | Imes |
| 8,600,569 | B2 | 12/2013 | Woytowitz |
| 8,606,415 | B1 | 12/2013 | Woytowitz |
| 8,620,480 | B2 | 12/2013 | Alexanian |
| 8,620,481 | B2 | 12/2013 | Holindrake |
| 8,626,344 | B2 | 1/2014 | Imes |
| 8,636,122 | B2 | 1/2014 | Smith |
| 8,649,907 | B2 | 2/2014 | Ersavas |
| 8,650,069 | B2 | 2/2014 | Mason, Sr. |
| 8,659,183 | B2 | 2/2014 | Crist |
| 8,660,705 | B2 | 2/2014 | Woytowitz |
| 8,680,983 | B2 | 3/2014 | Ebrom |
| 8,700,222 | B1 | 4/2014 | Woytowitz |
| 8,706,913 | B2 | 4/2014 | Doherty |
| 8,712,592 | B2 | 4/2014 | Carlson |
| 8,738,189 | B2 | 5/2014 | Alexanian |
| 8,750,796 | B2 | 6/2014 | Claus |
| 8,751,052 | B1 | 6/2014 | Campbell |
| 8,793,024 | B1 | 7/2014 | Woytowitz |
| 8,812,007 | B2 | 8/2014 | Hitt |
| 8,819,432 | B2 | 8/2014 | Bergsten |
| 8,838,021 | B2 | 9/2014 | Woytowitz |
| 8,839,135 | B2 | 9/2014 | Vander Griend |
| 8,843,241 | B2 | 9/2014 | Saberi |
| 8,855,794 | B2 | 10/2014 | Imes |
| 8,855,830 | B2 | 10/2014 | Imes |
| 8,862,275 | B2 | 10/2014 | Runge |
| 8,862,277 | B1 | 10/2014 | Campbell |
| 8,874,275 | B2 | 10/2014 | Alexanian |
| 8,885,048 | B2 | 11/2014 | Liu |
| 8,924,032 | B2 | 12/2014 | Woytowitz |
| 8,924,587 | B2 | 12/2014 | Petite |
| 8,924,891 | B2 | 12/2014 | Hunts |
| 8,930,032 | B2 | 1/2015 | Shupe |
| 8,942,835 | B2 | 1/2015 | Gerdes |
| 8,948,921 | B2 | 2/2015 | Halahan |
| 8,964,708 | B2 | 2/2015 | Petite |

(56)     References Cited

U.S. PATENT DOCUMENTS

| | | | |
|---|---|---|---|
| 8,977,400 | B1 | 3/2015 | Porter |
| 8,981,946 | B2 | 3/2015 | Runge |
| 9,007,050 | B2 | 4/2015 | Hill |
| 9,032,998 | B2 | 5/2015 | O'Brien |
| 9,043,036 | B2 | 5/2015 | Fekete |
| 9,049,821 | B1 | 6/2015 | Hanna |
| 9,069,071 | B1 | 6/2015 | Schlautman |
| 9,079,748 | B2 | 7/2015 | Tracey |
| 9,081,376 | B2 | 7/2015 | Woytowitz |
| 9,095,102 | B2 | 8/2015 | Masters |
| 9,121,623 | B2 | 9/2015 | Filson |
| 9,128,494 | B2 | 9/2015 | Viera |
| 9,149,013 | B2 | 10/2015 | Andrews |
| 9,158,292 | B2 | 10/2015 | Quail |
| 9,164,177 | B1 | 10/2015 | Schlautman |
| 9,164,524 | B2 | 10/2015 | Imes |
| 9,192,110 | B2 | 11/2015 | Standerfer |
| 9,200,985 | B2 | 12/2015 | Rice |
| 9,209,652 | B2 | 12/2015 | Imes |
| 9,258,952 | B2 | 2/2016 | Walker |
| 9,270,645 | B2 | 2/2016 | Dyer |
| 9,280,885 | B2 | 3/2016 | Frederick |
| 9,295,170 | B1 | 3/2016 | Woytowitz |
| 9,296,004 | B1 | 3/2016 | Clark |
| 9,297,150 | B2 | 3/2016 | Klicpera |
| 9,297,839 | B2 | 3/2016 | Romney |
| 9,301,460 | B2 | 4/2016 | Runge |
| 9,301,461 | B2 | 4/2016 | Woytowitz |
| 9,307,620 | B2 | 4/2016 | Woytowitz |
| 9,307,706 | B2 | 4/2016 | Larsen |
| 9,319,234 | B2 | 4/2016 | Davis |
| 9,324,067 | B2 | 4/2016 | Van Os |
| 9,326,462 | B2 | 5/2016 | Runge |
| 9,356,226 | B2 | 5/2016 | Pargas |
| 9,360,874 | B2 | 6/2016 | Imes |
| 9,380,750 | B2 | 7/2016 | Wang |
| 9,405,310 | B2 | 8/2016 | Imes |
| 9,408,353 | B2 | 8/2016 | Neesen |
| 9,414,552 | B2 | 8/2016 | Halahan |
| 9,418,530 | B2 | 8/2016 | Rapaport |
| 9,425,978 | B2 | 8/2016 | Frei |
| 9,442,474 | B2 | 9/2016 | Madonna |
| 9,465,377 | B2 | 10/2016 | Davis |
| 9,468,162 | B2 | 10/2016 | Weiler |
| 9,478,119 | B1 | 10/2016 | Rapaport |
| 9,494,480 | B2 | 11/2016 | Klicpera |
| 9,520,250 | B2 | 12/2016 | O'Keeffe |
| 9,538,713 | B2 | 1/2017 | Pearson |
| 9,555,432 | B2 | 1/2017 | Mclain |
| 9,565,810 | B2 | 2/2017 | Eng |
| 9,579,790 | B2 | 2/2017 | Laurent |
| 9,590,427 | B2 | 3/2017 | Davis |
| 9,594,366 | B2 | 3/2017 | Klein |
| 9,618,137 | B2 | 4/2017 | Ferrer Herrera |
| 9,678,485 | B2 | 6/2017 | Malaugh |
| 9,699,974 | B2 | 7/2017 | Clark |
| 9,703,275 | B2 | 7/2017 | Ersavas |
| 9,717,191 | B2 | 8/2017 | Endrizzi |
| 9,740,177 | B2 | 8/2017 | Feng |
| 9,747,538 | B2 | 8/2017 | Gudan |
| 9,749,792 | B2 | 8/2017 | Klicpera |
| 9,756,797 | B2 | 9/2017 | Sarver |
| 9,762,406 | B2 | 9/2017 | Davis |
| 9,763,396 | B2 | 9/2017 | Endrizzi |
| 9,817,380 | B2 | 11/2017 | Bangalore |
| 9,829,869 | B2 | 11/2017 | Ersavas |
| 9,829,871 | B1 | 11/2017 | Goodman |
| 9,883,641 | B2 | 2/2018 | Thomas |
| 9,886,016 | B2 | 2/2018 | Bermudez Rodriguez |
| 9,912,732 | B2 | 3/2018 | Romney |
| 9,922,580 | B2 | 3/2018 | Mathews |
| 9,924,644 | B2 | 3/2018 | Endrizzi |
| 9,928,724 | B2 | 3/2018 | Alcorn |
| 9,943,047 | B2 | 4/2018 | Carlson |
| 9,986,696 | B2 | 6/2018 | Halahan |
| 10,028,425 | B2 | 7/2018 | Canyon |
| 10,028,454 | B2 | 7/2018 | Williams |
| 10,029,265 | B2 | 7/2018 | Bell |
| 10,073,428 | B2 | 9/2018 | Bruhn |
| 10,104,836 | B2 | 10/2018 | Jamison |
| 10,123,493 | B2 | 11/2018 | Runge |
| 10,136,286 | B2 | 11/2018 | Namgoong |
| 10,178,016 | B1 | 1/2019 | Hall |
| 10,188,050 | B2 | 1/2019 | Walker |
| 10,194,598 | B2 | 2/2019 | Bauman |
| 10,228,711 | B2 | 3/2019 | Woytowitz |
| 10,241,488 | B2 | 3/2019 | Bermudez Rodriguez |
| 10,251,348 | B2 | 4/2019 | Bermudez Rodriguez |
| 10,254,728 | B2 | 4/2019 | Hill |
| 10,274,969 | B2 | 4/2019 | Klein |
| 10,292,343 | B2 | 5/2019 | Weiler |
| 10,327,397 | B2 | 6/2019 | Olive-Chahinian |
| 10,609,878 | B2 | 4/2020 | Montgomery |
| 10,918,030 | B2 | 2/2021 | Woytowitz |
| 11,109,546 | B2 | 9/2021 | Weiler |
| 11,178,829 | B2 | 11/2021 | Cline |
| 11,229,168 | B2 | 1/2022 | Woytowitz |
| 11,277,714 | B2 | 3/2022 | Griggs |
| 11,281,240 | B1 | 3/2022 | Eyring |
| 11,395,416 | B2 | 7/2022 | Paul |
| 11,502,492 | B2 | 11/2022 | Paul |
| 11,570,956 | B2 | 2/2023 | Olive-Chahinian |
| 11,744,195 | B2 | 9/2023 | Weiler |
| 11,838,824 | B2 | 12/2023 | Klein |
| 11,937,557 | B2 | 3/2024 | Olive-Chahinian |
| 2002/0002425 | A1 | 1/2002 | Dossey |
| 2002/0010516 | A1 | 1/2002 | Addink |
| 2002/0019725 | A1 | 2/2002 | Petite |
| 2002/0130834 | A1 | 9/2002 | Madarasz |
| 2003/0067889 | A1 | 4/2003 | Petite |
| 2003/0093159 | A1* | 5/2003 | Sieminski ............ A01G 25/167 |
| | | | 700/12 |
| 2003/0109964 | A1 | 6/2003 | Addink |
| 2003/0120393 | A1 | 6/2003 | Bailey |
| 2003/0135286 | A1 | 7/2003 | Brundisini |
| 2003/0179102 | A1 | 9/2003 | Barnes |
| 2003/0182022 | A1 | 9/2003 | Addink |
| 2004/0003060 | A1 | 1/2004 | Asoh |
| 2004/0013468 | A1 | 1/2004 | Kadner |
| 2004/0015270 | A1 | 1/2004 | Addink |
| 2004/0089164 | A1 | 5/2004 | Addink |
| 2004/0100394 | A1 | 5/2004 | Hitt |
| 2004/0181315 | A1 | 9/2004 | Cardinal |
| 2004/0217847 | A1 | 11/2004 | Fries |
| 2005/0038569 | A1 | 2/2005 | Howard |
| 2005/0044372 | A1 | 2/2005 | Aull |
| 2005/0090936 | A1 | 4/2005 | Hitt |
| 2005/0137752 | A1 | 6/2005 | Alvarez |
| 2005/0187665 | A1 | 8/2005 | Fu |
| 2005/0216129 | A1 | 9/2005 | Clark |
| 2005/0216130 | A1 | 9/2005 | Clark |
| 2005/0220050 | A1 | 10/2005 | Uchida |
| 2005/0223379 | A1 | 10/2005 | Rehg |
| 2006/0027677 | A1 | 2/2006 | Abts |
| 2006/0043208 | A1 | 3/2006 | Graham |
| 2006/0116791 | A1 | 6/2006 | Ravula |
| 2006/0122735 | A1 | 6/2006 | Goldberg |
| 2006/0161309 | A1 | 7/2006 | Moore |
| 2006/0259199 | A1 | 11/2006 | Gjerde |
| 2007/0016334 | A1 | 1/2007 | Smith |
| 2007/0043454 | A1 | 2/2007 | Sonnenberg |
| 2007/0179674 | A1 | 8/2007 | Ensworth |
| 2007/0191991 | A1 | 8/2007 | Addink |
| 2007/0268121 | A1 | 11/2007 | Vasefi |
| 2007/0282486 | A1 | 12/2007 | Walker |
| 2007/0289635 | A1 | 12/2007 | Ghazarian |
| 2008/0027587 | A1 | 1/2008 | Nickerson |
| 2008/0037485 | A1 | 2/2008 | Osinga |
| 2008/0039978 | A1 | 2/2008 | Graham |
| 2008/0058964 | A1 | 3/2008 | Nickerson |
| 2008/0058995 | A1 | 3/2008 | Holindrake |
| 2008/0119948 | A1 | 5/2008 | O'Connor |
| 2008/0125917 | A1 | 5/2008 | Walker |
| 2008/0125918 | A1 | 5/2008 | Curren |

(56)                 References Cited

U.S. PATENT DOCUMENTS

| | | |
|---|---|---|
| 2008/0140262 A1 | 6/2008 | Williams |
| 2008/0147205 A1 | 6/2008 | Ollis |
| 2008/0157995 A1 | 7/2008 | Crist |
| 2008/0234870 A1 | 9/2008 | Chalemin |
| 2008/0251602 A1 | 10/2008 | Leggett |
| 2008/0275595 A1 | 11/2008 | Bailey |
| 2008/0287062 A1 | 11/2008 | Claus |
| 2009/0076659 A1 | 3/2009 | Ensworth |
| 2009/0076660 A1 | 3/2009 | Goldberg |
| 2009/0099701 A1* | 4/2009 | Li .......................... A01G 25/16 |
| | | 700/284 |
| 2009/0145974 A1 | 6/2009 | Fekete |
| 2009/0150000 A1 | 6/2009 | Stelford |
| 2009/0150001 A1 | 6/2009 | Fekete |
| 2009/0150002 A1 | 6/2009 | Fekete |
| 2009/0204265 A1* | 8/2009 | Hackett .................. H04L 67/12 |
| | | 370/328 |
| 2009/0216345 A1 | 8/2009 | Christfort |
| 2009/0222141 A1 | 9/2009 | Ensworth |
| 2009/0271045 A1 | 10/2009 | Savelle |
| 2009/0276102 A1 | 11/2009 | Smith |
| 2009/0281672 A1 | 11/2009 | Pourzia |
| 2009/0292401 A1 | 11/2009 | Kah |
| 2009/0316671 A1 | 12/2009 | Rolf |
| 2009/0326723 A1 | 12/2009 | Moore |
| 2010/0023173 A1 | 1/2010 | Wu |
| 2010/0030389 A1 | 2/2010 | Palmer |
| 2010/0030476 A1 | 2/2010 | Woytowitz |
| 2010/0032493 A1 | 2/2010 | Abts |
| 2010/0032495 A1 | 2/2010 | Abts |
| 2010/0038440 A1 | 2/2010 | Ersavas |
| 2010/0062757 A1 | 3/2010 | Reina |
| 2010/0070097 A1 | 3/2010 | Morgenstern |
| 2010/0094472 A1 | 4/2010 | Woytowitz |
| 2010/0100247 A1 | 4/2010 | Nickerson |
| 2010/0129154 A1 | 5/2010 | Cox |
| 2010/0130188 A1 | 5/2010 | Brundisini |
| 2010/0145531 A1 | 6/2010 | Nickerson |
| 2010/0146491 A1 | 6/2010 | Hirano |
| 2010/0152909 A1 | 6/2010 | Hitt |
| 2010/0179701 A1 | 7/2010 | Gilbert |
| 2010/0194582 A1 | 8/2010 | Petite |
| 2010/0198418 A1 | 8/2010 | Williams |
| 2010/0200674 A1 | 8/2010 | Everett |
| 2010/0222932 A1 | 9/2010 | O'Connor |
| 2010/0241279 A1 | 9/2010 | Samon I Castella |
| 2010/0256827 A1 | 10/2010 | Bragg |
| 2010/0265909 A1 | 10/2010 | Petite |
| 2010/0268391 A1 | 10/2010 | Anderson |
| 2010/0274398 A1 | 10/2010 | Choat |
| 2010/0286833 A1 | 11/2010 | Kaprielian |
| 2010/0305764 A1 | 12/2010 | Carr |
| 2010/0305765 A1 | 12/2010 | Sutardja |
| 2010/0306012 A1 | 12/2010 | Zyskowski |
| 2010/0312881 A1 | 12/2010 | Davis |
| 2010/0324744 A1 | 12/2010 | Cox |
| 2010/0325569 A1 | 12/2010 | King |
| 2011/0015802 A1 | 1/2011 | Imes |
| 2011/0017845 A1 | 1/2011 | Crist |
| 2011/0022974 A1* | 1/2011 | Kinoshita ......... H04M 1/72469 |
| | | 715/764 |
| 2011/0035059 A1 | 2/2011 | Ersavas |
| 2011/0035064 A1 | 2/2011 | Kah |
| 2011/0040415 A1 | 2/2011 | Nickerson |
| 2011/0040416 A1 | 2/2011 | Nickerson |
| 2011/0045761 A1 | 2/2011 | Rolf |
| 2011/0046792 A1 | 2/2011 | Imes |
| 2011/0046798 A1 | 2/2011 | Imes |
| 2011/0046799 A1 | 2/2011 | Imes |
| 2011/0046800 A1 | 2/2011 | Imes |
| 2011/0049260 A1 | 3/2011 | Palmer |
| 2011/0093123 A1 | 4/2011 | Alexanian |
| 2011/0097534 A1 | 4/2011 | Lee |
| 2011/0098351 A1 | 4/2011 | Mioskoski |
| 2011/0106320 A1 | 5/2011 | Hall |
| 2011/0111700 A1* | 5/2011 | Hackett ................. H04W 72/23 |
| | | 455/41.2 |
| 2011/0118857 A1 | 5/2011 | Bodnar |
| 2011/0137472 A1 | 6/2011 | Hitt |
| 2011/0137827 A1 | 6/2011 | Mason |
| 2011/0166715 A1 | 7/2011 | Hoffman |
| 2011/0170239 A1 | 7/2011 | Nelson |
| 2011/0190947 A1 | 8/2011 | Savelle |
| 2011/0190948 A1 | 8/2011 | Fekete |
| 2011/0196541 A1 | 8/2011 | Bauman |
| 2011/0202185 A1 | 8/2011 | Imes |
| 2011/0210049 A1 | 9/2011 | O'regan, Jr. |
| 2011/0214060 A1 | 9/2011 | Imes |
| 2011/0224838 A1 | 9/2011 | Imes |
| 2011/0238228 A1 | 9/2011 | Woytowitz |
| 2011/0238229 A1 | 9/2011 | Woytowitz |
| 2011/0246898 A1 | 10/2011 | Imes |
| 2011/0270448 A1 | 11/2011 | Kantor |
| 2011/0270449 A1 | 11/2011 | Nickerson |
| 2011/0288690 A1 | 11/2011 | Ensworth |
| 2011/0301767 A1* | 12/2011 | Alexanian .............. A01G 25/16 |
| | | 700/284 |
| 2011/0307101 A1 | 12/2011 | Imes |
| 2011/0310929 A1 | 12/2011 | Petite |
| 2011/0320050 A1 | 12/2011 | Petite |
| 2012/0023225 A1 | 1/2012 | Imes |
| 2012/0029709 A1 | 2/2012 | Safreno |
| 2012/0035898 A1 | 2/2012 | Repelli |
| 2012/0037725 A1 | 2/2012 | Verfuerth |
| 2012/0041606 A1 | 2/2012 | Standerfer |
| 2012/0046859 A1 | 2/2012 | Imes |
| 2012/0064923 A1 | 3/2012 | Imes |
| 2012/0072033 A1 | 3/2012 | Imes |
| 2012/0072036 A1 | 3/2012 | Piper |
| 2012/0072037 A1 | 3/2012 | Alexanian |
| 2012/0078425 A1 | 3/2012 | Gardenswartz |
| 2012/0089259 A1 | 4/2012 | Williams |
| 2012/0092154 A1 | 4/2012 | Petite |
| 2012/0093141 A1 | 4/2012 | Imes |
| 2012/0095604 A1 | 4/2012 | Alexanian |
| 2012/0101637 A1 | 4/2012 | Imes |
| 2012/0109387 A1 | 5/2012 | Martin |
| 2012/0123817 A1 | 5/2012 | Hohenberger |
| 2012/0135759 A1 | 5/2012 | Imes |
| 2012/0175425 A1 | 7/2012 | Evers |
| 2012/0203383 A1 | 8/2012 | Holindrake |
| 2012/0215366 A1* | 8/2012 | Redmond ............ G05B 19/042 |
| | | 700/284 |
| 2012/0215725 A1 | 8/2012 | Imes |
| 2012/0216881 A1 | 8/2012 | Donoghue |
| 2012/0221154 A1 | 8/2012 | Runge |
| 2012/0221718 A1 | 8/2012 | Imes |
| 2012/0232708 A1 | 9/2012 | Ensworth |
| 2012/0239211 A1 | 9/2012 | Walker |
| 2012/0239807 A1 | 9/2012 | Davis |
| 2012/0253529 A1 | 10/2012 | Carlson |
| 2012/0254784 A1 | 10/2012 | Vander Griend |
| 2012/0259473 A1 | 10/2012 | Nickerson |
| 2012/0286062 A1 | 11/2012 | Sicotte |
| 2012/0290137 A1 | 11/2012 | Raestik |
| 2012/0290139 A1 | 11/2012 | Brundisini |
| 2012/0290140 A1 | 11/2012 | Groeneveld |
| 2012/0303168 A1 | 11/2012 | Halahan |
| 2012/0303768 A1 | 11/2012 | Fiennes |
| 2012/0323392 A1 | 12/2012 | Gerdes |
| 2013/0006400 A1 | 1/2013 | Caceres |
| 2013/0054033 A1 | 2/2013 | Casilli |
| 2013/0054758 A1 | 2/2013 | Imes |
| 2013/0079931 A1 | 3/2013 | Wanchoo |
| 2013/0085619 A1 | 4/2013 | Howard |
| 2013/0090746 A1 | 4/2013 | Quail |
| 2013/0110293 A1 | 5/2013 | Illig |
| 2013/0116837 A1 | 5/2013 | Malaugh |
| 2013/0123991 A1 | 5/2013 | Richmond |
| 2013/0131874 A1 | 5/2013 | Shupe |
| 2013/0160092 A1 | 6/2013 | Benisti |
| 2013/0162390 A1 | 6/2013 | Ersavas |
| 2013/0173070 A1 | 7/2013 | Tennyson |
| 2013/0185786 A1 | 7/2013 | Dyer |

(56)　　　References Cited

U.S. PATENT DOCUMENTS

| | | |
|---|---|---|
| 2013/0201316 A1 | 8/2013 | Binder |
| 2013/0212262 A1 | 8/2013 | Imes |
| 2013/0226357 A1 | 8/2013 | Ersavas |
| 2013/0227126 A1 | 8/2013 | Imes |
| 2013/0238160 A1 | 9/2013 | Imes |
| 2013/0253713 A1 | 9/2013 | Vanwagoner |
| 2013/0269798 A1 | 10/2013 | Wood |
| 2013/0274932 A1 | 10/2013 | Curren |
| 2013/0310992 A1 | 11/2013 | Larsen |
| 2013/0318217 A1 | 11/2013 | Imes |
| 2013/0318444 A1 | 11/2013 | Imes |
| 2013/0325190 A1 | 12/2013 | Imes |
| 2013/0332000 A1 | 12/2013 | Imes |
| 2013/0341420 A1 | 12/2013 | Lister |
| 2014/0005809 A1 | 1/2014 | Frei |
| 2014/0005810 A1 | 1/2014 | Frei |
| 2014/0005843 A1 | 1/2014 | Thomas |
| 2014/0018965 A1 | 1/2014 | Pearson |
| 2014/0039697 A1 | 2/2014 | Steven |
| 2014/0128001 A1 | 5/2014 | Imes |
| 2014/0129039 A1 | 5/2014 | Olive-Chahinian |
| 2014/0163751 A1 | 6/2014 | Davis |
| 2014/0172121 A1 | 6/2014 | Li |
| 2014/0172180 A1 | 6/2014 | Woytowitz |
| 2014/0222223 A1 | 8/2014 | Horton |
| 2014/0229024 A1 | 8/2014 | Wang |
| 2014/0236868 A1 | 8/2014 | Cook |
| 2014/0244044 A1 | 8/2014 | Davis |
| 2014/0244045 A1 | 8/2014 | Davis |
| 2014/0244063 A1 | 8/2014 | Davis |
| 2014/0258386 A1 | 9/2014 | Imes |
| 2014/0316587 A1 | 10/2014 | Imes |
| 2014/0354427 A1 | 12/2014 | Rapaport |
| 2014/0370879 A1 | 12/2014 | Redding |
| 2015/0005958 A1 | 1/2015 | Endrizzi |
| 2015/0005959 A1 | 1/2015 | Endrizzi |
| 2015/0005960 A1 | 1/2015 | Endrizzi |
| 2015/0005961 A1 | 1/2015 | Endrizzi |
| 2015/0005962 A1 | 1/2015 | Endrizzi |
| 2015/0005963 A1 | 1/2015 | Endrizzi |
| 2015/0019736 A1 | 1/2015 | Imes |
| 2015/0025697 A1 | 1/2015 | Imes |
| 2015/0026316 A1 | 1/2015 | Imes |
| 2015/0032272 A1 | 1/2015 | Neesen |
| 2015/0032273 A1 | 1/2015 | Romney |
| 2015/0032274 A1 | 1/2015 | Runge |
| 2015/0039143 A1 | 2/2015 | Alexanian |
| 2015/0056979 A1 | 2/2015 | Davis |
| 2015/0057817 A1 | 2/2015 | Endrizzi |
| 2015/0057818 A1 | 2/2015 | Halahan |
| 2015/0073607 A1 | 3/2015 | Endrizzi |
| 2015/0075259 A1 | 3/2015 | Romney |
| 2015/0077087 A1 | 3/2015 | Romney |
| 2015/0081111 A1 | 3/2015 | Endrizzi |
| 2015/0081112 A1 | 3/2015 | Endrizzi |
| 2015/0081113 A1 | 3/2015 | Endrizzi |
| 2015/0081114 A1 | 3/2015 | Romney |
| 2015/0081115 A1 | 3/2015 | Endrizzi |
| 2015/0081116 A1 | 3/2015 | Endrizzi |
| 2015/0081117 A1 | 3/2015 | Romney |
| 2015/0081118 A1 | 3/2015 | Endrizzi |
| 2015/0081119 A1 | 3/2015 | Endrizzi |
| 2015/0084748 A1 | 3/2015 | Davis |
| 2015/0095090 A1 | 4/2015 | Altieri |
| 2015/0097663 A1 | 4/2015 | Sloo |
| 2015/0105921 A1 | 4/2015 | Shupe |
| 2015/0167861 A1 | 6/2015 | Ferrer Herrera |
| 2015/0204563 A1 | 7/2015 | Imes |
| 2015/0223416 A1 | 8/2015 | Eng |
| 2015/0230418 A1 | 8/2015 | Woytowitz |
| 2015/0244675 A1 | 8/2015 | Dyer |
| 2015/0268670 A1 | 9/2015 | Nies |
| 2015/0309496 A1 | 10/2015 | Kah, III |
| 2015/0319941 A1 | 11/2015 | Klein |
| 2015/0331404 A1 | 11/2015 | Kantor |
| 2016/0037736 A1 | 2/2016 | Rainone |
| 2016/0048135 A1 | 2/2016 | Hill |
| 2016/0050860 A1 | 2/2016 | Standerfer |
| 2016/0100533 A1 | 4/2016 | Bauman |
| 2016/0157446 A1 | 6/2016 | Bentwich |
| 2016/0164575 A1 | 6/2016 | Smith |
| 2016/0171374 A1 | 6/2016 | Kim |
| 2016/0175858 A1 | 6/2016 | Bell |
| 2016/0192602 A9 | 7/2016 | Alexanian |
| 2016/0198645 A1 | 7/2016 | Weatherill |
| 2016/0198646 A1 | 7/2016 | Ensworth |
| 2016/0202679 A1 | 7/2016 | Bermudez Rodriguez |
| 2016/0212952 A1 | 7/2016 | Runge |
| 2016/0215994 A1 | 7/2016 | Mewes |
| 2016/0219804 A1 | 8/2016 | Romney |
| 2016/0219805 A1 | 8/2016 | Romney |
| 2016/0255763 A1 | 9/2016 | Canyon |
| 2016/0259309 A1 | 9/2016 | Bangalore |
| 2016/0349765 A1 | 12/2016 | Woytowitz |
| 2016/0371961 A1 | 12/2016 | Narang |
| 2017/0006149 A1 | 1/2017 | Namgoong |
| 2017/0006787 A1 | 1/2017 | Weiler |
| 2017/0020089 A1 | 1/2017 | Endrizzi |
| 2017/0052522 A1 | 2/2017 | Klein |
| 2017/0055433 A1 | 3/2017 | Jamison |
| 2017/0105369 A1 | 4/2017 | Shamley |
| 2017/0112079 A1 | 4/2017 | Eyring |
| 2017/0118930 A1 | 5/2017 | Bangalore |
| 2017/0147011 A1 | 5/2017 | Klein |
| 2017/0156274 A1 | 6/2017 | Carlson |
| 2017/0170979 A1 | 6/2017 | Khalid |
| 2017/0172078 A1 | 6/2017 | Gonzalez Hernandez |
| 2017/0191695 A1 | 7/2017 | Bruhn |
| 2017/0273258 A1 | 9/2017 | Itzhaky |
| 2017/0273259 A1 | 9/2017 | Eng |
| 2017/0318761 A1 | 11/2017 | Rainone |
| 2017/0322527 A1 | 11/2017 | Ersavas |
| 2017/0322567 A1 | 11/2017 | Klein |
| 2017/0357230 A1 | 12/2017 | Bermudez Rodriguez |
| 2017/0359976 A1 | 12/2017 | Klein |
| 2017/0366596 A1 | 12/2017 | Han |
| 2018/0014480 A1 | 1/2018 | Montgomery |
| 2018/0039243 A1 | 2/2018 | Bangalore |
| 2018/0042188 A1 | 2/2018 | Khabbaz |
| 2018/0042189 A1 | 2/2018 | Klein |
| 2018/0084741 A1 | 3/2018 | Gilliam |
| 2018/0132422 A1 | 5/2018 | Hassanzadeh |
| 2018/0139912 A1 | 5/2018 | Halahan |
| 2018/0184600 A1 | 7/2018 | Charling |
| 2018/0191564 A1 | 7/2018 | Hall |
| 2018/0278581 A1 | 9/2018 | Dyer |
| 2018/0295797 A1 | 10/2018 | Klein |
| 2018/0317407 A1 | 11/2018 | Williams |
| 2019/0035071 A1 | 1/2019 | Klein |
| 2019/0104696 A1 | 4/2019 | Fischman |
| 2019/0261584 A1 | 8/2019 | Olive-Chahinian |
| 2019/0261585 A1 | 8/2019 | Weiler |
| 2019/0307084 A1 | 10/2019 | Ersavas |
| 2021/0360884 A1 | 11/2021 | Woytowitz |
| 2021/0373583 A1 | 12/2021 | Klein |
| 2021/0392830 A1 | 12/2021 | Weiler |
| 2022/0012823 A1 | 1/2022 | Klein |
| 2022/0132757 A1 | 5/2022 | Woytowitz |
| 2022/0159418 A1 | 5/2022 | Griggs |
| 2022/0406452 A1 | 12/2022 | Shelton, IV |
| 2023/0105146 A1 | 4/2023 | Mora |
| 2023/0180684 A1 | 6/2023 | Olive-Chahinian |
| 2023/0413745 A1 | 12/2023 | Weiler |

FOREIGN PATENT DOCUMENTS

| | | |
|---|---|---|
| WO | 2007050175 | 5/2007 |
| WO | 2008068699 | 6/2008 |

OTHER PUBLICATIONS

U.S. Appl. No. 12/837,381, filed Jul. 15, 2010, Jonathan I. Marsters.
U.S. Appl. No. 13/224,140, filed Sep. 1, 2011, Jonathan I. Marsters.

(56) References Cited

OTHER PUBLICATIONS

"ICD-HP Handheld Programmer for Hunter ICD Decoders Owner's Manual and Operating Instructions" Hunter Industries Incorporated, 2009, 48 pgs. (Year: 2009).

EPO; U.S. Appl. No. 12/306,370; European Examination Report mailed Feb. 15, 2016.

EPO; App. No. 12306370; European Examination Report mailed Feb. 15, 2016.

EPO; App. No. 12306370; Extended European Search Report mailed Aug. 5, 2013.

EPO; App. No. 12306370; Partial European Search Report mailed Mar. 14, 2013.

Mayer, Peter, et al.; "Evaluation of California weather-based "smart" irrigation controller programs"; Aquacraft, Inc., Water Engineering and Management, and National Research Center, Inc.; Jul. 1, 2009; pp. 1-309.

PCT; App. No. PCT/US2017/042202; International Search Report and Written Opinion mailed on Oct. 6, 2017.

Quicksmart Development; Networked & Wireless Automated Control Systems; EtherRain Networked Sprinkler Controllers; 2012; 4 Pages.

Rain Bird; "Catalog: TBOS Field Transmitter"; published at http:/web.archive.org/web/20111218221822/http://rainbird.com/documents/parts/part_TBOS.pdf; Sep. 8, 2011; pp. 1-2; Rain Bird Corporation, Azusa, CA.

Rain Bird; "Manual: TBOS Field Transmitter"; published at http://web.archive.org/web/20111218215847/http://rainbird.com/documents/turf/man_TBOS_FT.pdf; Sep. 8, 2011; pp. 1-30; Rain Bird Corporation, Azusa, CA.

Rain Bird; "Manual: TBOS One, Two, Four and Six Station Control Module"; published at http://web.archive.org/web/20110904171326/http://www.rainbird.com/documents/turf/man_TBOS.pdf; Sep. 8, 2011; pp. 1-20; Rain Bird Corporation, Azusa, CA.

Rain Bird; "Rain Bird TBOS Three-Program Battery-Operated Controller"; published at http://web.archive.org/web/20110908065404/http://www.rainbird.com/landscape/products/controllers/TBOScontroller.htm; Sep. 8, 2011; pp. 1-3; Rain Bird Corporation, Azusa, CA.

Rain Bird; "Tech Specs: TBOS"; published at http://web.archive.org/web/20110812073350/http://www.rainbird.com/documents/turf/ts_TBOS.pdf; Sep. 8, 2011; pp. 1-2; Rain Bird Corporation, Azusa, CA.

Regaber; Skygreen: GPRS/Radio Centralised Irrigation System; published at http://web.archive.org/web/20120526052826/http://www.regaber.com/webregaber/bd/descargas/AP_P0_06_SKgreen.pdf; May 26, 2012; pp. 1-6; Regaber Automatismos y servicios.

Sandu, F., et al.; "Remote and mobile control in donnotics"; IEEE; Optimization of Electrical and Electronic Equipment, 2008. OPTIM 2008. 11th International Conference on Optimization of Electrical and Electronic Equipment; May 22-24, 2018; pp. 1-6.

Souza, Christine; "Irrigation technology: Smart water solutions for state's farmers"; AgAlert; Jul. 9, 2008; pp. 1-6.

USPTO; U.S. Appl. No. 13/843,319; Notice of Allowance mailed Jun. 21, 2016.

USPTO; U.S. Appl. No. 13/843,319; Office Action mailed Feb. 10, 2016.

USPTO; U.S. Appl. No. 13/843,319; Office Action mailed Jun. 4, 2015.

USPTO; U.S. Appl. No. 13/843,319; Office Action mailed Sep. 30, 2015.

USPTO; U.S. Appl. No. 14/073,619; Notice of Allowance mailed Feb. 7, 2019.

USPTO; U.S. Appl. No. 14/073,619; Notice of Allowance mailed Mar. 28, 2018.

USPTO; U.S. Appl. No. 14/073,619; Notice of Allowance mailed May 20, 2019.

USPTO; U.S. Appl. No. 14/073,619; Notice of Allowance mailed Jul. 26, 2018.

USPTO; U.S. Appl. No. 14/073,619; Notice of Allowance mailed Aug. 4, 2016.

USPTO; U.S. Appl. No. 14/073,619; Office Action mailed Feb. 2, 2016.

USPTO; U.S. Appl. No. 14/073,619; Office Action mailed Feb. 23, 2017.

USPTO; U.S. Appl. No. 15/270,986; Notice of Allowance mailed Jan. 25, 2019.

USPTO; U.S. Appl. No. 15/270,986; Notice of Allowance mailed Sep. 26, 2018.

USPTO; U.S. Appl. No. 15/650,257; Notice of Allowance mailed Oct. 9, 2019.

USPTO; U.S. Appl. No. 15/650,257; Office Action mailed Apr. 4, 2019.

USPTO; U.S. Appl. No. 16/405,762; Office Action mailed Aug. 20, 2020.

USPTO; U.S. Appl. No. 16/408,066; Notice of Allowance mailed Apr. 29, 2021.

USPTO; U.S. Appl. No. 16/408,066; Office Action mailed Oct. 22, 2020.

USPTO; U.S. Appl. No. 16/405,762; Final Office Action Apr. 29, 2021; (pp. 1-38).

USPTO; U.S. Appl. No. 16/405,762; Final Rejection mailed May 11, 2022; (pp. 1-24).

USPTO; U.S. Appl. No. 16/405,762; Non-Final Rejection mailed Dec. 7, 2021; (pp. 1-22).

USPTO; U.S. Appl. No. 16/405,762; Notice of Allowance and Fees Due (PTOL-85) mailed Sep. 29, 2022; (pp. 1-9).

USPTO; U.S. Appl. No. 16/405,762; Notice of Allowance and Fees Due (PTOL-85) mailed Oct. 11, 2022; (pp. 1-3).

USPTO; U.S. Appl. No. 17/465,850; Non-Final Rejection mailed Nov. 18, 2022; (12 pages).

USPTO; U.S. Appl. No. 17/465,850; Notice of Allowance and Fees Due (PTOL-85) mailed Apr. 19, 2023; (7 pages).

USPTO; U.S. Appl. No. 18/105,528; Notice of Allowance and Fees Due (PTOL-85) mailed Nov. 22, 2023; (pp. 1-8).

USPTO; U.S. Appl. No. 18/242,280; Non-Final Rejection mailed Apr. 16, 2024; (pp. 1-9).

USPTO; U.S. Appl. No. 17/403,565; Non-Final Rejection mailed Nov. 16, 2023; (pp. 1-39).

USPTO; U.S. Appl. No. 16/738,879; Office Action mailed Sep. 9, 2020.

* cited by examiner

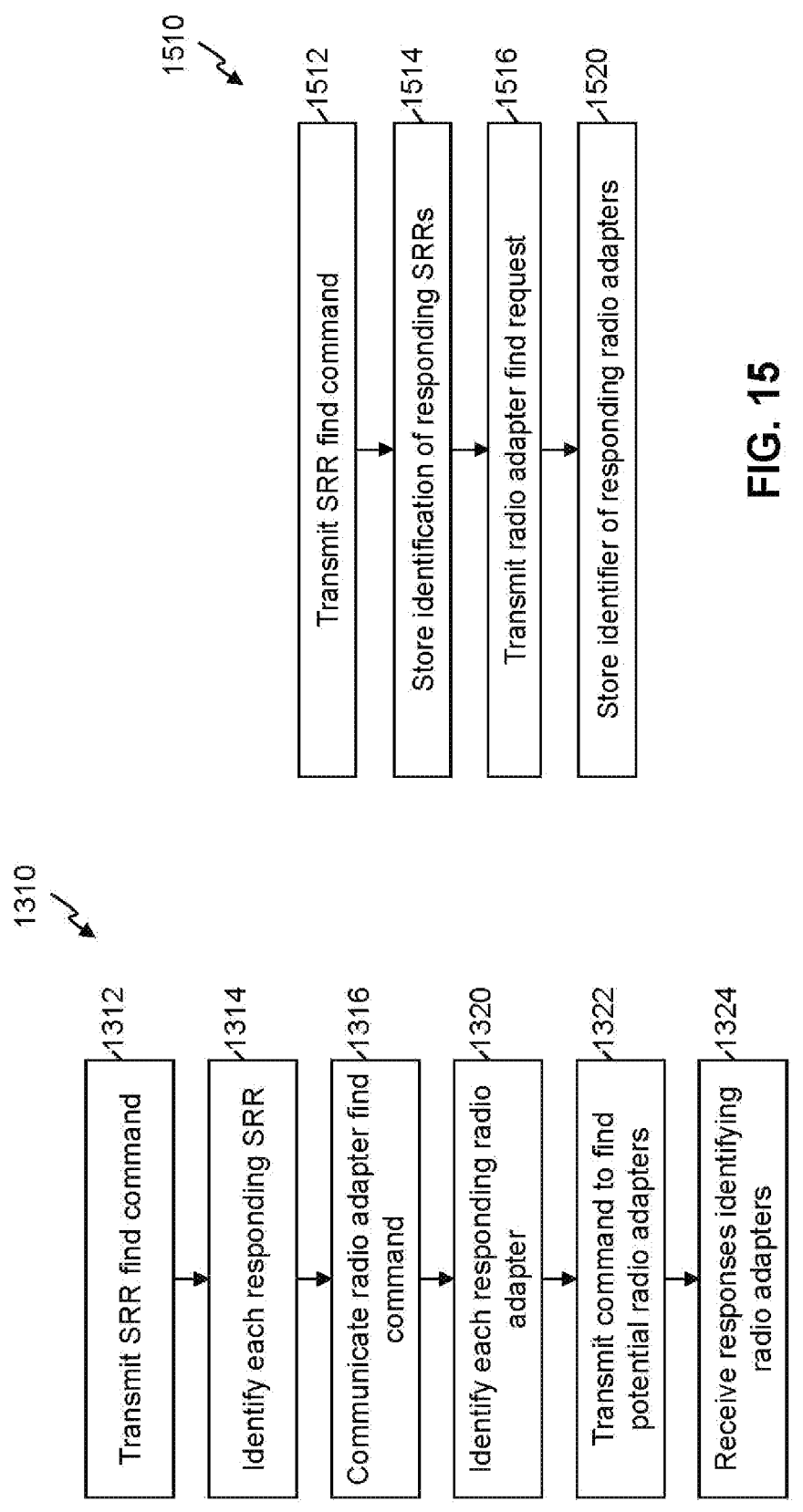

1510

1512 Transmit SRR find command

1514 Store identification of responding SRRs

1516 Transmit radio adapter find request

1520 Store identifier of responding radio adapters

1312 Transmit SRR find command

1314 Identify each responding SRR

1316 Communicate radio adapter find command

1320 Identify each responding radio adapter

1322 Transmit command to find potential radio adapters

1324 Receive responses identifying radio adapters

FIG. 13

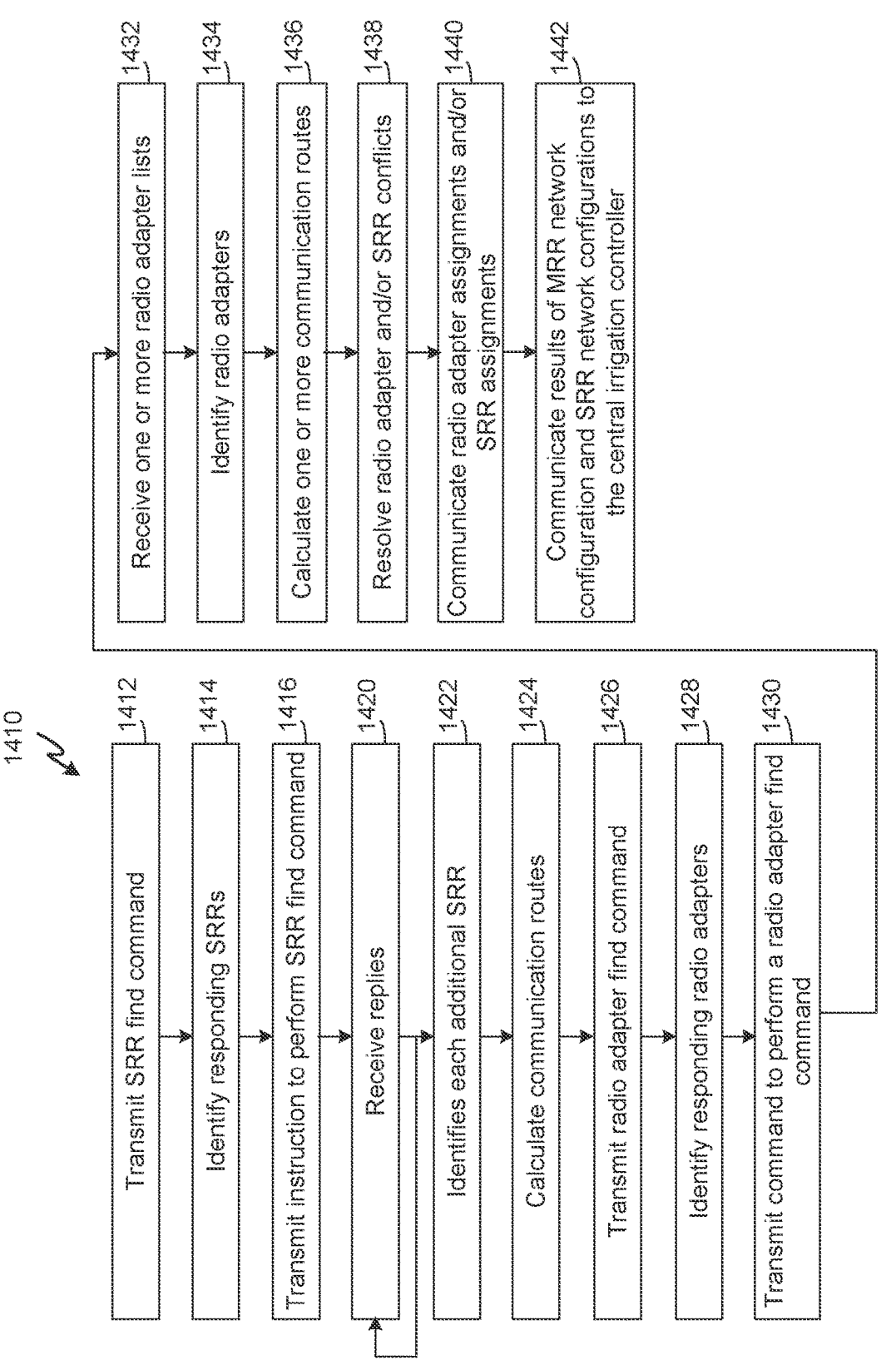

FIG. 14

1432 — Receive one or more radio adapter lists

1434 — Identify radio adapters

1436 — Calculate one or more communication routes

1438 — Resolve radio adapter and/or SRR conflicts

1440 — Communicate radio adapter assignments and/or SRR assignments

1442 — Communicate results of MRR network configuration and SRR network configurations to the central irrigation controller

1410

1412 — Transmit SRR find command

1414 — Identify responding SRRs

1416 — Transmit instruction to perform SRR find command

1420 — Receive replies

1422 — Identifies each additional SRR

1424 — Calculate communication routes

1426 — Transmit radio adapter find command

1428 — Identify responding radio adapters

1430 — Transmit command to perform a radio adapter find command

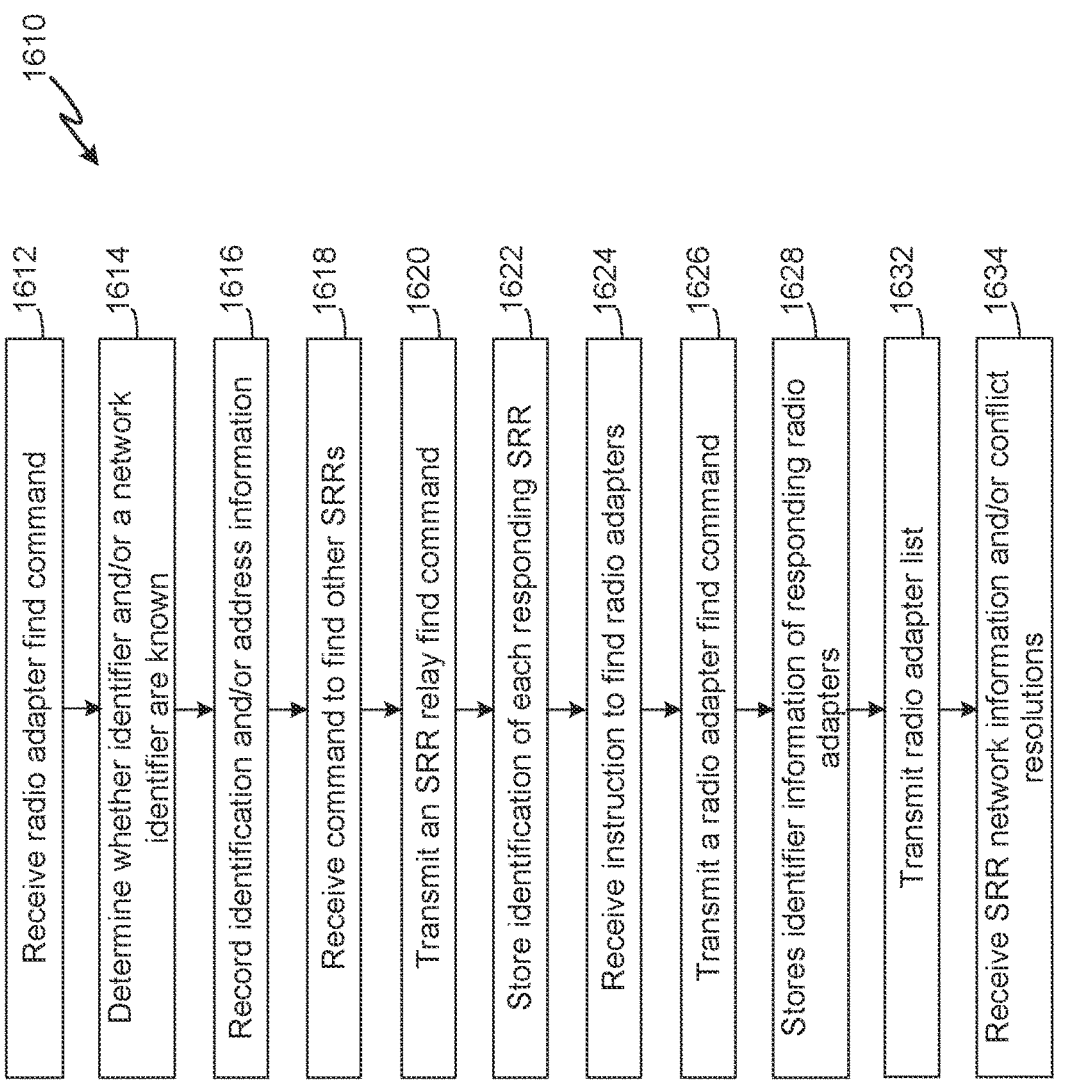

1610

1612 Receive radio adapter find command

1614 Determine whether identifier and/or a network identifier are known

1616 Record identification and/or address information

1618 Receive command to find other SRRs

1620 Transmit an SRR relay find command

1622 Store identification of each responding SRR

1624 Receive instruction to find radio adapters

1626 Transmit a radio adapter find command

1628 Stores identifier information of responding radio adapters

1632 Transmit radio adapter list

1634 Receive SRR network information and/or conflict resolutions

Figures 22, 23:
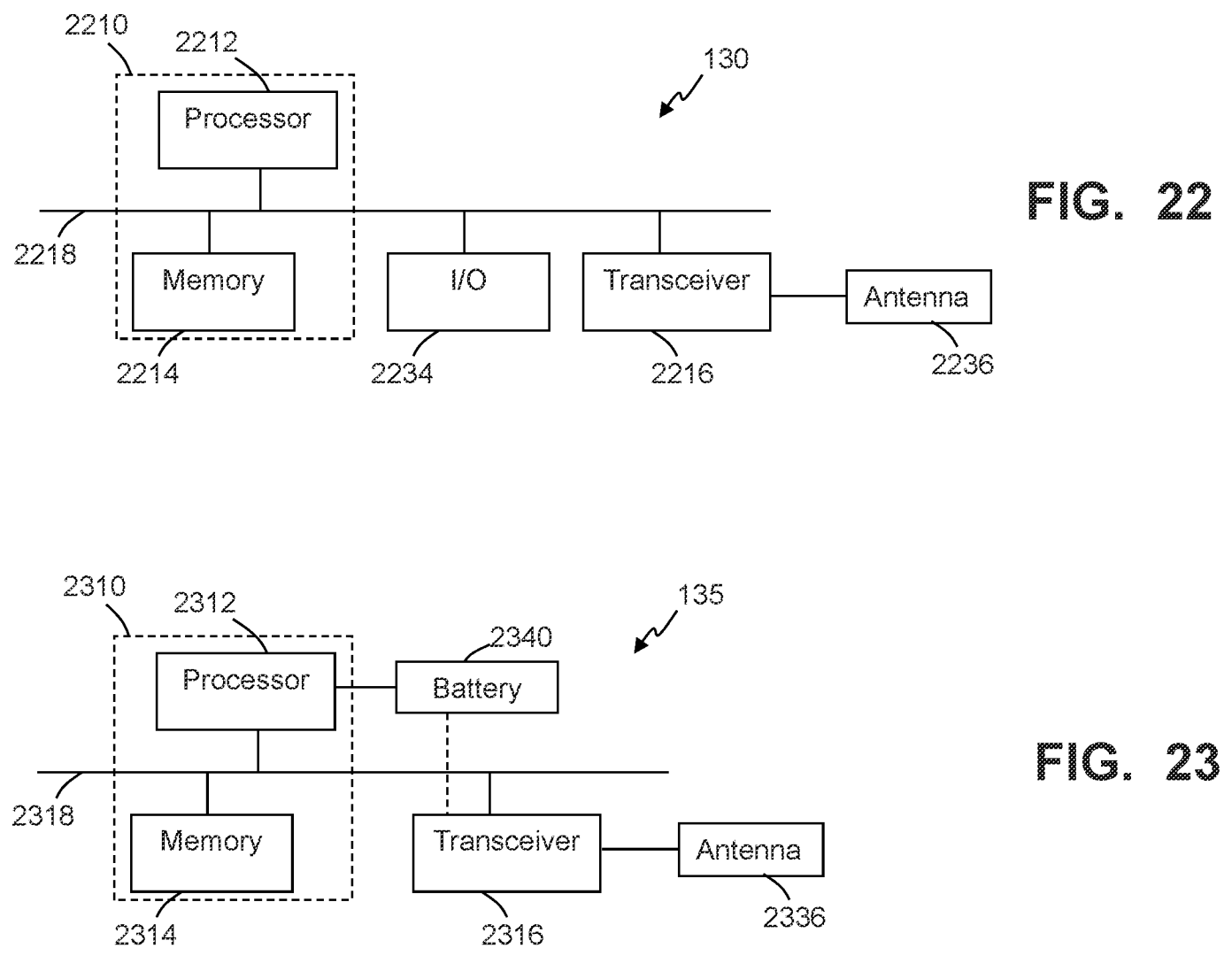

Processor 2212

2210

Memory 2214

2218

I/O 2234

Transceiver 2216

Antenna 2236

Processor 2312

2310

Memory 2314

2318

Battery 2340

Transceiver 2316

Antenna 2336

IRRIGATION CONTROL SYSTEMS AND METHODS

CROSS-REFERENCE TO RELATED APPLICATIONS

This application is a continuation of U.S. application Ser. No. 18/105,528, filed Feb. 3, 2023, which is a continuation of U.S. application Ser. No. 16/405,762, filed May 7, 2019, now U.S. Pat. No. 11,570,956, which is a continuation of U.S. application Ser. No. 14/073,619, filed Nov. 6, 2013, now U.S. Pat. No. 10,327,397, which claims the benefit under 35 U.S.C. § 119 of European Patent Application No. EP12306370, filed in the European Patent Office on Nov. 7, 2012, entitled IRRIGATION CONTROL SYSTEMS AND METHODS, for Rain Bird Corporation, which are each incorporated in their entirety herein by reference.

TECHNICAL FIELD

The present invention relates to irrigation and, in particular, to a system and method for controlling irrigation.

BACKGROUND

Generally, irrigation controllers are used to control the delivery of water to irrigation devices connected to switchable irrigation valves. To control the delivery of water to groups of irrigation devices that define irrigation stations or zones, conventional program-based irrigation controllers typically provide programs that can define different watering days and start times. Once a program is created, the irrigation controllers can implement the irrigation schedule for activating irrigation valves.

The irrigation programming can become more complex, for example, as the area to be irrigated increases, the variations in types of plant life to be irrigated increases and/or the differences in slope and/or soil type increase. Further, it can be complicated to design and implement irrigation systems for such complex areas.

BRIEF DESCRIPTION OF DRAWINGS

The above and other aspects, features and advantages of several embodiments of the present invention will be more apparent from the following more particular description thereof, presented in conjunction with the following drawings.

FIG. 13 depicts a simplified flow diagram of an example of a process of establishing an MRM network in controlling irrigation, according to some embodiments.

FIG. 14 depicts a simplified flow diagram of another example of a process of establishing an MRM network, according to some embodiments.

FIG. 15 depicts a simplified flow diagram of an example process of establishing an MRM network and/or RR network, according to some embodiments.

FIG. 16 depicts a simplified flow diagram of another example of a process of establishing an MRM network and/or RR network, according to some embodiments.

FIG. 20 depicts a simplified block diagram of a control module in accordance with some embodiments.

FIG. 21 depicts a simplified block diagram of a radio adapter in accordance with some embodiments.

FIG. 22 depicts a simplified block diagram of an MRM in accordance with some embodiments.

FIG. 23 depicts a simplified block diagram of an RR in accordance with some embodiments.

Figure 1:
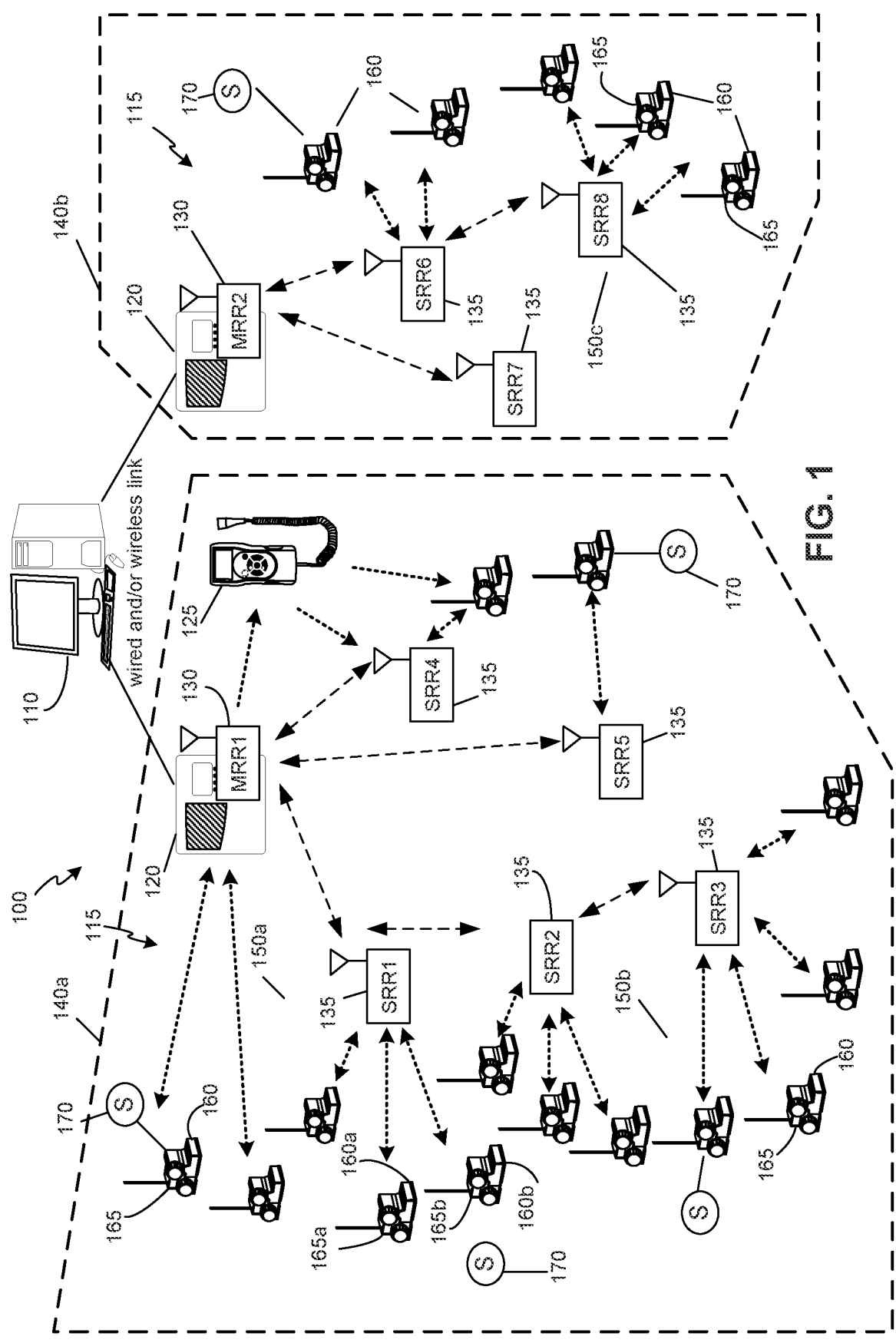
FIG. 1 depicts a simplified block diagram of an irrigation system in accordance with some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," "some embodiments," "some implementations" or similar language means that a particular feature, structure, or characteristic described in connection with the embodiment is included in at least one embodiment of the present invention. Thus, appearances of the phrases "in one embodiment," "in an embodiment," "in some embodiments," and similar language throughout this specification may, but do not necessarily, all refer to the same embodiment/s.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

FIG. 1 depicts a simplified block diagram of an irrigation system 100 in accordance with some embodiments. The irrigation system 100 includes a central irrigation control system or controller 110, a communication network 115 (which can include wired and/or wireless communication), one or more satellite irrigation controllers 120, a field transmitter 125, one or more wireless network interfaces or Master Radio Modules (MRM) 130 (each of which may generally be referred to as a wireless module or radio module), one or more wireless sub-network interfaces or Radio Relays (RR) 135 (each of which may be referred to as Slave Radio Relays or more generally, as wireless modules or radio modules), and one or more control modules 160 (also referred to as command modules), where each of the control modules may be cooperated with a radio adapter 165. In some embodiments, the irrigation system 100 can include one or more sensors 170. The sensors 170, in some instances, can cooperate with and/or communicate directly to a control module 160, an MRM 130, an RR 135, a satellite irrigation controller 120 and/or the central irrigation controller 110. Utilizing these components, the irrigation system 100 is configured to allow for the remote management of one or more, and typically many control modules 160 using the central irrigation controller 110. In some instances, the control modules 160 are in-ground or positioned below a ground level. The control modules 160, however, can be positioned on ground or above ground.

The irrigation system 100 combines and cooperates irrigation system devices that were not intended to be cooperated within an irrigation system. For example, the present embodiments can combine the use of AC powered irrigation control systems with DC battery powered controllers. Further, the irrigation system 100 combines satellite irrigation controllers 120 that implement irrigation schedules over a relatively wide geographic area with control modules 160 that are local to valves, run valve specific schedules and typically do not include a user interface. Additionally, the irrigation system 100 can incorporate local control modules that are typically independently controlled and intended to operate independently into a system that provides coordinate irrigation control. Accordingly, the present embodiments can provide enhanced irrigation control over areas that are typically hard or expensive to incorporate programmed irrigation control (e.g., landscaping on roadways, historic areas, and the like) while coordinating the controlled irrigation over a wide geographic area and/or in cooperation with a wide variety of irrigation control devices and/or irrigation systems. A central irrigation controller 110 can distribute irrigation schedules and/or irrigation commands to a plurality of irrigation devices, including the independently controlled control modules 160, to implement coordinated irrigation over the irrigation system 100.

The MRM 130, in some embodiments, is cooperated with one of the satellite irrigation controllers 120. Further, the MRM 130 may, in some implementations, be mounted within the satellite irrigation controller 120. Each of the various control modules 160 that are cooperated with a radio adapter can interface with an RR 135 or an MRM 130. The RRs 135 interface wirelessly with an MRM 130. The MRMs communicate wired or wirelessly with a central control software application executed by the central irrigation controller 110.

Accordingly, the central irrigation controller 110 can coordinate irrigation by generating irrigation schedules or be programmed by a user with irrigation schedules for the respective satellite irrigation controllers 120 and control modules 160. The irrigation schedules, in some instances, define run times and/or desired amounts of water to be supplied through a station and/or water delivery devices (e.g., sprinklers, drip lines, etc.). Further, the irrigation schedules often define start times or times when the irrigation scheduling can be implemented. Accordingly, this allows the central irrigation controller 110, satellite irrigation controllers 120 and/or control modules 160 to manage start times and durations. Additionally, in some implementations, one or more flow thresholds can be defined and used by the central irrigation controller 110, satellite irrigation controllers 120 and/or control modules 160 in controlling irrigation. The central irrigation controller 110 can be located at the property being irrigated or be located remote from the property. For example, in some instances the central irrigation controller 110 is located within wireless transmission range of the satellite irrigation controllers 120 (e.g., radio frequency, cellular or the like, and in some instances may have a wireless range of about 1000-3000 feet, while in other instances may have a range of greater than a mile). In some embodiments, the central irrigation controller can be implemented on one or more computer devices implementing central irrigation control software provided by Rain Bird Corporation of Azusa, California, such as IQ™ Central Control, Maxicom2® Multi-Site Irrigation Central Control System, SiteControl™ Single Site Central Control System; or other relevant central control systems by Rain Bird Corporation or other companies.

Typically, the central irrigation controller 110 and/or software implemented by the central irrigation controller, at least in part, manages communications with at least the satellite irrigation controllers 120 and MRMs 130. In some instances, the communication with the satellite irrigation controllers 120, field transmitter 125, MRMs 130 and RRs 135 may be through a communication interface or Network Communication Cartridge (NCC) cooperated with the satellite irrigation controller 120. Communications may be sent with error correction, may be sent multiple times and/or may be sent as separate actions, such as communicating two times in case of radio network action (e.g., a first communication for sending a command, and a second later communication to query for a command answer).

The MRM 130 is configured to, in part, receive relevant irrigation schedules and/or irrigation commands for one or more control modules 160 and wirelessly distribute the relevant irrigation schedules and/or commands to the one or more control modules 160 that are cooperated with a radio adapter providing wireless communication with the MRM 130 or an RR 135. In some embodiments, the control modules 160 are microprocessor-based irrigation control devices that each stores and executes at least one irrigation schedule. Typically, the control modules 160 are battery operated and do not have power lines. Accordingly, a control module battery (not shown) typically provides the only power to a control module 160 and allows the control module to implement valve or station specific irrigation schedules in the absence of AC power and in areas where AC power cannot be provided or it is impractical or too costly to provide AC power.

Additionally, in some instances, an MRM 130 may communicate, via wired or wireless communication, with a field transmitter 125 to supply irrigation schedules to the field transmitter. The field transmitter 125 can then be communicationally coupled with one or more control modules 160 to communicate irrigation scheduling to those control modules.

Figures 2A, 2B, 2C:
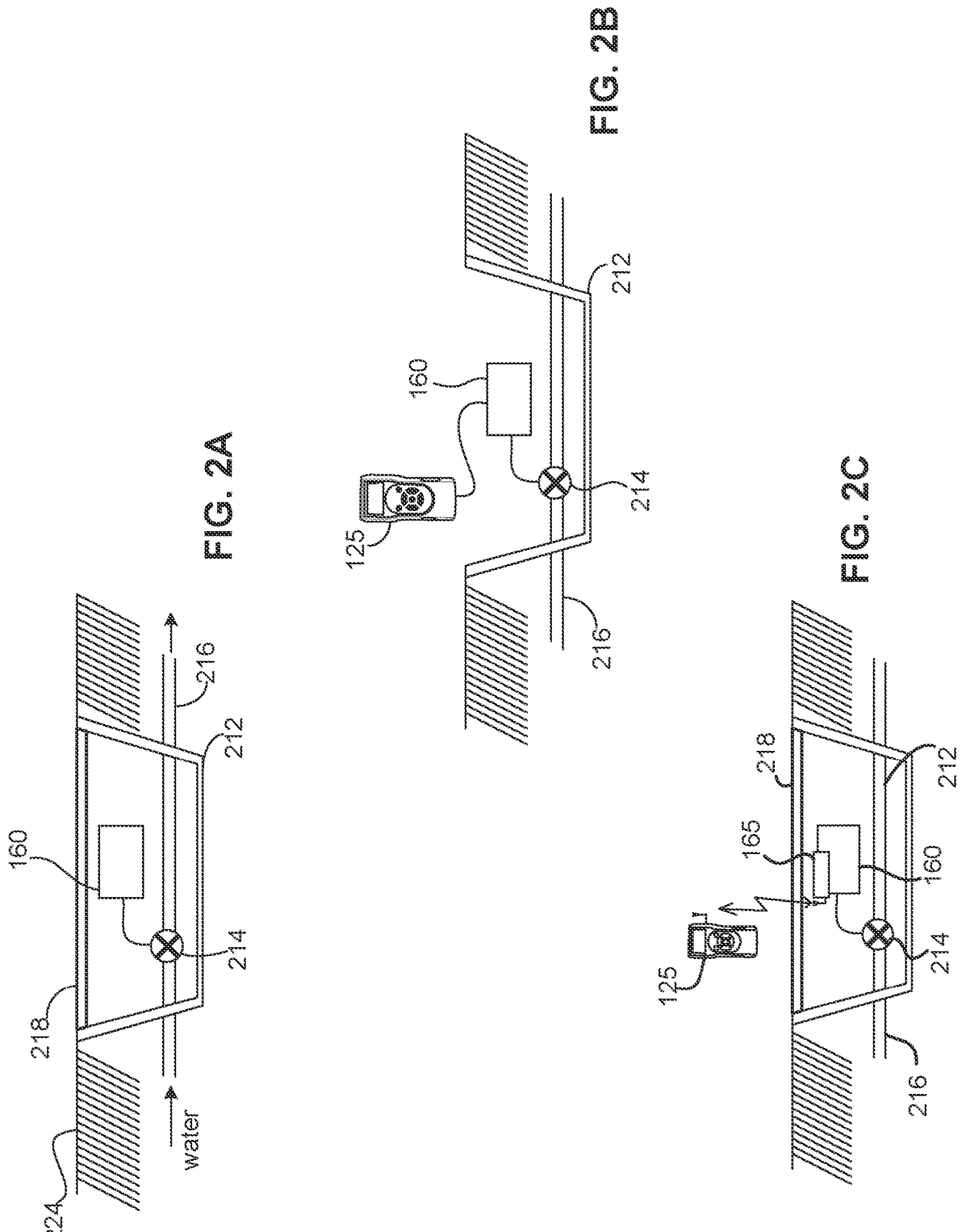
FIG. 2A depicts a simplified view of a control module positioned within a valve box and coupled with a valve, according to some embodiments.
FIG. 2B shows a simplified view of the valve box of FIG. 2A with the lid removed and a field transmitter communicationally coupled with the control module, according to some embodiments.
FIG. 2C depicts a simplified view of a control module positioned within a valve box, coupled with a valve, and cooperated with a radio adapter, according to some embodiments.

FIG. 2A depicts a simplified view of a control module 160 positioned within a valve box 212 (or other enclosure) and coupled with an irrigation valve 214, master valve or other valve, which in this example is also within the valve box 212, according to some embodiments. The valve can be substantially any type of valve or other controlled device. Typically, the control module 160 is positioned below ground level 224 within a valve box 212 or other enclosure. The valve 214 is cooperated with a water line 216 such that the opening and closing of the valve 214 controls the flow of water through the water line. A valve box lid or cover 218 is cooperated with the valve box 212 to provide some additional protection for the components within the valve box.

FIG. 2B shows a simplified view of the valve box 212 of FIG. 2A with the lid removed and a field transmitter 125 communicationally coupled with the control module 160, according to some embodiments. Referring to FIGS. 2A-2B, a control module 160 may control one or more different valves (e.g., 1, 2, 4, 6 or more different valves or stations) depending on the number of outputs included during manufacturing (only one valve is shown for simplicity in FIGS. 2A-2B). Typically, the control module 160 does not have a user interface. Accordingly, in some implementations the field transmitter 125 can be used to directly supply and program irrigation scheduling into the control module 160. The field transmitter 125 is a portable, handheld user interface device. It is coupled to the control module either through a directed wire or optical link connection cable attached to the field transmitter, or via a wireless communication link (e.g., radio frequency link) when the control module 160 is cooperated with a wireless radio adapter 165.

As such, the irrigation scheduling contained in the field transmitter 125 can be transmitted into the control module 160.

FIG. 2C depicts a simplified view of a control module 160 positioned within a valve box 212 (or other enclosure) and coupled with a valve 214, which in this example is also within the valve box 212, according to some embodiments. The control module 160 is cooperated with or includes a radio adapter 165 that allows wireless communication between the control module 160 and the field transmitter 125, an RR 135 and/or MRM 130. Accordingly, the field transmitter 125 can be used to directly provide irrigation scheduling to the control module 160 and/or radio adapter 165 without the valve box lid 218 having to be opened, and in some instances, can be performed at a distance from the control module (e.g., 30 feet or more). Similarly, a RR 135 and/or MRM 130 can alternatively or additionally wirelessly communicate with the radio adapter 165 and control module 160 to, in part, provide irrigation scheduling, provide command and/or obtain information from the control module and/or radio adapter.

Figure 3B:
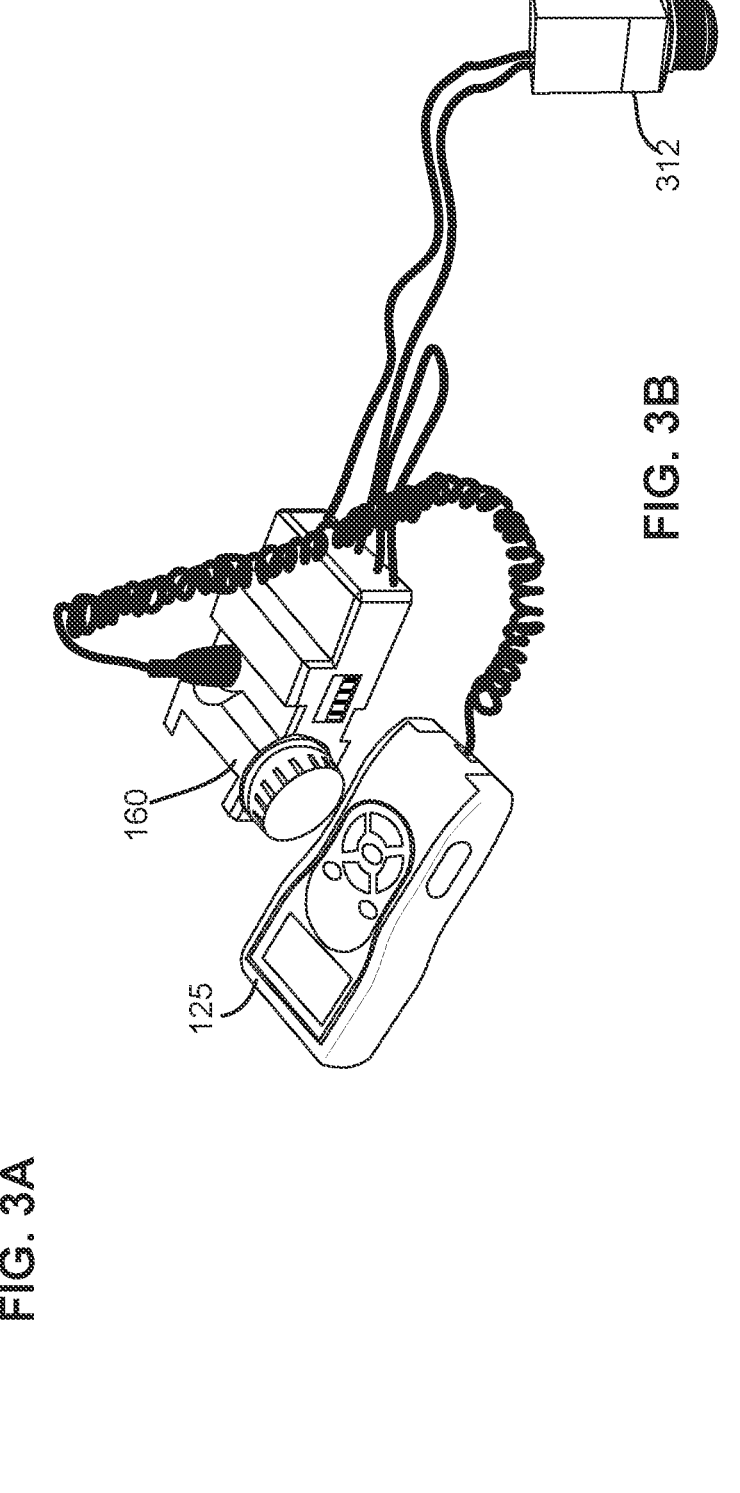
FIG. 3B shows a perspective view of a control module directly, communicationally coupled with a field transmitter.
Figure 3A:
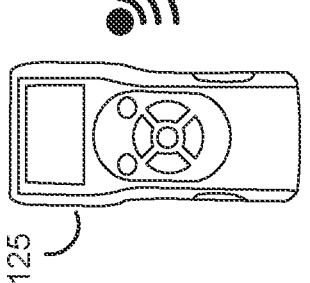
FIG. 3A depicts an illustration of a field transmitter in wireless communication with a radio adapter that is cooperated with a control module, in accordance with some embodiments.

FIG. 3A depicts an illustration of a field transmitter 125 in wireless communication with a radio adapter 165 that is cooperated with the control module 160, in accordance with some embodiments. The radio adapter 165, in some embodiments, can be used to retro-fit with some existing control modules allowing these existing control modules to be utilized within the irrigation system 100.

As described above, the radio adapter 165, in at least some implementations, can be configured to allow wireless communication between the control module 160 and an MRM 130 or an RR 135, which can improve the distribution of irrigation scheduling and/or avoid having a user go out to the control modules and utilize the field transmitter 125 to manually distributed the irrigation schedules. The field transmitter 125 can continue to be used to directly communicate with and supply irrigation programming and/or other information to a control module 160 and/or radio adapter 165. The communication with the radio adapter can be wireless directly from the field transmitter 125. In some embodiments, the field transmitter 125 can utilize the MRM 130 and/or one or more RRs 135 in relaying information to a radio adapter 165. For example, the handheld field transmitter 125 can wirelessly transmits irrigation programming or other information to the MRM 130. The MRM can wirelessly relay the irrigation programming or other information from the MRM to the radio adapter that is directly cooperated with and communicationally coupled with the control module. The communication to the radio adapter may further include one or more relays through one or more RRs 135.

FIG. 3B shows a perspective view of a control module 160 directly, communicationally coupled with the field transmitter 125. As described above, in some instances the field transmitter can direct communicate with the control module 160. This communication, however, is typically through direct connection via a wire, direct connection interface or cord, or other such connection. In some instances, the direct connection provides optical communication between the field transmitter 125 and the control module 160. The control module includes one or move valve drivers (internal to the control module and not shown in FIG. 3B) that couple with one or more valves 312.

Figure 4:
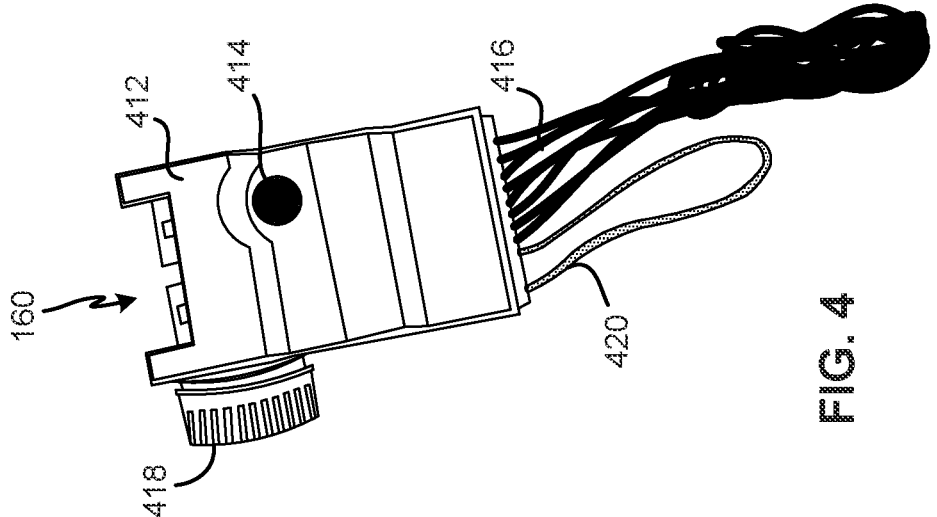
FIG. 4 shows a perspective view of a control module in accordance with some embodiments.

FIG. 4 shows a perspective view of a control module 160 in accordance with some embodiments. The control module 160 includes a housing 412, a communication interface or port 414, one or more valve wires or lines 416 and a battery compartment 418 (which may be a separate compartment that may be watertight) into which a control module battery can be inserted. Further, the control module 160 typically includes (although not depicted in FIG. 4) one or more processors, controllers, memory, signal receivers, transmitters and/or transceivers, detectors, decoders, encoders and valve drivers positioned within the housing 412. In some implementations, the control module 160 can include a master valve output 420. The one or more valve drivers couple with the valve lines 416 and/or master valve output 420. Further, the control module 160 can be configured to be battery-operated so that power lines do not need to be laid, which can simplify the installation and/or allow the control module to control irrigation in places where it would be difficult and/or costly to lay power lines. Typically, the control module 160 is a microprocessor-based irrigation control device that stores and executes one or more irrigation schedules. As described above, the control module can be located below ground level, typically within a valve box 212, and directly coupled to one or more irrigation valves 214. Again, the control module 160 may be configured without a user interface. Accordingly, a field transmitter 125, an MRM 130 and/or an RR 135 can be used to program the irrigation scheduling into the control module 160.

The communication interface 414, in some embodiments, is an optical communication interface with one or more lenses positioned to direct optical signals from the field transmitter 125 to one or more optical sensors and/or detectors within the control module 160. Alternatively, the radio adapter 165 can be cooperated with the control module 160. In some instances, the radio adapter 165 has a corresponding communication interface, port, cable, cord or the like that can cooperate with the control module 160 and/or the communication interface 414 of the control module.

The optical communication to or from the control module 160 can employ substantially any optical communication, such as infrared communication. Again, the control module 160 includes one or more processors, controllers, memory, signal receivers, detectors, decoders and valve drivers, and the control module 160 is configured to receive (e.g., optically receive) programming, irrigation scheduling and/or irrigation commands, and implement at least the relevant portions of the programming, irrigation scheduling and/or commands. In many embodiments the housing 412 is sealed to inhibit or prevent water from entering the housing. For example, in some instances, the control module 160 is configured to meet and/or exceed an Ingress Protection Rating of IP68 (in accordance with the international standard of the International Electrotechnical Commission (IEC) 60529), potted and can be fully submersible. In some embodiments, the control module 160 can be implemented through a TBOS™ control module available from Rain Bird Corporation of Azusa, California.

Further, in some instances, the control module 160 can further couple with one or more sensor devices 170 (e.g., rain, soil moisture, rain/freeze, wind, flow, water meter, and/or other such sensors). Typically, the sensors 170 are cut off type sensors providing a cut off signal at a predefined threshold. The control module 160 utilizes the sensor information in controlling irrigation, such as preventing activation of scheduled irrigation in response to a rain sensor signal indicating detected rain fall and/or a detected predefined threshold amount of rain fall. The one or more valve drivers of the control module 160 activate the one or more valves 214 coupled with the control module. In some embodiments, the valve drivers are configured to send activation and deactivation signals to latching solenoid control valves. Additionally, the control module 160 is configured, in at least some implementations, with current limiting protection that prevents the solenoid driver circuit from destruction under station output short-circuit conditions.

The irrigation programming and/or irrigation schedule that can be incorporated into the control module 160 can include substantially any relevant irrigation scheduling. For example, in some instances the control module 160 provides: multiple independent programs (e.g., three), which each having one or more start times (e.g., eight start times each); multiple potential cycles (e.g., custom, odd, odd31, even, 1 to 31 Day Cyclical day cycles, and the like); adjustable station run times (e.g., adjustable from 1 minute to 12 hours); water budget per program and/or per month (e.g., 0% to 300%); calendar day off; rain delay (e.g., from 1 to 14 days); manual station, program, and test program start, advance, cancel; master valve and sensor programmable by station; and/or other such programming and/or scheduling. Further, the battery can typically be replaced without losing the programming and/or irrigation scheduling. Further, battery levels of the control module 160 and/or radio adapter 165 can be communicated to the MRM 130 and/or central irrigation controller 110 (e.g., in response to a request).

With the cooperation of the radio adapter 165, the control module 160 can be accessed and/or programmed through various methods. In some embodiments, a user can access the control module 160 using substantially any remote computer or other device configured to communicate over a distributed network (e.g., the Internet) through the MRM 130. Similarly, the field transmitter 125 can communicate with the control module 160 through the radio link and/or the Infra-red link.

Figure 5:
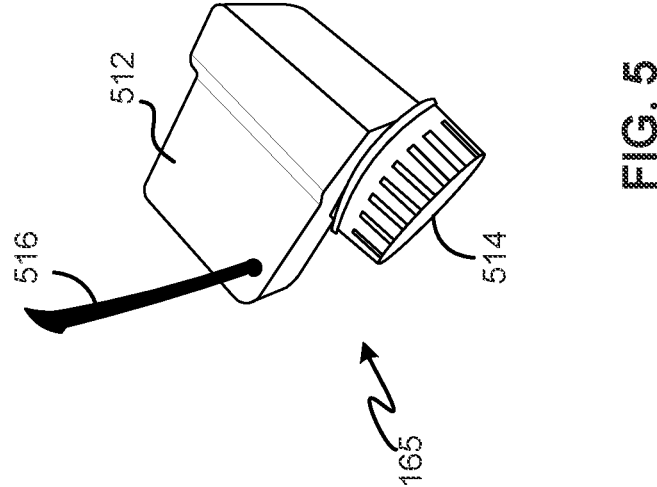
FIG. 5 depicts a simplified perspective view of a radio adapter in accordance with some embodiments.

FIG. 5 depicts a simplified perspective view of a radio adapter 165 in accordance with some embodiments. The radio adapter 165 includes a housing 512, battery compartment 514 (which may be a separate compartment and/or separate watertight compartment), and an antenna 516 that cooperates with a wireless receiver, transmitter and/or transceiver (not shown) within the housing 512. Additionally, the radio adapter includes one or more communication interfaces, ports, cords, cables or the like (not depicted in FIG. 5). At least one of these communication interfaces is configured to cooperate with the communication interface 414 of the control module. In some embodiments, the communication interface of the radio adapter is an optical communication interface that can cooperate with and/or otherwise mate with the communication interface 414 of the control module 160. The cooperation between communication interfaces can be substantially any cooperation, such as but not limited to threaded, male-female compression fit, snap-fit, or other relevant coupling. Further, the radio adapter 165 typically includes (although not depicted in FIG. 5) one or more processors, controllers, memory, wireless signal receivers, transmitters and/or transceivers, detectors, decoders and encoders positioned within the housing 512. The radio adapter can also be configured to be battery-operated. As such, the radio adapter battery, in at least some embodiments, is configured to provide the only power to the radio adapter.

Like the control module 160, in many implementations the housing 512 is sealed to inhibit or prevent water from entering the housing. For example, in some instances, the radio adapter 165 is configured to meet and/or exceed an Ingress Protection Rating of IP68, potted and can be fully submersible. The housing 512 of the radio adapter 165, in at least some implementations, can be constructed of plastic, Acrylonitrile butadiene styrene (ABS), Polyvinyl chloride (PVC), wood, metal or other relevant materials or combinations thereof that are compatible with and/or do not interfere with the wireless communication. In some instances, the housing is formed through an injection molding or process (e.g., ABS injection), with ultraviolet (UV) stabilized plastic material. The housing and/or seams of the housing can be sealed, and in some embodiments is potted to obtain IP68 conformity (e.g., 100% watertight and entirely submergible). The embodiment of the radio adapter 165 shown in FIG. 5 is separate from the control module 160 and is in communication with and/or cooperated with the control module 160 through one or more communication interfaces. In other embodiments, however, the radio adapter 165 can be implemented as part of the control module 160, e.g., integrated with or within the housing of the control module 160.

In some embodiments, the radio adapter 165 is a microprocessor-based wireless receiver (and in some instances wireless transmitter) device that receives programming and/or irrigation scheduling and communicates the programming and/or commands to the control module 160. The wireless communication can be substantially any radio or other wireless communication, such as but not limited to wireless communications in the industrial, scientific and medical (ISM) radio bands (as defined by the ITU-R (International Telecommunication Union, radio communication sector) in 5.138, 5.150, and 5.280 of the Radio Regulations), for example 868 and 915 MHz, for the single cooperated control module 160, or other relevant wireless communication and/or communication bands. Some embodiments may additionally implement frequency hopping (e.g., frequency hopping spread spectrum) or direct sequence spread spectrum. The use of the direct sequence spread spectrum can be implemented using one frequency with a relatively large bandwidth (e.g., +/−100 KHz, +/−250 KHz, or the like). The transmitted signal may take up more bandwidth than the information signal that is being modulated, but typically cause limited or no interference for other systems and/or system components. The receiving device demodulates the signal to recover the initial information. The direct sequence spread spectrum may provide some advantages over the frequency hopping spread spectrum method, such as but not limited to, increased battery life duration (e.g., synchronization may not be needed), increased radio rate (e.g., a slack period may be avoided that might otherwise be included due to synchronization phase), simplified installation of the wireless and/or radio communication network 115 or the addition of a new device on an existing wireless communication network 115 (e.g., no synchronization needed), may not have to operate with a precise frequency (e.g., drift due to temperature or other such factors), and can provide good interference immunity (e.g., by choosing a productive spreading code).

The wireless communication range between the field transmitter 125 (e.g., transmitting at 25 mW) and the radio adapter 165 incorporated below ground level in a plastic valve box is configured to be at least five feet, but in some instances can be as much as 200 feet or more, and is typically limited by the transmission power of the field transmitter 125. The wireless communication between the radio adapter and an MRM 130, RR 135 or other relevant repeater can be greater, such as in the range of as much as about 1000-1500 feet or more (with a 25 mW transmission power), depending on the relative positioning (e.g., height of the antenna), obstacles and the like. Typically, the communication between the radio adapter 165 and the control module 160 is also wireless, such as optical (e.g., infrared communication). The antenna 516 of the radio adapter 165 couples with the receiver, transmitter and/or transceiver within the housing 512 and extends from the housing 512.

The radio adapter 165 is configured to communicate information (e.g., parameters, irrigation programs and/or schedules, operating conditions, battery levels, sensor information, and the like) to and/or receive information (e.g., schedules, sensor information, etc.) from the MRM 130, satellite irrigation controller 120 and/or central irrigation controller 110. In some implementations, the radio adapter 165 is configured to communicate and/or act as a radio relay that communicates or relays information (e.g., parameters, irrigation programs and/or schedules, operating conditions, battery levels, sensor information, and the like) between the control module 160 and the MRM 130, satellite irrigation controller 120 and/or central irrigation controller 110.

It is noted that the control modules 160 with which a radio adapter 165 may cooperate may vary, having different functionalities and/or capabilities. For example, some control modules 160 may have limited memory, have older processors and/or irrigation control software, and/or have other limited capabilities. In some instances, the control module may be a legacy control module and/or earlier version of a control module with a first function set, while other control modules may be later versions, newer or upgraded control modules with a second function set, where the first function set is a reduced function set or has limited functions relative to the second function set that provides enhanced, greater or different functionalities. Accordingly, in some embodiments, the radio adapter 165 is further configured to detect a type of control module 160 with which the radio adapter is communicationally coupled. Based on this identification the radio adapter 165 may perform different functions. For example, when the radio adapter 165 detects that the control module 160 is a legacy control module and/or has a certain first level of functionality that is less than a second level of functionality for another type of control module, the radio adapter 165 may serve as an irrigation program controller as well as operate as a radio relay.

In some instances, the radio adapter may copy the one or more irrigation commands and/or irrigation programs to be implemented by the control module 160. The radio adapter can implement the irrigation commands and/or irrigation schedules using the functionality of the legacy control module to open or close valves. Accordingly, in some instances, the radio adapter 165 can provide functionality to the combination of the radio adapter and the legacy control module to provide functionality that is at least similar to or the same as newer control modules or control modules with enhanced or greater functionality than the legacy control module. In some implementations, the control module 160 can operates as a slave to the radio adapter implementing instructions from the radio adapter 165.

Alternatively, when the radio adapter 165 detects that the control module 160 is an enhanced control module and/or has a greater level of functionality, the radio adapter 165 may simply serve as a radio relay. In some embodiments, the radio adapter 165 may further be configured to detect when it has been moved from coupling to a first type of control module to a second different type of control module and notify the MRM 130, satellite irrigation controller 120 and/or central irrigation controller 110, and/or take appropriate action relative to its operation relative to the different functionalities available to the second control module.

The radio adapter 165 can further provide control modules 160 with additional functionality. In some instances, one or more irrigation programs and/or schedules on a control module 160 can be copied the radio adapter 165, which in part can add new irrigation functionalities without modification of the control module, software of the control module and/or firmware of the control module.

As described above, in some instances, the radio adapter 165 is operated from battery power, which can be substantially any battery having sufficient stored energy to power the reception and/or transmission of wireless communications and the forwarding and/or reception of information to the control module 160 (e.g., a single alkaline 9V battery 6AM6 type (international certifications) or 6LR61 type (European certifications)). In other instances, the radio adapter 165 may obtain power from the control module 160 or other device with which the radio adapter connects. The cooperation between the radio adapter 165 and the control module 160 provides an optical communication path (e.g., infra-red communication). Further, a water tight seal may be established to prevent water from interfering with the optical communication.

Figures 6, 7A:
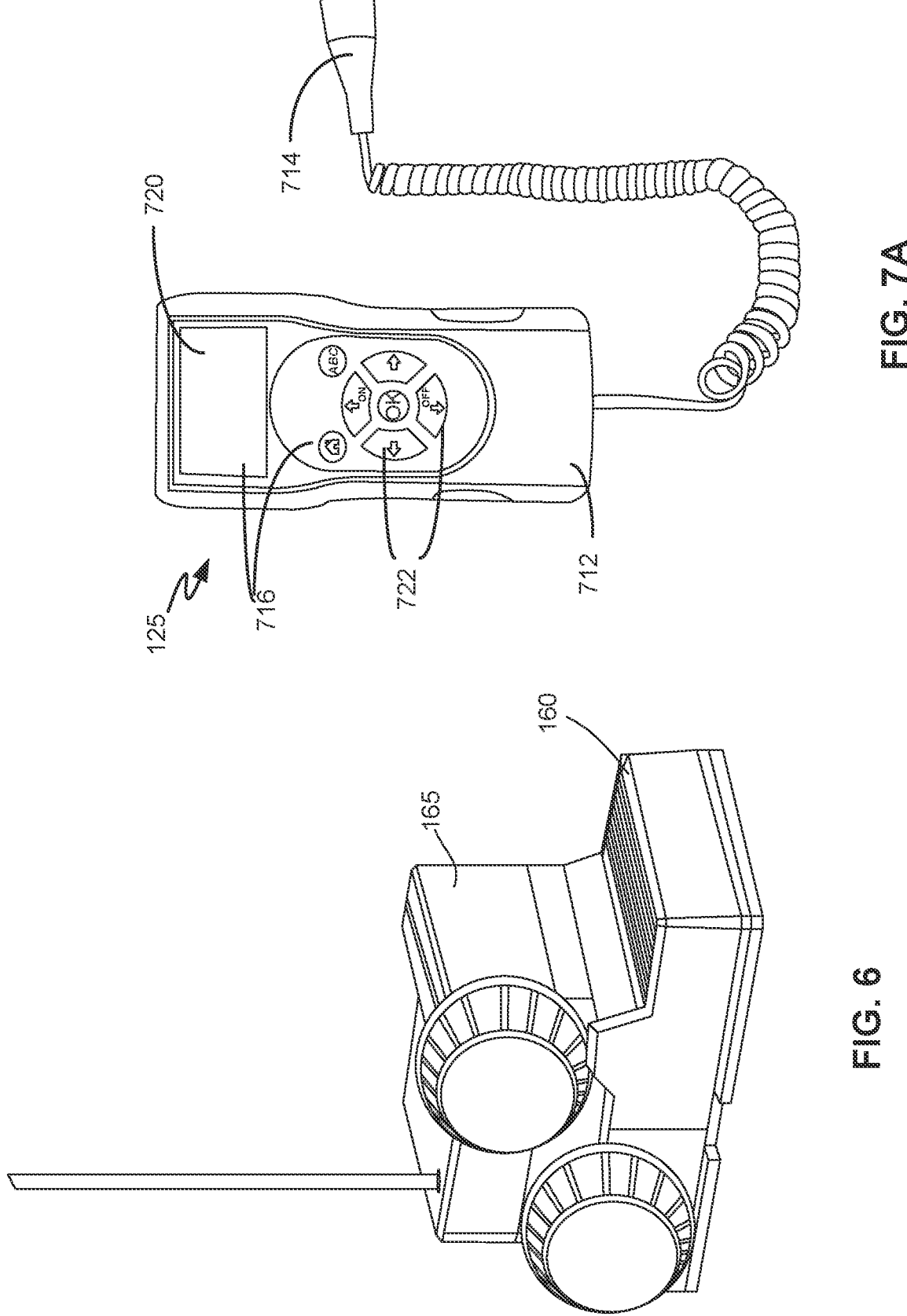
FIG. 6 depicts a perspective view of a control module cooperated with a radio adapter in accordance with some embodiments.
FIG. 7A depicts a simplified overhead view of a field transmitter in accordance with some embodiments.

FIG. 6 depicts a perspective view of a control module 160 cooperated with and in communication with a radio adapter 165 in accordance with some embodiments. The radio adapter 165 is physically cooperated with and secured with the control module 160. For example, the radio adaptor 165 can be secured with the control module 160 such that the optical communication interface 414 of the control module is aligned with a similar optical communication interface or port on the radio adapter 165. In some instances, the optical interfaces seal together through a male-female cooperation. The control module 160 and the radio adapter 165 may, in some instances, include additional latching, tongue-and-groove, snap-fit, grooves, recesses, extensions, and/or other such mechanisms for maintaining the positioning between the control module 160 and the radio adapter 165. The radio adaptor 165 can be cooperated with the control module 160 through other communication mechanisms, such as through other wired communication, wireless communication or the like. Similarly, when the radio adapter 165 is physically cooperated with the control module, the physical cooperation can be through substantially any method, such as but not limited to sliding into a slot, snap fit, latching, adhesive, clamps, compression fit, and other such methods. In some implementations, the radio adaptor 165 is incorporated with or into the control module 160 as a single device or unit.

FIG. 7A depicts a simplified overhead view of a field transmitter 125 in accordance with some embodiments. The field transmitter 125 includes a housing 712, a physical direct connection interface or cord 714 (e.g., optical or fiber optic cable), and a user interface 716. Further, as described above, the field transmitter further comprises one or more processors, controllers, memory, wireless signal transmitters, receivers, and/or transceivers, detectors, decoders and encoders positioned within the housing 712. In some instances, one or more additional communication interfaces (e.g., USB or other such communication interface) can be included to allow the field transmitter 125 to communicate with the central irrigation controller 110, computer, MRM 130, RR 135 or other relevant device. The field transmitter 125 is typically battery operated, often through a rechargeable battery. Accordingly, one or more of the communication interfaces can further provide power to charge the battery, or another port can be included to receive power. In some embodiments, the battery of the field transmitter can be rechargeable, such as through an AC external power plug.

The field transmitter 125 is configured to communicate with and provide configuration and programming to the control modules 160 and radio adapters 165. The communication can be via wireless communication through the radio adapter 165 and/or through direct communication using the connection cord 714, which in some embodiments establishes Infrared communication. The cooperation of the direct connection cord 714 and the communication interface 414 of the control module 160 can be through substantially any cooperation, such as but not limited to threaded, press-fit, snap-fit, compression fit and other relevant methods. The field transmitter 125, in at least some embodiments, is further configured to provide wireless communication with one or more radio adapters 165 and control modules 160, MRMs 130, RRs 135 and/or other relevant devices. An irrigation network can be implemented without the central irrigation controller, MRM and RRs, and using the control modules, radio adapters 165 and field transmitters. The central irrigation controller 110, the MRMs 130 and/or RRs 135, however, provides additional functionality, control, cooperation, enhanced distribution, and other features to the irrigation system 100.

In some embodiments, the direct connection cord 714 is removable from the field transmitter 125 such that the field transmitter solely provides wireless communication when removed. For example, the field transmitter 125 can include a removable panel that can allow the direct connection cord 714 to be disengaged from an optical transmitter and/or transceiver internal to the housing 712. Again, the field transmitter 125 can wirelessly communicate with radio adapters 165, MRMs 130 and/or RRs 135 through radio or other wireless communication, such as but not limited to one or more of the ISM radio bands. The ranges of wireless communication can vary depending on many factors, such as transmission power, obstacles, interference and the like. In some instances, the field transmitter has a range with the radio adapter positioned in a valve box and transmission at 25 mW to be at least 5 ft, and in some instances can be 350 ft. Communication ranges with the MRM 130 and/or RR 135 is typically greater. In some implementations, the field transmitter 125 can further communicate wirelessly with one or more control modules 160 through an MRM 130 and radio adapter equipped control module and/or through a RR 135 and radio adapter equipped control module. Some embodiments additionally provide secure or private communications. For example, security software and/or a security chip can be included in a field transmitter 125, MRM 130, RR 135, control modules 160, and/or radio adapter 165 to provide a challenge and/or authenticate security protection to radio and/or optical communications between components of the irrigation system 100. These protections can, in some instances, prevent components of the irrigation system from intercommunicating unless they have succeeded in authenticating each other. Additionally, in some embodiments, the field transmitter 125 can be configured to measure radio ranges in the field between MRM and RRs, between RRs, and between MRM or RR and a radio adapter. This can aid a user, at least in part, in identifying placement of RRs, radio adapters and the like in configuring the irrigation system 100.

Still referring to FIG. 7A, the user interface 716 of the field transmitter can include one or more of a display 720, buttons 722, scroll wheel and/or other such mechanisms allowing the user to interact with the field transmitter 125. For example, the display 720 can be a Liquid Crystal Display (LCD), LCD with backlighting, touch screen display, and/or other relevant display. The buttons 722 or other user interaction options, which can be physical and/or displayed, can allow the user to access information displayed through the display and/or to activate the field transmitter 125 to take action, such as to communicate programming and/or scheduling to a control module 160. Accordingly, the display can display a large amount of information, for example, through the display of various menus (which may be displayed in accordance with a user selected language). Further, the user interface 716 can allow a user to view operations of the field transmitter 125, receive information about the field transmitter, the irrigation system 100, a control module 160, sensors, or other device of the system, input information and/or irrigation schedules and take other actions.

The field transmitter 125 can be powered by an AC power source and/or battery (e.g., one or more rechargeable batteries). The display 720 can show menus that can be used by the user. In some instances, the menus are displayed as scrolling menus. In some instances, the field transmitter can allow a user to define a name for the field transmitter, a control module 160, radio adapter 165, irrigation valve, irrigation station and/or irrigation program. The field transmitter can be configured to allow a user to select one of a plurality of desired languages. One or more irrigation programs can be locally saved within the field transmitters. These saved irrigation programs can be communicated to control modules and/or used to restore a control module. Further, the field transmitter may provide a rain delay function or instruction (e.g., 1 to 14 days) that can be communicated to one or more control modules 160 and/or radio adapters 165. In some embodiments, the field transmitter 125 (and/or the central irrigation controller 110) can check irrigation programs of control modules 160 and/or check the implementation or history of these programs.

In providing irrigation programming to a control module 160 and/or radio adapter 165, the field transmitter in some implementations can be configured to allow a user to select one or more irrigation cycles per irrigation program (e.g., one or more of cycles A, B or C). Further, in some embodiments, the field transmitter may define a water budget per program (e.g., A/B/C) and/or per month (which may be defined by the central irrigation controller 110, a user or obtained from another source, such as third party source). In some embodiments, the field transmitter 125 is further configured to allow a user to initiate manual actions (e.g., activate an irrigation program, station or valve, interrupt irrigation, cancel irrigation (total or partial), delay irrigation, or other such actions). Additionally, the field transmitter 125 may display information to the user, such as irrigation station status information, sensor information, scheduling, and other relevant information.

Figure 7B:
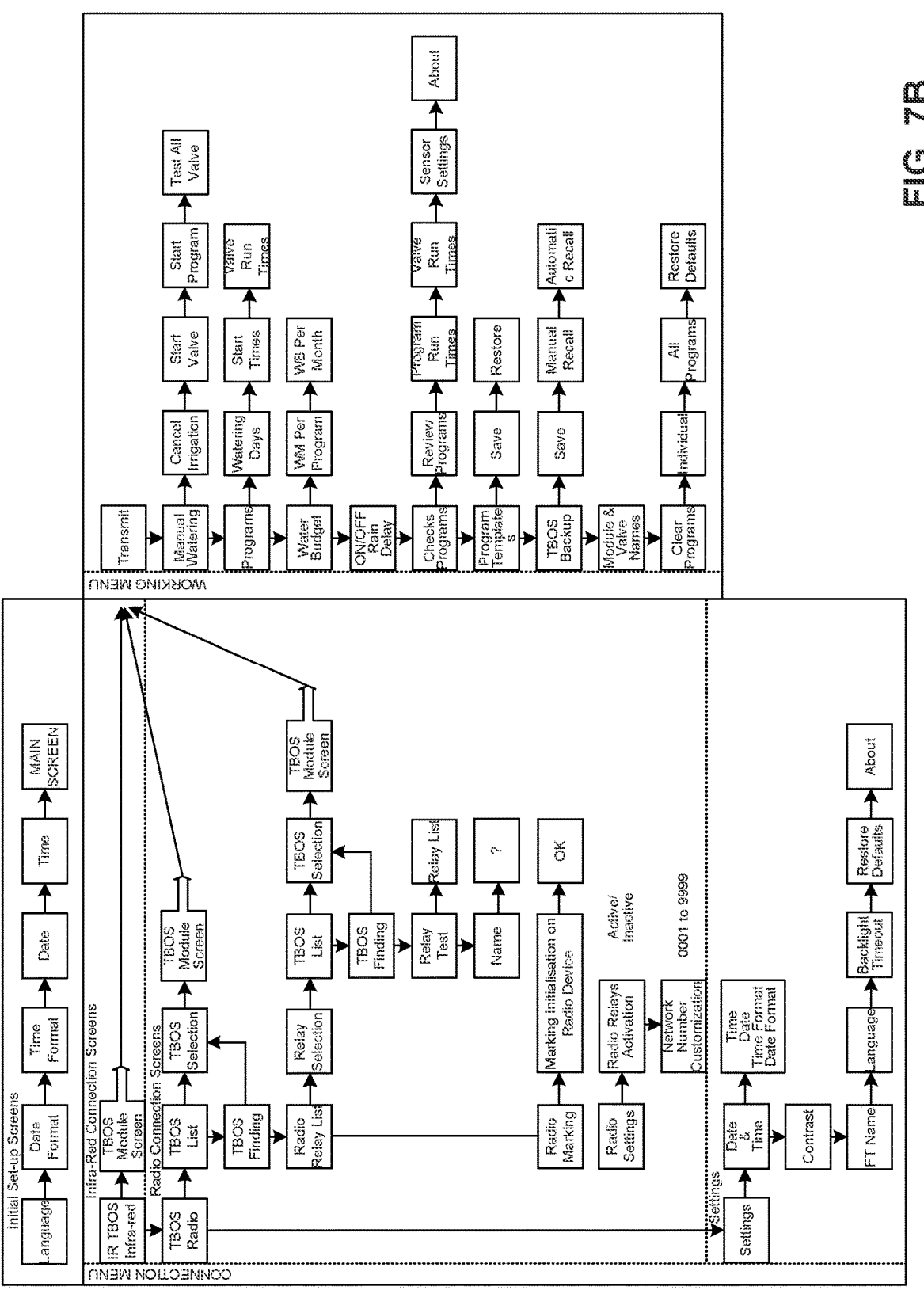
FIG. 7B shows a block diagram representation of menu access and/or user interface menus accessible through the field transmitter 125 in accordance with some embodiments.

FIG. 7B shows a block diagram representation of menu access and/or user interface menus accessible through the field transmitter 125 in accordance with some embodiments. In some embodiments, the same or similar menu access and/or user interface menus may be available through the central irrigation controller 110 and/or an MRM 130 through a user interface of a satellite irrigation controller 120.

In some embodiments, the field transmitter 125 is configured to display relevant menus depending on the type of connection, the device the field transmitter is communicating with, the functionalities and/or programming of the device being communicated with, and other factors and/or combinations thereof. For example, the field transmitter 125 may display menus and/or functions according to different menu sets. A first menu set may be implemented by the field transmitter, for example, when the field transmitter is directly coupled (e.g., Infrared link) with a limited capability control module 160 and/or legacy control module. A second menu set may be implemented by the field transmitter when directly connected (e.g., Infrared link) with a control module having greater capabilities than the limited or legacy control modules; or when connected through a radio adapter 165 with a limited capability, legacy or advanced capability control module 160. A third menu set may be implemented by the field transmitter when connected through a radio adapter with a control module 160 configured to cooperate with the central irrigation control software. A fourth menu set may be implemented when the field transmitter 125 is connected through a radio adapter 165 with a limited capability or legacy control module 160 when the control module is configured to cooperate with the central irrigation control software. Other menu sets can also be provided. Similarly, still other menus and/or menu sets may be provided when the field module is in communication with an MRM 130 or RR 135. The variations in capabilities, functions and the like provided through the different menu sets can depend on the control modules and/or radio adapters.

Various menus, controls and features can be accessed through the field transmitter 125, used to implement communication and/or to program the control modules 160 and/or radio adapters 165. Some of the menus and/or menu features can include: initial configuration of the field transmitter 125, setting time/date, adjusting the contrast, customize the field transmitter name, field transmitter language selection, setting the screen lighting time, restore initial settings, displaying field transmitter data, programming the field transmitter, creating irrigation schedules, defining watering days, setting start times, setting watering run times, transmitting irrigation time, date and program, defining water budget programming, setting seasonal adjustment (e.g., per program, per month, etc.), reading irrigation programs, transmitting an irrigation programs, canceling irrigation (in total, partial), manual station launch, manual program launch, irrigation test on one or more or all stations, rain ON/OFF and/or rain delay, saving irrigation programs, saving irrigation programs into a control module 160 and/or radio adapter 165, customization of control modules and stations names, radio marking, defining or changing a network number of radio devices, radio finding of radio adapters, receiving a program from the control module via radio, transmitting a program via radio, accessing sensor information, configuring sensors and/or sensor thresholds (e.g., as configured by the irrigation control software of the central controller), network building (e.g., radio range increase between field transmitter and radio adapter, optimum radio range between field transmitter and radio adapter, communications with MRM 130 and RRs 135), relay radio marking, and/or other such features, functions and/or options.

Figures 8, 9:
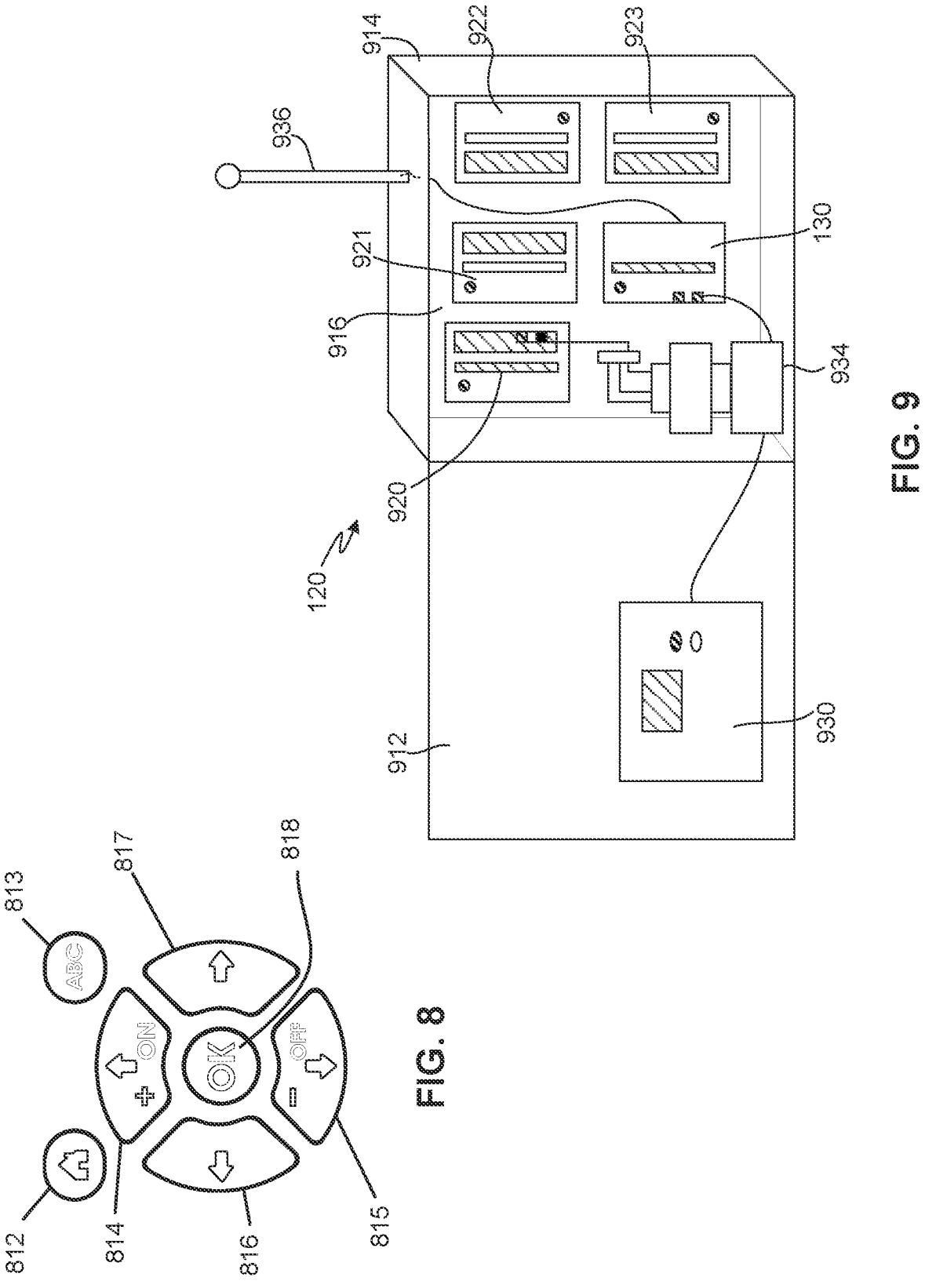
FIG. 8 depicts a simplified example of buttons of a user interface of the field transmitter of FIG. 7A, in accordance with some embodiments.
FIG. 9 depicts a simplified diagram of a satellite irrigation controller cooperated with a Master Radio Module (MRM), according to some embodiments.

FIG. 8 depicts a simplified example of buttons 812-818 of a user interface 716 of a field transmitter 125 in accordance with some embodiments. In some embodiments, the buttons can provide one or more functions, which may depend on a state of operation and/or the information or options presented on the display 720. For example, in the embodiment depicted in FIG. 8, the buttons can include a main menu or home button 812, an irrigation program navigation button 813, up, down, left and right buttons 814-817, respectively, and an enter, select and/or "OK" button 818. The main menu button 812 can, when selected, cause the field transmitter 125 to return to and display a main menu that allows the user to interact with the field transmitter. In some instances, the main menu button 812 can further act as a power button by, for example, pressing and holding the main menu button for a predefined period of time (e.g. 2-3 seconds).

The irrigation program navigation button 813 can allow a user to transition between different irrigation programs. For example, in some embodiments, a control module 160 can implement 1-3 different irrigation schedules and/or the field transmitter 125 may be programmed with one or more irrigation schedules (e.g., 1-3 different irrigation schedules). Accordingly, the irrigation program navigation button 813 allows a user to transition between the different irrigation schedules.

The up button 814 may provide multiple different functions depending on a state of operation. For example, the up button 814 may cause a scrolling upwards through a menu; may cause an increase in a numerical value (or higher value) when a data input mode is displayed; may cause a confirmation of watering day "ON" or station "ON" mode of operation when defining an irrigation schedule or a manual override; and/or other such functions. Similarly, the down button 815 can provide multiple functions depending on a state of operation, such as but not limited to, a scrolling down through menus; a decrease in a numerical value; a confirmation of an "OFF" watering day or station "OFF" mode of operation; and/or other such functions. The left button 816 can provide functions such as, but not limited to, causing a scrolling left through different menus; transitioning through a menu to an option to the left; causing a transition to a previous menu (e.g., a "back" command); resetting a numerical value; validating an entry; and/or other such functions. The right button 817, similar to the left button, provides functions such as, but not limited to, causing a scrolling right through different menus; transitioning through a menu to an option to the right; causing a transition to a subsequent menu (e.g., a "forward" command); confirming an input; and/or other such functions. The "OK" button 818 can also provide different functions depending on a state of operation of the field transmitter 125 and/or the device (e.g., MRM 130, RR 135, radio adapter 165 and/or control module 160) in communication with the field transmitter. For example, the OK button 818 can provide a confirmation of an input, a selection of a highlighted entry in a menu, enabling or disabling an input on a displayed menu or user interface, and/or other such functions. In some instances, one or more of the buttons can activate a radio marking operation with one or more devices intended to be incorporated in the irrigation system 100.

Referring back to FIG. 1, the central irrigation controller 110 can be a dedicated central irrigation control device or can be implemented through a computer, such as a desk top computer or laptop, multiple computing devices, computers, servers and/or such devices distributed over one or more networks (e.g., local area network, home area network, a wide area network and/or the Internet), or other relevant devices or combinations of devices. Further, the central irrigation controller 110 can receive modifications to irrigation scheduling and/or can determine adjustments to irrigation scheduling, such as adjustments with regards to environmental conditions, pump loads, volumetric water budgets, scheduling changes at one or more satellite irrigation controllers 120 or control modules 160, power issues, other problems or the like. The central irrigation controller 110 can communicate with the satellite irrigation controllers 120 through wired or wireless communication methods.

Typically, the central irrigation controller 110 can further communicate over a distributed network with one or more other remote devices and/or services, such as a weather data service, an evapotranspiration (ET) data service, a water authority, historic information service or storage device (e.g., historic weather data, historic ET data, and other such historic data), and other relevant devices and/or services. Further, in some instances, the central irrigation controller 110 can be remotely accessed by one or more users from over a network via a computer, wireless device (e.g., personal digital assistant, cellular phone, laptop, or other such wireless device), or other such devices.

The one or more satellite irrigation controllers 120 can further couple with one or more irrigation valves to control the water flow to one or more water distribution devices and/or systems (e.g., sprinklers, drip lines, etc.) in implementing one or more irrigation schedules. For example, the satellite irrigation controllers 120 can be implemented through one or more of the satellite irrigation controller embodiments described in U.S. Pat. Nos. 7,640,079, 7,844, 367, U.S. patent application Ser. No. 12/837,381, filed Jul. 15, 2010, for Marsters et al., entitled METHOD AND APPARATUS FOR PROGRAMMING A DECODER-BASED IRRIGATION, and/or U.S. patent application Ser. No. 13/224,140, filed Sep. 1, 2011, for Marsters et al., entitled METHODS AND SYSTEMS FOR USE IN CONTROLLING IRRIGATION (all of the above are incorporated herein by reference), satellite irrigation controllers available from Rain Bird Corporation (e.g., ESP-LX series of satellite irrigation controllers (e.g., ESP-LXME, ESP-LXMEF, ESP-LXD, etc.), and/or other Rain Bird satellite irrigation controllers), or other such relevant satellite irrigation controllers.

Further, in some embodiments, the MRM 130 is cooperated with a satellite irrigation controller 120. For example, the MRM 130 may be positioned exterior to the satellite irrigation controller 120 and communicationally coupled with the satellite irrigation controller. In other embodiments, the MRM 130 may be positioned within the satellite irrigation controller and receive power from the satellite irrigation controller. Further, in some instances, the MRM 130 can be positioned within a module slot of a modular satellite irrigation controller configured to receive one or more modules that provide various functionalities to the satellite irrigation controller.

FIG. 9 depicts a simplified diagram of a satellite irrigation controller 120 cooperated with an MRM 130, according to some embodiments. The satellite irrigation controller 120 can communicationally couple with the central irrigation controller 110 through wired or wireless communication at least in part to receive irrigation scheduling. Further, the satellite irrigation controller 120 can receive or communicate new irrigation scheduling, modifications or overrides to irrigation scheduling, and/or can determine adjustments to irrigation scheduling. In some embodiments, the satellite irrigation controller 120 may be a decoder-based satellite irrigation control system. For example, the satellite irrigation controller 120 can send operational power and data over a multi-wire (e.g., 2 or 3 wire) transmission line to one or more decoder units (e.g., decoder units) each coupled at various locations to the multi-wire line (not shown). Each decoder unit derives operational power from the multi-wire line and controls the operation of one or more irrigation valves or other sprinkler devices. The satellite irrigation controller 120 can functionally include or be coupled to a field interface device that modulates or encodes data, typically on a power waveform, to power and address and communicate with the decoder units. For example, the satellite irrigation controller 120 may include an encoder module that can encode signals onto the multi-wire transmission line. Decoder-based systems are generally well-known in structure and operation by those of ordinary skill in the art. An example of a known decoder system includes the PAR+ES Decoder controller system and FD-101, FD-102, FD-202, FD-401 and FD-601 decoders commercially available from the Rain Bird Corporation.

In many embodiments, the satellite irrigation controller 120 includes a control panel 912 cooperated with a housing 914. The control panel 912 can include a user interface (not shown) that can comprise, for example, one or more displays, buttons, rotary dial, switches, indicators, light emitting diodes (LEDs), and/or other features and/or elements. In many instances, the control panel 912 can be removably secured within the housing 914. In FIG. 9 the control panel 912 is rotationally secured with the housing allowing the control panel 912 to swing out exposing a backside of the control panel and to expose a back plane 916 positioned within the satellite irrigation controller housing 914. As introduced above, in some instances the satellite irrigation controller 120 can be a modular irrigation controller with one or more modules 920-923 cooperated with the back plane 916 and communicationally coupled with the control panel 912 through the back plane and one or more communication connectors between the control panel 912 and the back plane 916 (e.g., bus, ribbon cable, etc.).

In some embodiments, the control panel 912 can further cooperate and/or receive a communication interface or Network Communication Cartridge (NCC) 930. The NCC 930 couples with the control panel 912 and, in some instances, mounts to and/or within the backside of the control panel (e.g., within a receiving port or interface of the control panel). The NCC 930 establishes and provides one or more wired communication links (e.g., employing an RS-232 communication link, Ethernet, fiber optic, telephone, or other such links or combinations of such links) and/or wireless communication link (e.g., wireless Local Area Network (LAN) communication (Wi-Fi), cellular (e.g., GPRS), radio frequency, optical, or other such wireless communication protocols or combinations of such protocols) between the control panel 912 and one or more of the central irrigation controller 110, other satellite irrigation controllers, sensors and/or one or more MRMs 130.

Typically, the communication between the NCC 930 and the MRM 130 is over a separate wired communication link (e.g., RS-485 bus, ribbon cable, coaxial cable, etc.), the back plane 916 or other communication path. In some embodiments, memory of the NCC 930, and/or in cooperation with memory of the control panel 912 and/or the MRM 130, stores executable program code or instructions that when executed by a processor of the NCC causes the NCC to perform one or more functions, such as but not limited to communicating with other devices, communicating with the control panel 912, communicating with an MRM 130, communicating with another NCC of another satellite irrigation controller, reflashing the control panel 912, and/or other such functions. In some instances, the NCC 930 can be implemented from an NCC provided by Rain Bird Corporation. The MRM 130 can appear to the satellite irrigation controller 120, in at least some embodiments, as a client satellite to the control panel 912.

Additionally, in some embodiments, the satellite irrigation controller 120 can communicate with the MRM 130 and/or implement some control relative to the MRM, one or more RRs, or one or more control modules 160 within an MRM network 140 associated with the MRM associated with the satellite irrigation controller 120. For example, the satellite irrigation controller can cause the MRM 130 to initiate one or more manual commands and/or the control panel 912 of the satellite irrigation controller 120 can include a display (not shown in FIG. 9) that can be used to display information about one or more control modules 160, radio adapters 165, the MRM 130 and/or RR within an MRM network 140, which may have been obtained in some instances through the manual commands. These commands and/or information can include substantially any relevant commands and/or information such as, but not limited to, display battery level, test battery level, time stamp of last battery level check, start valve or station, start irrigation program, cancel all, test all valves or stations, rain delay, auto/off, synchronize, reverse synchronize, retrieve logs, MRM/RR firmware or other programming version, update MRM/RR firmware or programming, and/or other such information or commands.

Still referring to FIG. 9, one or more MRMs 130 can be coupled with or installed in the satellite irrigation controller 120. For example, the MRM 130 may be positioned in one or more module mounting slots of the back plane 916. The MRM 130 can, in some implementations, receive power through the satellite irrigation controller 120, for example, from a transformer 934 cooperated with the back plane 916. The MRM 130 couples with an antenna 936 to provide the wireless communication. As described above, there may also be other satellite irrigation controllers 120 that include an MRM and/or other satellite irrigation controllers 120 that do not include an MRM that are part of a larger irrigation system 100.

The NCC 930 can support telemetry from the satellite irrigation controller 120 and the MRM 130 to the central irrigation controller 110 or another satellite irrigation controller. The MRM 130 provides wireless communication with the one or more control modules 160 through coupled radio adapters 165, one or more RRs 135 and/or the field transmitter 125. The communication between the MRM 130 and the one or more RRs 135 can further relay information between the MRM 130 and the control modules 160. The wireless range of the MRM can depend on the device receiving the communication, the obstacles or barriers between the MRM and the receiving device, absorption, reflection, antenna position, the transmission power and/or other relevant factors, and typically a combination of multiple factors. In some implementations, the MRM 130 wirelessly transmits using 25 mW power in one or more of the ISM bands or other wireless communication bands. At this power, the range between the MRM and an RR can be about 4000 feet in an open environment. This range may be greater in some instances, such as with an RR being positioned above ground level (e.g., 6-50 ft or more above ground level). Again, the range can vary depending on implementation, power, etc. In some instances, the MRM 130, RR 135 and/or other devices of the irrigation system 100 may additionally implement frequency hopping (e.g., frequency hopping spread spectrum) or direct sequence spread spectrum, as described above.

The MRM 130 can be configured to communicate with substantially any number of control modules 160, RRs 135 and/or field transmitters 125. In some configurations, however, the number of control modules 160 that can be directly supported by an MRM 130, and/or the number of RRs 135 that can be supported may similarly be limited. For example, an MRM 130 may in some instances be configured to directly support up to 32 control modules 160, and to further support wireless communication with up to 15 RRs 135, which allows the MRM 130 to support communication with a total of up to 512 control modules 160 from RRs 135 interfaced to the MRM 130 (e.g., 32 control modules supported directly from the MRM and an additional 480 control modules (i.e., 32 control modules×15 RRs)). Other implementations can be configured to support larger or smaller numbers of modules, RRs, MRMs, and/or other devices (e.g., depending on memory, processing capabilities, communication protocol utilized, etc.).

Similarly, the central irrigation controller 110 can support substantially any number of MRMs 130, RRs 135 and/or control modules 160. Again, however, some embodiments may apply limits due, for example, to memory capacity, bandwidth, delays and other relevant factors. For example, the central irrigation controller 110 and/or central irrigation control software implemented by the central irrigation controller may be configured to manage up to about 250 MRMs by different communication modes. This configuration, however, could enable potentially up to 128,000 control modules 160 (i.e., if each of the 250 MRMs were loaded to a 512 control modules per corresponding MRM network). Again, some further limits may apply in some configurations where, for example, each MRM may be limited to manage up to 512 control modules 160 (e.g., directly controlling up to 32 control modules, and up to an additional 480 control modules through up to 15 RRs 135, where the RRs are limited to manage up to 32 control modules). Accordingly, limits to the number of MRMs 130, RRs 135 and/or control modules 160 may apply for a given irrigation system 100.

Figures 10, 11:
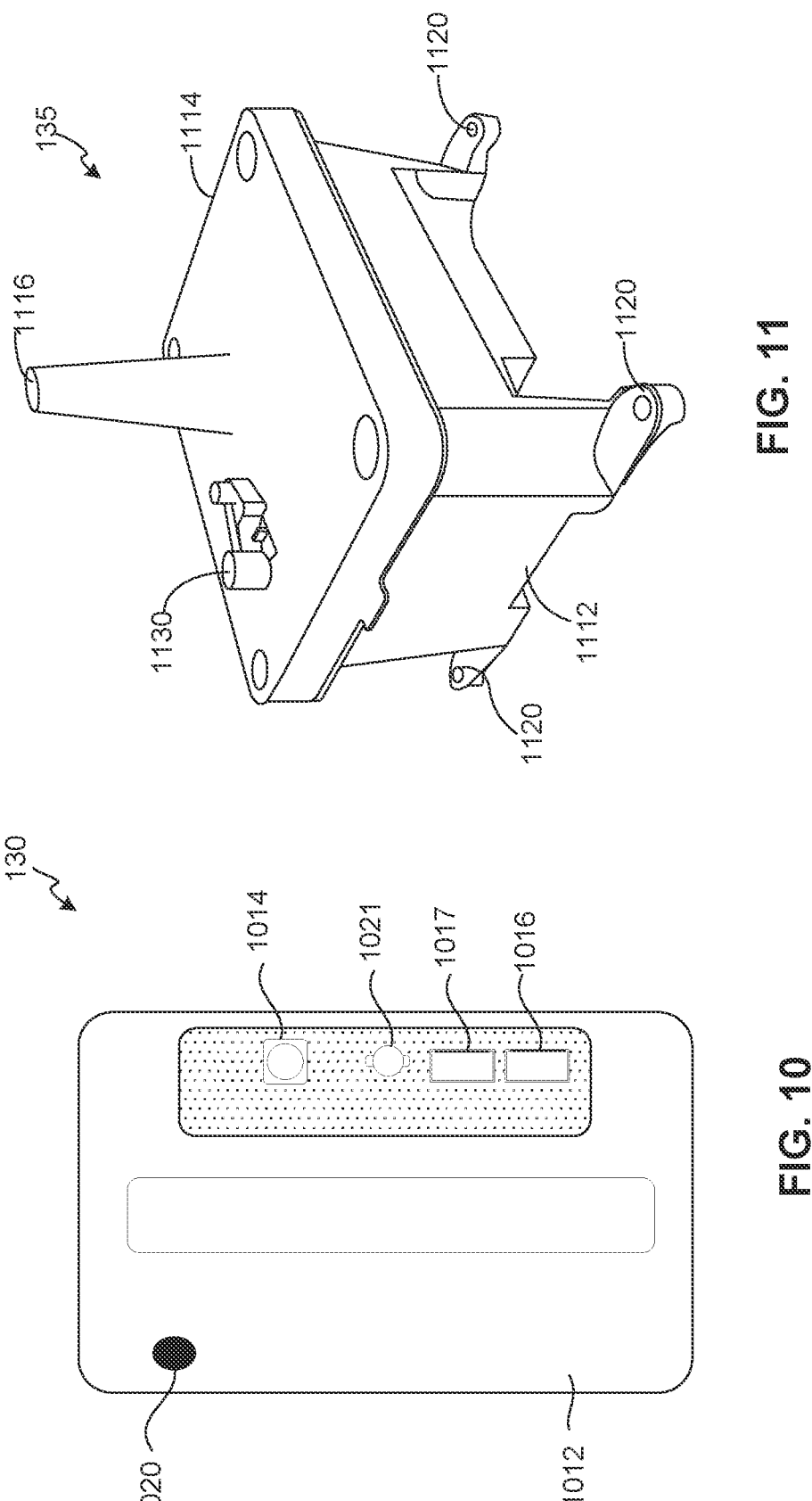
FIG. 10 depicts a simplified overhead view of an MRM according to some embodiments.
FIG. 11 depicts a perspective view of a Radio Relay (RR) according to some embodiments.

FIG. 10 depicts a simplified overhead view of an MRM 130 according to some embodiments. The MRM 130 includes a housing 1012, an antenna connector 1014 and one or more communication interfaces or ports 1016-1017. In some embodiments, one or more indicators 1020-1021 can be included (e.g., LEDs) that indicate operations and/or states. The MRM 130 can further include mountings or other structure (not shown) to allow the MRM to cooperate with the back plane 916 of the satellite irrigation controller 120.

One or more of the communication interfaces 1016 can be configured to allow the MRM 130 to connect with the NCC 930. Further, in some embodiments, a second communication interface 1017 can connect with another MRM 130 to allow daisy chaining of MRMs and increase the number of control modules that can be controlled without having to employ a second satellite irrigation controller 120. In some instances, an MRM may have a fixed address on a communication bus, and accordingly, a single MRM may be addressed over the bus. The antenna connector 1014 is configured to connect the MRM 130 with the antenna 936. In some embodiments the antenna 936 extends exterior to the satellite irrigation controller housing 914 (e.g., through a punch-out in the housing).

FIG. 11 depicts a perspective view of an RR 135 according to some embodiments. The RR 135 of FIG. 11 includes a housing 1112 with a lid 1114. The housing contains one or more processors, controllers, memory, wireless signal receivers, transmitters and/or transceivers, detectors, decoders, encoders, antenna, and/or other relevant parts. The housing 1112 and/or lid 1114 can be constructed of plastic, PVC, metal, wood, fiber glass, or other relevant materials or combinations of such materials. In many embodiments, the antenna is positioned vertically, and the lid 1114 can include an antenna protrusion 1116 that can protect the antenna while allowing wireless communication. As described above, the RR 135 can communicate with MRMs 130, other RRs 135, a field transmitter 125 and/or radio adapters 165.

In some embodiments, the RR 135 can include one or more exterior switches 1130 that can activate the RR 135, deactivate the RR, reset the RR, or cause the RR to perform other functions. Similarly, one or more interior switches (not shown) can additionally or alternatively be included. In some implementations, the exterior switch 1130 can be a magnetic switch that is exterior to and cooperated with the housing 1112 (e.g., on the lid 1114) that cooperates with an interior button, switch or the like. Accordingly, the exterior switch 1130 can cause the RR 135 to reset (or take other relevant action) without having to open the housing. For example, the exterior switch 1130 can activate an internal switch or button that is detected by firmware of the RR that can in turn implement the reset or take other action. The same or a different exterior switch can additionally or alternatively cause the RR to broadcast its presence in attempts to communicationally couple with an MRM 130 and/or one or more radio adapters 165, initiate a radio marking of the RR 135 and/or cause other action. The exterior switch 1130 can, for example, be spring biased such that the switch returns to an initial state after being triggered by a user. Further, the exterior switch 1130 can, in some embodiments, be associated with multiple different functions (e.g., by holding the switch for a first period of time can cause a first function, while holding the switch a second period of time can cause a second function; sequentially activating the switch a first predefined number of times causes an activation of a first function, while sequentially activating the switch a second predefined number of times causes an activation of a second function; or other such actions).

As described above, the RR 135 can further directly communicate with the field transmitter 125 such that no intermediary device is needed. The RR 135 can additionally operate as a relay or repeater for the field transmitter, repeating communications from the field transmitter to be delivered to a radio adapter 165 and control module 160, or from a radio adapter to the field transmitter. Similarly, the RR 135 can operate as a relay or repeater for another RR 135, MRM 130, and/or a radio adapter 165. In some instances, multiple RRs can be cooperated and/or daisy chained to repeat communications, for example, between an MRM 130 or field transmitter 125 and the radio adapters 165.

Further, the RR 135 can, in some implementations, be configured to be battery-operated so that power lines do not need to be laid, which can simplify the installation and/or allow the RR to operate in areas where it might be difficult and/or costly to lay power lines. In other instances, power can be supplied to the RR (e.g., through power lines extending into the housing (not shown)). For example, in some instances, the RR can be mounted on a light pole and potentially receive power from the light pole. Some embodiments include a rechargeable battery, and/or can use battery power when a power source is non-continuous (e.g., when the RR is connected to a light pole and power from the light pole may only be available at night). The RR 135, in some implementations, can step down the power from the light pole to be used by the RR. In some embodiments, a shelf or beams can be secured with a pole to allow the RR to be mounted on the pole. One or more straps, wraps, clamps, shelves, beams or the like can be used to position and/or secure the RR to a pole or other structure, or can be used to secure a shelf or beams to the pole or other structure.

Figure 12:
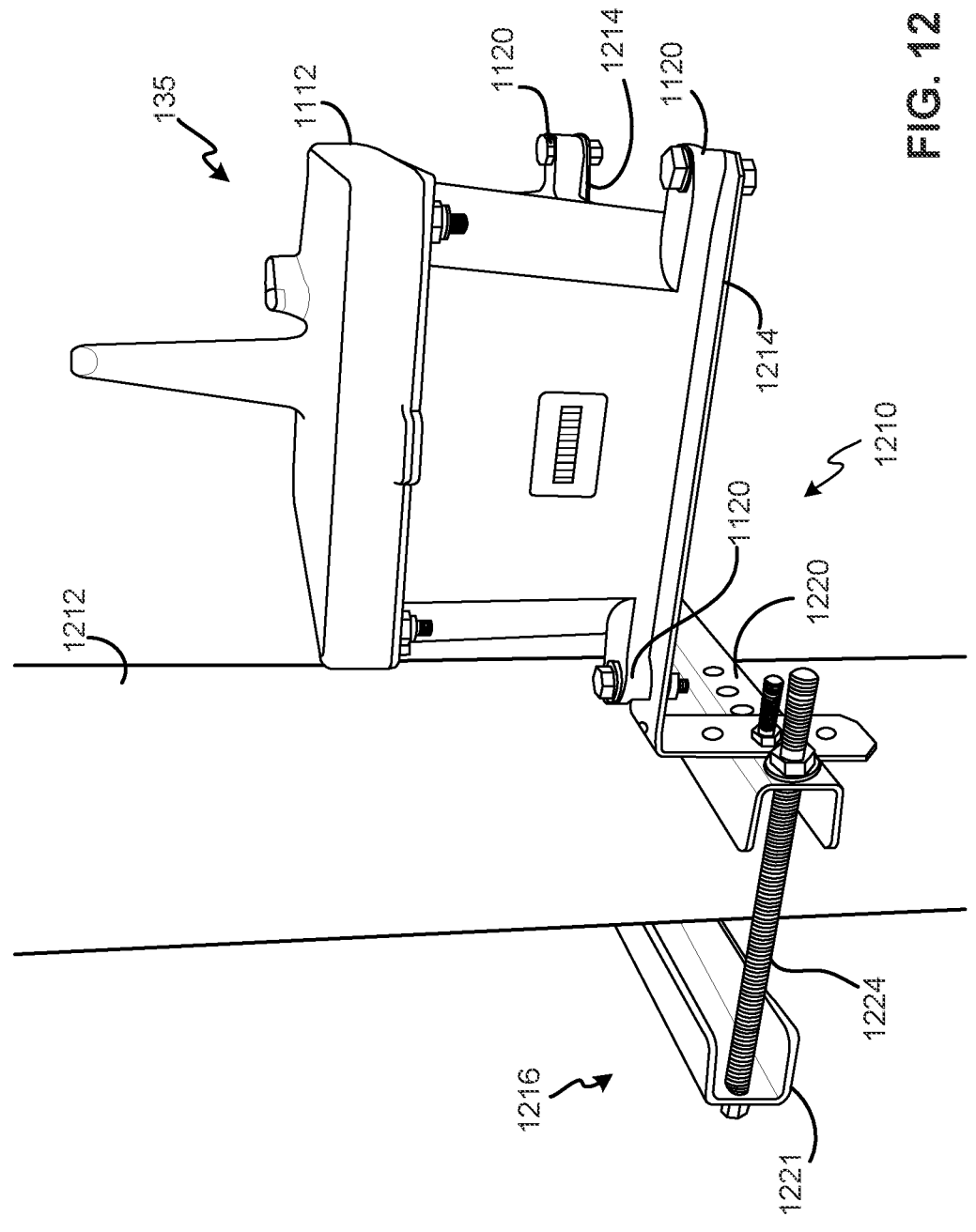
FIG. 12 depicts the RR of FIG. 11 cooperated with a mounting kit to mount the RR on, for example, a pole.

FIG. 12 depicts the RR 135 of FIG. 11 cooperated with a mounting kit 1210 to mount the RR on a pole 1212. Referring to FIGS. 11-12, the housing 1112 of the RR 135 can include mounting supports 1120 that cooperate with support beams or posts 1214 that extend from and/or are secured with a post mounting 1216. The mounting supports 1120 can be secured with the support beams 1214 through substantially any relevant method, such as but not limited to bolt and nut, rivet, welding, snap file, tongue and groove or other relevant mounting. The post mounting 1216, in some embodiments, includes two opposing mounting brackets 1220-1221 that are positioned on opposite sides of the pole 1212 and can be secured together with bolts 1224 to establish a clamping force clamping the post mounting 1216 to the pole 1212. The pole 1212 can be substantially any diameter and/or shape, with the mounting brackets 1220-1221 having dimensions corresponding to or being larger than the diameter (or width) of the pole 1212.

In the embodiment depicted in FIG. 12, the mounting brackets 1220-1221 are configured as elongated, generally "U" shaped brackets with a series of holes drilled through a central portion allowing bolts to extend through to cooperate with the other mounting bracket and the support beams 1214. The lateral sides of the mounting brackets 1220-1221 may include a recess or inlet (e.g., semi-circular recess) that can cooperate with the pole 1212. Similarly, the lateral sides may include or be cut to include ridges, teeth, or other structure that can help in gripping the pole 1212. The mounting brackets 1220-1221 can be implemented through other configurations, such as flat beams, a clamping structure depending on the shape of the pole 1212 (e.g., circular clamping structure), or other relevant configurations.

As described above, the RR 135 in part increases the range between an MRM 130 (and/or field transmitter 125) and a radio adapter 165 and control module 160. The RR 135 can act as a relay between the MRM 130, another RR 135, a field transmitter 125 and/or a control module 160 and radio adapter 165. In some embodiments, an RR 135 can further link to one or more RRs 135 and/or link multiple RRs in a chain further increasing the range and dispersion of the irrigation system 100. The number of RRs that a single RR can link to may be limited (e.g., up to 15 RRs), for example due to communication bandwidth, delays, memory, addressing, byte or bit space per communication, processing capabilities, and/or other such factors. An RR 135 can additionally or alternatively directly support and communicate with one or more control modules 160 and/or radio adapters 165. Again, the number of control modules 160 that can be supported by a single RR 135 may be limited based on the same or similar parameters, such as directly supporting up to 32 control modules 160.

Referring again to FIG. 1, in some embodiments, the MRM 130 further provides network intelligence enabling network building, sensor management and/or irrigation data management. The central irrigation controller 110 can support and communicate with multiple MRMs 130. In some instances, the number of MRMs that can be supported by a single central irrigation controller may be limited, for example, due to addressing, overhead, memory, delays, communication bandwidth and/or other such factors. For example, in some implementations a central irrigation controller 110 may be configured to support up to 250 MRMs 130. Further, each MRM 130 can wirelessly communicate with substantially any number of RRs 135. Again, some embodiments have limits on the number of RRs that can be supported by a single MRM 130, for example based on similar parameters presented above. For example, in some implementations a single MRM 130 may be configured and support up to 15 RRs. Additionally, each MRM may be further configured to also wirelessly communicate to one or more field transmitters 125 and/or directly wirelessly communicate with a plurality of control modules 160. Yet again, there may be limits on the number of control modules that may be directly supported by the MRM 130 (e.g., up to 32 control modules) again based on similar parameters. The direct communication with a control module 160 is achieved without an RR 135 or field transmitter 125 as an intermediary.

In some embodiments, an MRM finds and builds a network of devices it can wirelessly support to define an MRM network 140. For example, still referring to FIG. 1, a first MRM 130 (MRM1) establishes a first MRM network 140*a*, and the second MRM 130 (MRM2) establishes a second MRM network 140*b*. An RR 135 can additionally be configured, in some embodiments, to find and build a sub-network (referred to as an RR network 150) of devices it supports and with which it wirelessly communicates. For example, a first RR 135 (RR1) in a first MRM network 140*a* established a first RR network 150*a* that includes three control modules 160, with a sensor 170 cooperated with one of the control modules; a second RR 135 (RR3) in the first MRM network 140*a* establishes a second RR network 150*b*; and a third RR 135 (RR8) in a second MRM network 140*b* establishes a third RR network 150*c*.

The MRM 130, in some embodiments, is configured to automatically identify and/or configure an MRM network 140. In some implementations, the MRMs 130 transmit or broadcast a network poll request, global message or request to find those control modules 160, radio adapters 165, RRs 135 and/or field transmitters 125 that are in wireless range of the MRM 130. Each control module 160, radio adapter 165, RR 135 and/or field transmitter 125 are similarly configured to wirelessly respond to the network poll request. In some instances, the devices receiving the network poll request may repeat the replies (e.g., in random slots) and/or may employ a delay (e.g., a randomly generated delay, based on an ID, or other such factor) in transmitting a reply in attempts to limit or avoid collisions. Similarly, the devices may limit their respond to when the quality and/or signal strength of the network poll request signal exceeds a threshold. In some instances, the MRM network polling can be prompted by the central irrigation controller 110.

Each MRM 130 is further configured to build or identify its corresponding MRM network 140 based on radio signal strength indications (RSSI) and, in some instances, a network ID of received responses to the network poll request. A network ID can be a code (e.g., a string of alphanumeric characters, a four digit code, or other such code) programmed into control modules 160, radio adapter 165, RRs 135, field transmitters 125, MRMs 130 and other devices that may be configured in an MRM network 140 and/or that can communicate with an MRM 130. In some instances, the IDs may be defined by a manufacturer. Alternatively or additionally, an ID (e.g., a network ID code) may be programmed into each device by a user or operator. In some instances, such as with some legacy devices (e.g., legacy control modules), some devices may not have IDs or be configured to communicate an ID in response to a poll request. Accordingly, the MRM 130 may not require a device ID in order to include a device within an MRM network 140. The use of the ID code can help an MRM 130 in identifying one or more devices associated with another person, facility, network or company that may happen to be in wireless range and prevent these devices from being included into its MRM network.

The MRM 130 evaluates responses to the network poll request to identify those devices that can be supported by the MRM. In some instances, the evaluation takes into consideration the signal strength of the responses and the number of devices. In some embodiments, the MRM may have limits regarding the number of devices that the MRM can support and/or include within an MRM network 140. Accordingly, those limits are taken into consideration when establishing the MRM network 140. The MRM, in some embodiments, may communicate with the central irrigation controller 110 and/or another MRM in determining which devices should be included within an MRM network 140. For example, the central irrigation controller may resolve conflicts (e.g., two MRMs 130 able to communicate with the same RR 135 or radio adapter 165). Similarly, the central irrigation controller 110 and/or the two MRMs may coordinate to determine which MRM should support the device. The MRM 130 stores the relevant information to maintain knowledge and configuration of the MRM network 140. In some instances, the MRM 130 stores a table that identifies the devices (e.g. control modules 160, RRs 135, field transmitters 125, radio adapters 165, etc.) within its MRM network 140. The MRM network table may also be forwarded to the central irrigation controller 110 and/or be provided to the MRM by the central irrigation controller.

Similarly, in some embodiments, each RR 135 can build an RR network 150, for example, when prompted by a corresponding MRM 130 or the central irrigation controller 110. The RRs 135 can communicate an RR network poll request to find those control modules 160, radio adapters 165 and RRs that can be supported by the RR. Typically, each device capable of being cooperated with an RR is configured to respond to the RR network poll request. Again, responses from the radio adapter or an RR may be transmitted multiple times (e.g., with varying delays and/or random slots) and/or delayed. The RR 135 builds its RR network 150 (e.g., RR networks 150*a*, 150*b* and 150*c*) based on the signal strength, and in some instances network ID. Often the signal strength and/or network ID information may be provided by the MRM 130. Each RR 135 can store a table identifying those devices within its RR network 150. The RR tables can be sent to the MRM 130 and/or central irrigation controller 110. Typically, the MRM 130 resolves conflicts (e.g., two RRs 135 able to communicate with one radio adapter 165). For example, the conflicts can be resolved according to signal strength and the maximum number of supported devices (e.g., even if an RR 135 is in range of 40 control modules, in some instances, an RR may be limited regarding the number of control modules 160 that can be supported, such as supporting 32 control modules). The MRM 130 can keep the master table, and in some instances can update each of the tables stored at the RRs 135.

The MRM 130 and/or RR 135 may further communicate their corresponding MRM network or RR network information to the central irrigation controller 110 to be stored as a backup. As a result, once a device has been added to an MRM network 140 and/or RR network 150, the networks can be readily restored through the backup information. Additionally or alternatively, once a device has been added to an MRM network 140 and/or RR network 150, its MAC address and programming, if present, can be maintained within the central irrigation controller 110 for potential future restoration. Further, the MRM networks 140 and RR networks 150 are generated in response to a build command and typically devices do not change networks once the networks are built (unless a subsequent build command is activated, a device is manually removed, or the like). New devices may be added to an MRM network or RR network when the relevant MRM and RR can support the new device. Additionally, the MRM networks 140 and RR networks 150 are typically not configured to be peer-to-peer networks that allow self-healing within the network.

In constructing the MRM networks 140 and RR networks 150, MRMs 130, RRs 135, and in some instances field transmitters 125, are configured to detect surrounding RRs 135 and/or radio adapters 165. In some implementations, an MRM 130, RR 135, radio adapter 165 and/or field transmitter 125 are provided with a relevant network ID. For example, when an MRM 130, RR 135, radio adapter 165 and/or field transmitter 125 is initially activated it can be programmed to perform a listening command (e.g., listening during an initial 20 seconds after power up) to receive a radio communication (e.g., from a field transmitter 125) that includes a network radio ID or number. The network ID or number can be substantially any ID that can be used to distinguish the networks (e.g., a multi-digit number, alphanumeric sequence or the like). The initialization and/or the providing of device and/or network IDs is sometimes referred to as marking or radio marking.

FIG. 13 depicts a simplified flow diagram of an example of a process 1310 of establishing an MRM network 140 in controlling irrigation, according to some embodiments. In some instances, some or all of the process 1310 is implemented in response to a command from the central irrigation controller 110 or a field transmitter 125. In other instances, some or all of the process 1310 can be implemented by the MRM 130, for example, in response to detecting a device not previously identified and/or recognized within an MRM network 140, which can allow the irrigation system 100 to be updated and/or altered. In step 1312, the MRM 130 wirelessly broadcasts and/or communicates an RR find command directed to one or more RRs within wireless range of the MRM. In step 1314, the MRM identifies each RR that responds to the RR find command. In step 1316, the MRM wirelessly broadcasts and/or communicates a radio adapter find command to potential radio adapters within wireless range of the MRM.

In step 1320, the MRM identifies each radio adapter that responds to the radio adapter find command. In step 1322, the MRM wirelessly communicates a command to each identified RR to find potential radio adapters that are within range of each RR. In step, 1324, the MRM receives one or more responses from each relevant RR identifying those radio adapters that are within range of the RRs.

FIG. 14 depicts a simplified flow diagram of another example of a process 1410 of establishing an MRM network 140, according to some embodiments. Similar to the process 1310, the process 1410 may be implemented in response to a command from the central irrigation controller 110 or a field transmitter 125, or may be independently implemented by the MRM 130. In step 1412, the MRM 130 wirelessly broadcasts or communicates (e.g., radio) an RR find command or poll to be received by one or more RRs 135. In step 1414, the MRM identifies each RR 135 that responds to the RR find command. For example, the MRM may assign an address or identifier (e.g., an 8 byte address) and/or a network identifier to each RR 135 detected through the find command. In some instances, RRs that were previously recognized or previously communicated with the MRM may include a network and/or device identifier (ID) in the response. In step 1416, the MRM 130 wirelessly communicates an RR find command to each addressed RR 135 instructing each RR to find RRs 135 that may be within range of each identified RR. In step 1420, the MRM 130 wirelessly receives one or more replies from each addressed RR 135 with the results of their query to identify surrounding RRs that are within wireless range of the respective RRs implementing the find command. In some instances, each RR is configured to communicate back a radio relay list or table of located surrounding RRs. This radio relay list may include RRs already identified by the MRM and/or RRs not previously identified by the MRM. Further, the radio relay list or table may include reception radio levels. In some instances, step 1420 can be repeated a number of times depending on the number of RRs within a chain.

In step 1422, the MRM 130 identifies each RR 135 not already identified, and can in some instances further assign an address and/or network identifier to those RRs that were not already assigned an address. In step 1424, the MRM 130 recalculates one or more communication routes to reach each RR. In some instances, step 1424 is performed each time the MRM receives a new radio relay list from an RR to calculate an optimal route or way to reach each RR (e.g., based on signal strength, network bandwidth, etc.). Through the routing calculations, the RR can generate one or more "line" configurations and/or "star" configurations. It is noted that the MRM may be limited regarding the number of RRs that the MRM can support. Accordingly, in some instances, not all of the RRs identified by the MRM may be incorporated into the MRM network 140 being configured by the MRM 130. The selection of which RRs to include may be based on signal strength (e.g., RSSI), path length, path complexity, communications received from the central irrigation controller 110, communications from another MRM, the number of RRs within range, and/or other such factors. For example, an RR may not be included in an MRM network when the signal strength does not exceed a threshold and/or a signal strength between the RR and another MRM is greater. Similarly, an RR may not be included in an MRM network when a signal path between the RR and another MRM is shorter.

In step 1426, the MRM 130 wirelessly broadcasts or communicates a radio adapter find command, query or polling to surrounding control modules 160 and/or radio adapters 165. In step 1428, the MRM identifies each surrounding control module and/or radio adapter 165 that responds to the radio adapter find command and may select some or all of those responding radio adapters 165 and/or control modules 160 to be supported directly by the MRM 130. For example, in identifying each control module and/or radio adapter the MRM may assign an address or identifier to each radio adapter 165 detected through the find command. Again, the MRM 130 may be limited regarding the number of radio adapters 165 and/or control modules 160 that can be directly supported by the MRM 130. Accordingly, the MRM may restrict which radio adapters 165 are directly supported by the MRM. The decision regarding which radio adapter 165 and/or control module 160 to directly support can depend on one or more factors such as, but not limited to, signal strength (e.g., RSSI), the number of radio adapters and/or control modules that responded, which radio adapters 165 and/or control modules 160 can be supported by an RR 135, path length, path complexity, and/or other relevant factors. Similar to the replies from RRs, the radio adapters 165 and/or control modules 160 that were previously recognized or previously communicated with the MRM may include a network and/or device identifier (ID) in the response.

In step 1430, the MRM 130 wirelessly broadcasts or communicates a radio adapter find command or request to RRs 135 to find the radio adapters 165 and/or control modules 160 that are within range of each RR receiving the find command. In step 1432, the MRM 130 receives one or more radio adapter lists or tables from each relevant RR 135 with the results of their query identifying surrounding radio adapters 165 and/or control modules 160 within wirelessly communication range of the respective RRs. The results and/or tables may include reception radio levels. In step 1434, the MRM 130 identifies each radio adapter 165 and/or control module 160 not already identified, and can in some instances further assign an address to those radio adapter and/or control module that were not already assigned an address. In step 1436, the MRM 130 recalculates one or more communication routes to reach each radio adapter 165 and/or control module 160. Again, in some instances, step 1436 is performed each time the MRM receives a new radio adapter list from an RR to calculate an optimal route or way to reach each radio adapter and/or control module (e.g., based on signal strength, network bandwidth, number of radio adapters 165 being supported by each RR 135, etc.). Further, in some instances, step 1424 may be performed while performing step 1436.

The calculation of communication routing to the radio adapters 165 and/or control modules 160 can further define the RR networks 150 and/or can resolve conflicts between two or more RRs that are each capable of communicating with a single radio adapter 165. As such, some embodiments include step 1438 where the MRM 130 resolves radio adapter and/or RR conflicts between RRs 135. Again, in resolving radio adapter conflicts and/or RR conflicts the MRM can take into consideration signal strengths, number of radio adapters that are and/or can potentially be supported by conflicting RRs, and/or other relevant factors. Similarly, the resolution of radio adapter and/or RR conflicts can take into consideration radio adapters that can be supported by an MRM as well as an RR. Accordingly, some embodiments further include step 1440, where one or more radio adapter assignments, RR assignments and/or other such conflict resolution information can be communicated to relevant RRs and/or the RR network information can further be communicated back to the relevant RRs to be used by those RRs in detecting relevant RR networks 150, and determining communications and routing communications through their respective RR networks 150 and/or to other RRs. In some instances, the information provided by the MRM in addressing conflicts can include communicating network information to the relevant RR 135 identifying radio adapters 165 and/or other RRs that are not to be included in the RR network, such that the RR 135 excludes the identified radio adapters and/or other RRs from the corresponding RR network 150.

In step 1442, the MRM 130 communicates the results of MRM network configuration and RR network configurations to the central irrigation controller 110 (e.g., a table of RRs and reception radio level between each other, one or more tables of radio adapters 165 with reception radio level with their corresponding MRM or RRs, and/or a table of radio adapters 165 supported by the MRM 130 and their reception radio level). As described above, the MRM 130, in some implementations, couples with an NCC 930 that manages the communication with a remote and/or local central irrigation controller 110 and relays data to the MRM 130 (e.g., through a RS485 physical link).

FIG. 15 depicts a simplified flow diagram of an example process 1510 implemented by an RR 135 in establishing an MRM network 140 and/or RR network 150, according to some embodiments. In step 1512, the RR 135 wirelessly broadcast or communicate an RR find command requesting a reply from other RRs within wireless range of the wirelessly transmitted RR find command. In step 1514, the RR stores an identification of each of the other RRs that responded to the RR find command. In step 1516, the RR 135 wirelessly broadcasts or communicates a radio adapter find request that requests each radio adapter that wirelessly receives the request to response. In step 1520, the RR stores radio adapter identifier information for each radio adapter that responds to the radio adapter find request.

FIG. 16 depicts a simplified flow diagram of another example of a process 1610 implemented by an RR 135 in establishing an MRM network 140 and/or RR network 150, according to some embodiments. In step 1612, the RR 135 receives a radio adapter find command or poll from the MRM 130. In step 1614, the RR 135 determines whether the RR already has an identifier and/or a network identifier based on previous communications with the same MRM 130 or another MRM. In step 1616, the RR 135 records an identification and/or address information when such information is received in response to the RR's reply to the find command.

In step 1618, the RR 135 receives a command to find other RRs 135 that may be within wireless range of each identified RR. In step 1620, the RR 135 wirelessly broadcasts or communicates an RR relay find command requesting a reply from each RR within wireless range of the wirelessly communicated RR relay find command. In step 1622, the RR 135 receives one or more responses from one or more RRs and stores an identification of each RR that responded to the RR relay find command. In some instances, the RR 135 may further record reception radio levels for those RRs that responded. The RR 135 may record the neighboring RR information in a listing, table, spread sheet, or other relevant method.

In step 1624, the RR 135 receives a request from the MRM 130 to find the radio adapters 165 and/or control modules 160 that are within range of and can potentially be supported by the RR. In step 1626, the RR wirelessly broadcasts or communicates a radio adapter find request and/or control module poll. Typically, the radio adapter find request is in response to the request from the MRM (or from the central irrigation controller 110). In step 1628, the RR 135 wirelessly receives radio adapter responses and stores relevant identifier information, and in some instances signal strength information, communication path information and/ or other relevant information associated with each reply received from one or more surrounding control modules and/or radio adapters that responded to the radio adapter find request. The information can be stored as a listing, table, database, or the like.

In step 1632, the RR 135 transmits the radio adapter list or table to the MRM 130 with the results of the query to identify surrounding radio adapters 165 and/or control modules 160, which may include the signal strength (e.g., reception radio levels), communication path information, and the like. In step 1634, the RR 135 receives RR network information from the MRM 130 to be used by the RR in detecting relevant communications and routing communications through the corresponding RR network 150 and/or to other RRs. Further, in some implementations, the RR defines the RR network 150, and the relevant RR network information received from the MRM in step 1634 may only address conflict issues identifying, for example, those radio adapters 165 and/or RRs that should not be included in an RR network 150 (e.g., because those radio adapters and/or RRs are to be supported in another RR network or directly by the MRM 130). Accordingly, the MRM 130 may communication radio adapter and/or RR conflict resolution information that can be used in defining the RR network 150. In some instances, not all of the steps may be performed. For example, in some instances, the steps associated with identifying an RR may be implemented (e.g., steps 1618-1634 or

1624-1434), such as when reconfiguring or rebuilding RR networks (e.g., due to the addition of another RR and/or radio adapter 165 and/or control module 160), reconfiguring or rebuilding an MRM network 140, reconfiguring or rebuilding the communication network 115, or the like. As described above, the determination of whether a radio adapter or control module is to be included or excluded in an RR network can be based on signal strength, communication path length (e.g., shortest path), path complexity, and other relevant information (e.g., a radio adapter or control module may not be included in an RR network when the signal strength does not exceed a threshold and/or a signal strength between the radio adapter and another RR is greater; when a signal path between the radio adapter or control module and another RR is shorter, the communication path is less complex, or other such factors).

The radio adapter 165, in turn, responds to the queries or polls from the MRM 130 and/or RRs 135 in establishing the MRM networks 140 and RR networks 150. In some instances, the radio adapters respond when the received polling commands have a signal quality and/or signal strength that exceed thresholds. However, in many instances the radio adapter 165 responds regardless of signal strength because the radio adapter typically does not have knowledge of whether other stronger or more reliable signals can be received. The radio adapters 165 provide wireless communication with the control modules 160 so that the control modules 160 can wirelessly receive irrigation schedules as well as allow information to be forwarded back to the RR 135, MRM 130 and/or central irrigation controller 110. This information can include, but is not limited to, sensor information, runtime information, battery levels, errors, and other relevant information. Similarly, the radio adapter 165 can provide similar information when relevant.

Irrigation scheduling can readily be distributed to the control modules 160 and/or radio adapters 165 utilizing the wireless communication network 115 of the irrigation system 100. The control modules 160 are configured to implement one or more irrigation schedules supplied to the control module directly from the field transmitter 125 (e.g., through the direct connection cord 714), wirelessly from the field transmitter, and/or wirelessly from the central irrigation controller 110. The addition of the radio adapter 165 with control modules 160 (legacy, existing or new control modules) allows the control modules to be wirelessly controlled and/or provide statistics, operating parameters, sensor data and/or other relevant information to the central irrigation controller 110 and/or an MRM 130.

The central irrigation controller 110 provides control of irrigation over the irrigation system 100. In some instances, irrigation schedules can be created at the central irrigation controller 110, a satellite irrigation controller 120 or a field transmitter 125. The irrigation program or programs can be communicated to the control module 160 directly from the field transmitter 125 or wirelessly transmitted through a radio adapter 165 from the field transmitter, an RR 135 or an MRM 130. Further, irrigation programs communicated to the control modules 160 are typically also provided to the central irrigation controller 110 to allow the central irrigation controller to track the irrigation, provide overall control over the irrigation system 1000 and/or make adjustments to the irrigation scheduling and/or other irrigation. Additionally, the control modules 160 can be manually activated (e.g., an "ON" command) without regard to the irrigation scheduling through the central irrigation controller 110, a satellite irrigation controller 120 and/or a field transmitter 125.

Irrigation programming and scheduling can be supplied to a field transmitter 125 by coupling the field transmitter to the central irrigation controller 110, a satellite irrigation controller 120 or wirelessly from the central irrigation controller 110, an MRM 130 or RR 135. Additionally or alternatively, irrigation scheduling can be defined or programmed by a user directly into the field transmitter 125 through the user interface 716.

Referring back to FIG. 7A, the user interface 716 allows a user to view operations of the field transmitter 125, receive information about the field transmitter, the irrigation system 100, a control module 160 or other device of the system, input information and/or irrigation schedules and take other action. In some embodiments, as described above, the buttons 722 can have multiple functions depending on a state of operation and/or the information or options provided on the display 720.

In some embodiments, the memory of one or more components of the irrigation system 100 can be backed up. Additionally or alternatively, at least a portion of the content stored in memory of some of the components is backed up and/or protected, such as in the event of a power failure, battery is discharged or removed, or other reasons. For example, with the field transmitter 125 if power is exhausted, battery is discharged or removed, or other such problems, the field transmitter can be configured to retain one or more of the following parameters: radio parameters (e.g., a network number, frequency calibration, sensor calibration, etc.), one or more identifiers (e.g., a unique ID number), a radio adapter list (e.g., a maximum of 32 radio adapters 165 resulting of a radio finding command, an MRM and/or RR list (e.g., maximum of 32) resulting from a radio finding command, an identifier (e.g., a name, number, etc.), a network radio number or ID, and/or other such information. In some embodiments, operational parameters may also be retained, such as one or more of language, contrast, backlight timeout, radio relay menu active or not, and/or other such operating parameters. Further, the field transmitter 125, in some implementations, further retains one or more irrigation programs and/or allows the field transmitter 125 to restore one or more irrigation schedules, for example, from a control module 160.

Similarly, other devices of the irrigation system 100 may retain information, such as in the event of power failure and/or disconnection from a power source. Typically, this information is retained in non-volatile and/or flash memory at the device. For example, the control modules 160 can retain at least some information and/or parameters such as one or more of but not limited to: a control module identifier (e.g., a unique ID number, such as a 6 byte number); network identifier, one or more current irrigation programs, which can include watering schedules and other irrigation parameters including user parameters (e.g., as sent from a field transmitter 125 or the central irrigation controller software); one or more backup irrigation programs can be stored; a station name and/or controller name; and/or other such information or parameters.

The radio adapter 165 can also be configured to retain information and/or parameters such as, but is not limited to, radio parameters (e.g., network number, frequency calibration, sensor calibrations, such as temperature sensor calibration); a device identifier (e.g., unique ID number); and/or other such information. In some instances, the radio adapter may retain additional information, such as when the radio adapter 165 is cooperated with a legacy control module that may have some limited capabilities and/or memory capacity. For example, the radio adapter 165 may additionally retain:

one or more current irrigation program, which can include watering schedules and parameters (e.g., parameters sent from a field transmitter 125 or the central irrigation controller software); one or more backup and/or default irrigation programs; one or more station names and/or controller name; network radio identifier or number; and/or other relevant information.

In some embodiments, the devices of the irrigation system 100 can be configured to try and conserve battery power. For example, the RRs 135, command modules 160 and/or radio adapters 165 can be configured to transition to sleep, power down or low power operating states (referred to below generally as sleep states). During these sleep states a significant reduction of power consumption occurs. This can greatly increase the battery life. The increased battery life is typically also balanced with communication delays. In some instances, for example, the radio adapters 165 may be configured to have a sleep state of about 5 seconds, and the RR may have a sleep state of about 100 ms. Longer or shorter sleep states can be implemented to achieve desired operating conditions and response times.

As described above, in some embodiments at least some control modules 160 can include one or more sensor inputs, interfaces or ports to receive sensor information and/or data from one or more sensors 170. The sensors 170 can be substantially any relevant sensor, such as but not limited to rain, soil moisture, wind, temperature, water flow, pressure, water meter (e.g., electronic water meter, dry contact water meter, etc.) and/or other such sensors. The sensor data can be used by the control module 160, a radio adapter 165 and/or transmitted to an MRM 130, a satellite irrigation controller 120 and/or the central irrigation controller 110, which can use, distribute, and/or log the information. Further, the sensor information and/or control information or signals based on the sensor information can be distributed to other radio adapters 165 and/or control modules 160 from the MRM 130 allowing sensor data to be shared. The MRM 130 and/or the central irrigation controller 110 can include the intelligence to determine whether sensor information is to be extended to other radio adapters 165 and/or control modules 160, and in some instances, may identify specific irrigation programs affected by a control module 160. For example, the MRM and/or central irrigation controller can maintain a listing, table or the like that identifies which radio adapters 165 and/or control modules 160 should share which sensor information, and the MRM 130 can distribute the sensor information accordingly. Further, some embodiments may employ different sensors at different locations to have multiple different thresholds for the same or different sensor information in order to more accurately control irrigation. The one or more control modules 160 and/or radio adapters 165 that subsequently receive the irrigation information and/or corresponding commands from the MRM 130 can then account for the sensor information when implementing irrigation programming and/or adjusting irrigation programming, which can include interrupting irrigation, preventing irrigation, adjusting run times and/or other such adjustments.

Previous irrigation systems typically are not battery powered, and/or sensor data and/or the distribution of sensor data is not implemented though battery operated devices. An increase in overhead and in communication over a network is typically employed in order to share sensor information. This increase in overhead and communication can significantly affect battery life. Accordingly, previous systems do not employ battery powered devices.

In some instances, the sensor data can be forwarded to a field transmitter 125 that can subsequently deliver the sensor data to one of the MRM, satellite irrigation controller 120 and/or the central irrigation controller 110. In many embodiments, the radio adapters 165 do not directly communicate with other radio adapters, and accordingly is typically not a peer-to-peer network and typically does not compensate for failures within the network. Further, the sensor data is typically not directly distributed from a radio adapter to another radio adapter. Similarly, in many embodiments the radio adapters are typically not configured to implement self-healing (e.g., communicate with a different RR) should communication with an assigned MRM 130 or RR 135 be interrupted. Further, in many embodiments the RRs 135 are also not configured to take self-healing action should communication with a radio adapter 165, another RR 135 and/or MRM 130 be interrupted.

The control module 160 and/or the radio adapter 165 can be configured to transmit sensor data and/or alarm information back over the wireless communication network 115 of the irrigation system 100. For example, a rain sensor may transmit rain information (e.g., an indication that a threshold has been reached, pulses indicating amounts of water received, accumulation information and/or other relevant information). In response, the control module 160 and/or the radio adapter 165 can transmit an alarm and/or information over the wireless communication network 115. In some instances, the sensor alarm and/or information may not be automatically sent over the communication network 115 in real time. In other instances or implementations, sensor information and/or alerts can instead be periodically sent back (e.g., sent based on a schedule), included in a response to a request from the MRM 130 or field transmitter 125, included in response to a polling (e.g., a regular polling from an MRM), or other transmission.

Additionally or alternatively, the control module 160 may retain the sensor information and/or alert, and response to a request from the radio adapter 165. In some instances, the radio adapter 165 can periodically request the control module (e.g., via the Infrared communication) to forward the sensor information and/or query the control module regarding whether a sensor state change had occurred. These requests may be spaced over time in an attempt to conserve power and/or can be sent when other communications or requests are sent to the control module 160 (e.g., the radio adapter 165 may query the control module periodically, such as every 4, 6 or 12 hours or other period). The request or query from the radio adapter 165 may be scheduled in the radio adapter or may be based on a command, query or polling from the central irrigation controller 110, a satellite irrigation controller 120 or an MRM 130. The radio adapter 165 can transmit the information to an MRM 130 to be used in a MRM network 140 or over the irrigation system 100. The radio adapter can immediately communicate the information, or be configured to transmit the information based on a schedule or in response to a query from the MRM 130 or central irrigation controller 110.

The control module 160 can be configured to take local action in response to a change in sensor state or based on sensor information. In some instances, the action can be in real time in direct response to the sensor information and/or state change. Similarly, the radio adapter 165 may be configured to instruct the control module 160 to take action in response to the sensor change of state and/or information.

As described above, the sensor state change and/or sensor information can, in some instance, also be shared among other control modules 160, radio adapters 165, MRMs 130, satellite irrigation controllers 120, the central irrigation controller 110, and/or other devices of the irrigation network or outside the irrigation network (e.g., another related irrigation network that can receive information from the central irrigation controller 110, such as over the Internet or from a secondary device, such as being forwarded by a smart phone that accesses the central irrigation controller 110). The response time by other devices of the irrigation system 100, however, is often delayed in some implementations. The sensor information and/or alerts may not be forwarded immediately and/or in real time over the communication network 115 to other devices of the irrigation system 100. Instead, the sensor alerts and/or information may be obtained and/or forwarded from the radio adapter 165 on a schedule (e.g., every 12 hours to conserve battery power). As such, even though the control module 160 directly coupled with the sensor may take immediate action, other devices of the irrigation system 100 may not take action for some time. Beneficially, however, the sensor information can be shared and used by multiple devices over the irrigation system 100 (and potentially outside the irrigation system 100).

Figure 17:
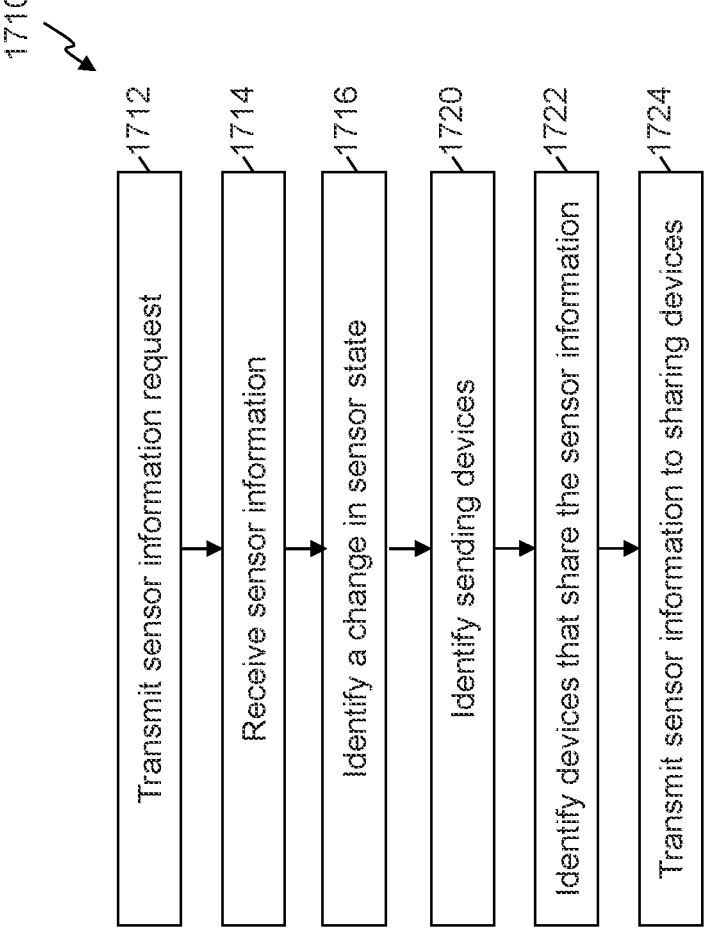
FIG. 17 depicts a simplified flow diagram of a process of distributing sensor information.

FIG. 17 depicts a simplified flow diagram of a process 1710 implemented by an MRM 130 in distributing sensor information. In some embodiments, the process includes a step 1712 where the MRM issues a request for sensor information, typically, wireless transmitting a sensor polling or request. In step 1714, the MRM receives sensor information from one or more control modules 160 and/or radio adapters 165. Typically, the sensor information is wirelessly received at the MRM 130; however, the sensor information may be received through other methods, such as from the field transmitter 125. In step 1716, the MRM 130 determines whether a change in state has occurred. It is noted that, in at least some instances, sensor information is not provided to the MRM unless a change of state has occurred. In other instances, however, sensor information may be provided regardless of the state, or based on continued evaluation.

In step 1720, the MRM identifies the control module 160, radio adapter 165, and/or sensor 170 that supplied the information. In step 1722, the MRM 130 identifies one or more other devices (e.g., other radio adapters 165 and control modules 160) that are defined to share the sensor information. In step 1724, the MRM transmits sensor information and/or commands directed to those devices defined to share the sensor information.

The control module 160 can take or be instructed to take any number of potential actions based on the sensor information. The actions typically depend on the sensor 170 being monitored, the sensor information and/or alert received, and the capabilities of the control module 160. For example, in some instances, when a rain sensor is being monitored and a rain alert is received indicating a threshold amount of rain (typically within a threshold amount of time) has been received, the control module 160 may prevent activation of or interrupt the one or more valves or stations controlled by the control module. Additionally or alternatively, a main or master valve supplying water to one or more valves may be closed in response to some sensor information (e.g., a rain sensor or a weather sensor is active) preventing irrigation from those associated valves (and remain closed until the condition changes). In some embodiments, the MRM 130, the control module 160 and/or radio adapter 165 can apply different thresholds to different valves, stations and/or irrigation programs. Similarly, a sensor alert may cause the prevention or interruption of less than all of the valves controlled by a control module. The control module 160 can be configured to continue to operate and/or an irrigation timer continues to run even while preventing irrigation from one or more valves in response to sensor information. Continuing to operate allows the control module to continue to implement irrigation at a scheduled and/or anticipated real time when an active sensor subsequently becomes inactive and/or sensor information indicates that irrigation can commence.

The use of the flow sensor and/or water meter can allow the control module 160, radio adapter 165 and/or the irrigation system 100 to control the amount of water delivered as well as track the health of the irrigation system. A detected flow that is below a first threshold while a control module is attempting to irrigate can indicate a problem up or down stream from the valve (e.g., leak, clog, stuck valve or other problem). Additionally, one or more other flow thresholds can indicate problem along the stream, such as a flow in excess of a threshold can indicate a leak. Similarly, a potential leak can be detected when a flow sensor continues to detect water flow when no valves are opened. Accordingly, in some instances, a control module 160 and/or radio adapter 165 can be configured to track the flow a predefined duration after closing one or more valves (e.g., 2 minutes after stopping irrigation). The detection of continued water flow can indicate a leak in the water pipes, seals, valves or the like. The flow management can further provide high flow shut off when flow exceeds a threshold. In many instances, the flow management and thresholds are set up and configured by the irrigation software and/or central irrigation controller.

In some embodiments, the control module 160 and/or radio adapter 165 are provided with and/or programmed with relevant flow information and/or flow sensor information to allow for accurate consideration of flow information received from a flow sensor or meter (e.g., calibration information, maximum flow such as number of pulses per minute, and/or other such parameters). In some instances, the flow sensor information is not shared as this information may be specific to a certain control module. In other instances, however, where the control module 160 is associated with a master valve or another valve with other valves down stream, the flow sensor information may be relevant to other control modules. Substantially any flow sensor and/or meter can be used. For example, some flow sensors provide a number of pulses that equal a certain flow, which may have to be calibrated.

As described above, the control module 160 and/or the control module in cooperation with the radio adapter 165 can forward sensor information, battery levels and/or other information to the MRM 130, satellite irrigation controller 120, field transmitter 125, and/or central irrigation controller 110. The sensor information provided can depend on the sensor being monitored, the information available from the sensor, and the capabilities of the control module and/or radio adapter. For example, in some instances, the report of sensor information can include, but is not limited to, a sensor type, sensor state (e.g., ON/OFF, such as for rain sensor or under/upper limit for flow sensor), event date and/or time, values, amounts, and/or other such information. The radio adapter 165 is configured, in some embodiments, to repeat the sensor and/or alert information for a period of time (e.g., over a subsequent 24 hours), for example, in case of a network no answer (e.g., an RR 135 is powered only by night and does not receive one or more communications). A maximum threshold number of repetitions may be defined, which can limit battery consumption. Further, maximum and minimum threshold durations between repeated transmissions may be defined.

The central irrigation controller 110, satellite irrigation controller 120, MRM 130, and/or field transmitter 125 can use the sensor information with one or more other control modules in controlling system irrigation. In some embodiments, the central irrigation controller 110 can utilize sensor information received through one or more control modules 160 in controlling irrigation over part or all of the irrigation system 100. In some instances, for example, the central irrigation controller 110 is configured to communicate different commands over the irrigation system, such as but not limited to, controlling selectable valves to be affected by a sensor override, initiate a manual start of one or more irrigation programs at one or more control modules 160, define a manual ON command with programmable duration, define a manual OFF (e.g., an off of one or more control modules 160 or one or more irrigation programs of a control module), an OFF or an ON command for one or more or all control modules, an override of sensor information, a DELAY command (e.g., rain delay) for one or more control modules 160, and/or other relevant commands. The conditions for issuing the above commands may, in some embodiments, be defined at the central irrigation controller 110, but forwarded to the MRM 130 such that the MRM initiates actions to implement the relevant command, typically, automatically by the MRM without further instructions or commands from the central irrigation controller.

The central irrigation controller 110 can log and/or generate reports regarding sensor information and/or control actions taken in response to sensor information. Additionally, the central irrigation controller 110 can display a notification or generate an alert in response sensor information. In some instances, sensor log information may be obtained from a control module 160 and/or radio adapter 165.

A field transmitter 125 may also be configured to receive sensor data from a control module 160 and/or radio adapter 165. In some instances, the field transmitter is configured to be able to display an alert or alarm when receiving sensor data and/or control module data. For example, the field transmitter 125 may be configured to display a blinking symbol, graphic, image, or logo (e.g., blinking rain or flow logo alert), display levels or amounts based on sensor information (potentially in large or different font), display status information and/or other relevant information. Other information that might be displayed and/or otherwise available through the field transmitter 125 (and/or the central irrigation controller 110) can include, but is not limited to, sensor type (e.g., flow, rain (wired), rain (wireless), rain freeze, wind, soil moisture, etc.), valves affected by sensor, water meter calibration, maximum flow (e.g., pulse rate) for one, or more or each valve, one or more threshold and/or offset values, and other such relevant information and parameters.

Some embodiments further support the upgrading and/or reflashing of one or more of the components of the irrigation system 100. For example, the MRM 130 and/or RR 135 may be reflashed to upgrade and/or replace the firmware of the MRM or RR, respectively. In some instances, the reflash can be implemented through the central irrigation controller 110, the field transmitter 125, a portable memory, or the like. The reflashing can be associated with the MRM or RR microprocessor or microprocessors, the MRM or RR wireless communication and/or other aspects of the MRM or RR, and implemented through wireless or wired communication. Similarly, in some instances, the satellite irrigation controllers 120 and/or the radio adapters 165 may be reflashed.

As described above, some embodiments additionally provide secure or private communications. For example, security software and/or a security chip can be included in a field transmitter 125, MRM 130, RR 135, control module 160, and/or radio adapter 165 to provide a challenge and/or authenticate security protection to radio and/or optical communications between components of the irrigation system 100. These protections can, in some instances, prevent components of the irrigation system from intercommunicating unless they have succeeded in authenticating each other.

Some embodiments employ encryption when communicating. The encryption provides protection to the communications as well as ensure authentication of the receiving device. Further, in some embodiments, a transmitting device within the system may identify the receiving device before communicating. For example, a radio adapter 165 may identify the control module 160 and/or type of control module that it is communicating with. As such, the transmitting device can determine whether the receiving device is a legacy device that cannot accurately receive or decrypt the communication. In those instances, the transmitting device may not encrypt the communication. Additionally, the transmitting device may not request an authentication from a legacy device when the legacy device is incapable of providing the authentication.

Figure 18:
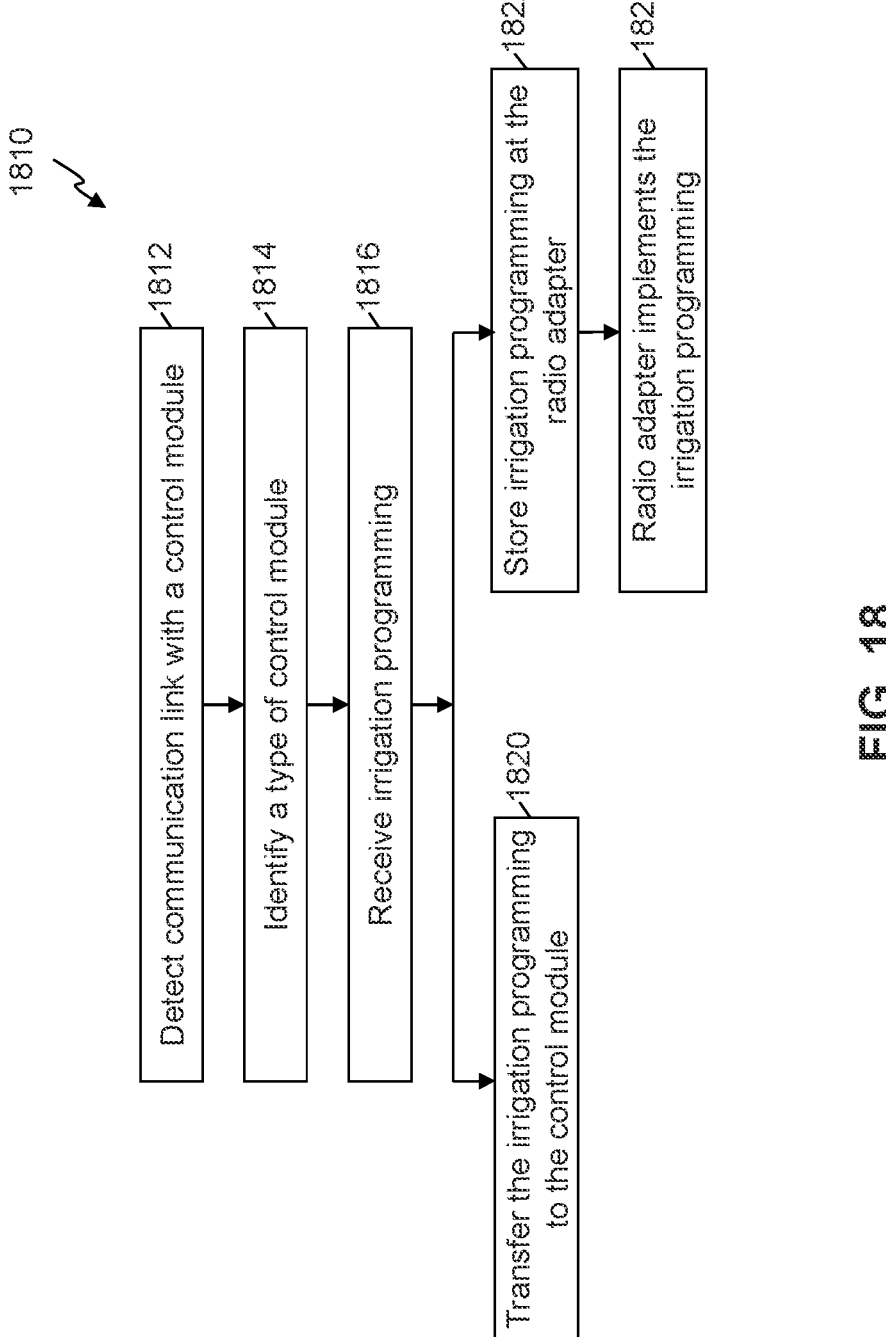
FIG. 18 depicts a simplified flow diagram of a process, in accordance with some embodiments, of providing additional functionality through a radio adapter when cooperated with a legacy control module.

FIG. 18 depicts a simplified flow diagram of a process 1810, in accordance with some embodiments, providing additional functionality through a radio adapter 165 when cooperated with a legacy control module 160 or other control module that has limited functionality. In step 1812, the radio adapter 165 detects a communication link with a control module 160. Again, the control module comprises one or more valve drivers each configured to control an irrigation valve. In step 1814, the radio adapter identifies a type, version and/or capabilities of control module and/or determines whether the control module is a legacy control module or otherwise has reduced function set relative to a function set of a later version of the control module. For example, the detected radio adapter may have less functionality than a newer control module or an enhanced control module.

In step 1816, the radio adapter 165 wirelessly receives irrigation programming (e.g., via a radio frequency transmission). In step 1820, the radio adapter transfers the irrigation programming to the control module, when the control module is not a legacy control module and/or has an enhanced function set relative to other versions of a control module, to be implemented by the control module. In step 1822, the radio adapter locally stores the irrigation programming when the control module is a legacy control module and/or has a reduced function set relative to a function set of a later version of the control module. The process can continue to step 1824, where the radio adapter 165 implements the irrigation programming when the control module 160 is a legacy control module. In some instances, the implementation by the radio adapter of the irrigation programming can comprise communicating an irrigation instruction, such as instructing the legacy control module 160 to activate at least one of the one or more valve drivers in accordance with the irrigation programming. Accordingly, in some implementations, the control module 160 can effectively be a slave to the radio adapter.

Figure 19:
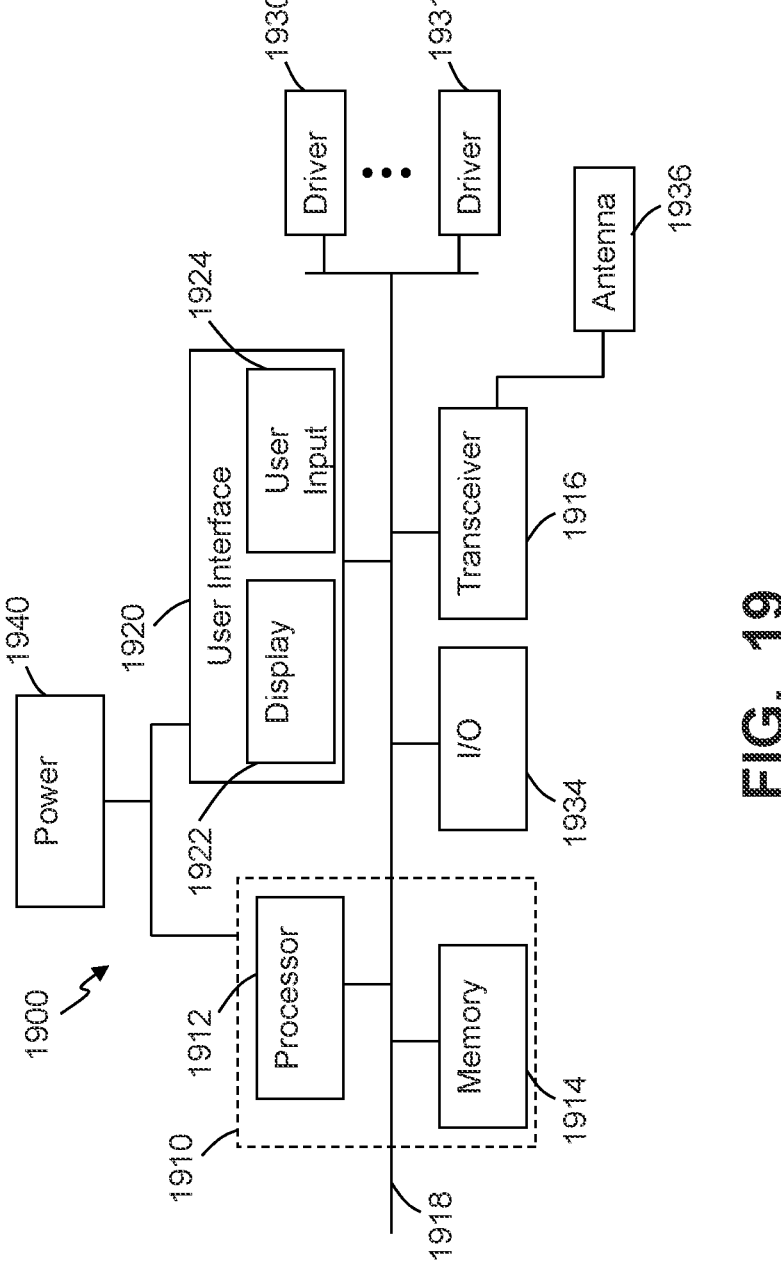
FIG. 19 illustrates a block diagram of a system for use in implementing methods, techniques, devices, apparatuses, systems, servers, sources and the like in providing irrigation control and/or implementing irrigation in accordance with some embodiments.

The methods, techniques, systems, devices, services, servers, sources and the like described herein may be utilized, implemented and/or run on many different types of devices and/or systems. Referring to FIG. 19, there is illustrated a simplified block diagram of a system 1900 that may be used for any such implementations, in accordance with some embodiments. One or more components of the system 1900 may be used for implementing any system, apparatus or device mentioned above or below, or parts of such systems, apparatuses or devices, such as for example any of the above or below mentioned central irrigation controller 110, field transmitter 125, MRM 130, RR 135, control module 160, radio adapter 165, and the like. However, the use of the system 1900 or any portion thereof is certainly not required.

By way of example, the system 1900 may comprise one or more controller or processor modules 1910 that includes one or more processors 1912 and memory 1914, receivers, transmitters or transceivers 1916 (which may be connected to an antenna 1936 or other such structure), power source 1940, and links, paths, interconnections, buses or the like 1918. Some embodiments may further include a user interface 1920 and/or input/output (I/O) interfaces 1934, ports, connections, drivers and the like. Additionally, some embodiments can include one or more drivers 1930-1931, such as one or more valve drivers to activate an irrigation valve to open or close. A power source or supply 1940 is included or coupled with the system 1900, such as a battery power source and/or coupling to an external power source. As described above, some components, devices or systems operate partially or fully from one or more batteries (e.g., an RR 135, a control module 160 and/or a radio adapter 165 can be implemented to be powered partially or solely by battery power), while other components may operate on AC power coupling, for example, to an electrical power grid, or a combination thereof. The controller 1910 and/or processors 1912 can be implemented through one or more processors, microprocessors, central processing unit, logic, local digital storage, firmware and/or other control hardware and/or software, and may be used to execute or assist in executing the steps of the methods and techniques described herein, and control and/or implement various communications, programs, irrigation scheduling, listings, interfaces, etc. The user interface 1920 can allow a user to interact with the system 1900 and/or receive information through the system. In some instances, the user interface 1920 includes a display 1922 and/or one or more user inputs 1924, such as buttons, dials, keys, keyboard, mouse, track ball, game controller, touch screen, etc., which can be part of or wired or wirelessly coupled with the system 1900.

Typically, the system 1900 further includes one or more communication interfaces, ports, transceivers 1916 and the like allowing the system 1900 to wired and/or wirelessly communication with other components or devices of the irrigation system 100 or external to the irrigation system 100. Further the transceiver 1916 can be configured for wired, wireless, optical, fiber optical cable or other such communication configurations or combinations of such communications. Some embodiments additionally or alternatively include I/O interfaces 1934 allowing the device to communicate with other devices.

The system 1900 comprises an example of a control and/or processor-based system with the controller 1910. Again, the controller 1910 can be implemented through one or more processors, controllers, central processing units, logic, software and the like. Further, in some implementations the controller 1910 may provide multiprocessor functionality.

The memory 1914, which can be accessed by the processor 1912, typically includes one or more processor readable and/or computer readable media accessed by at least the processor 1912, and can include volatile and/or nonvolatile media, such as RAM, ROM, EEPROM, flash memory and/or other memory technology. Further, the memory 1914 is shown as internal to the controller 1910 and internal to the system 1900; however, the memory 1914 can be internal, external or a combination of internal and external to the controller 1910 or the system 1900. Similarly, some or all of the memory 1914 may be internal to the one or more processors 1912 implementing the controller 1910. The external memory can be substantially any relevant memory such as, but not limited to, one or more of flash memory secure digital (SD) card, universal serial bus (USB) stick or drive, other memory cards, hard drive and other such memory or combinations of such memory. The memory 1914 can store code, software, executables, scripts, data, irrigation programming, MRM network information, RR network information, signal strength information, identifiers, network information, communication addresses, protocols, sensor information, sensor sharing information, control parameters, routing information, backup information, other relevant irrigation information, weather information, ET data, log or history data, user information, and the like. In some embodiments, the memory 1914 of the controller 1910 and/or other memory accessible by the processors 1912 stores executable program code or instructions. The one or more processors 1912 are configured to execute at least some of the executable program code or instructions stored in the memory to implement one or more functions or features such as described herein.

Figures 20, 21:
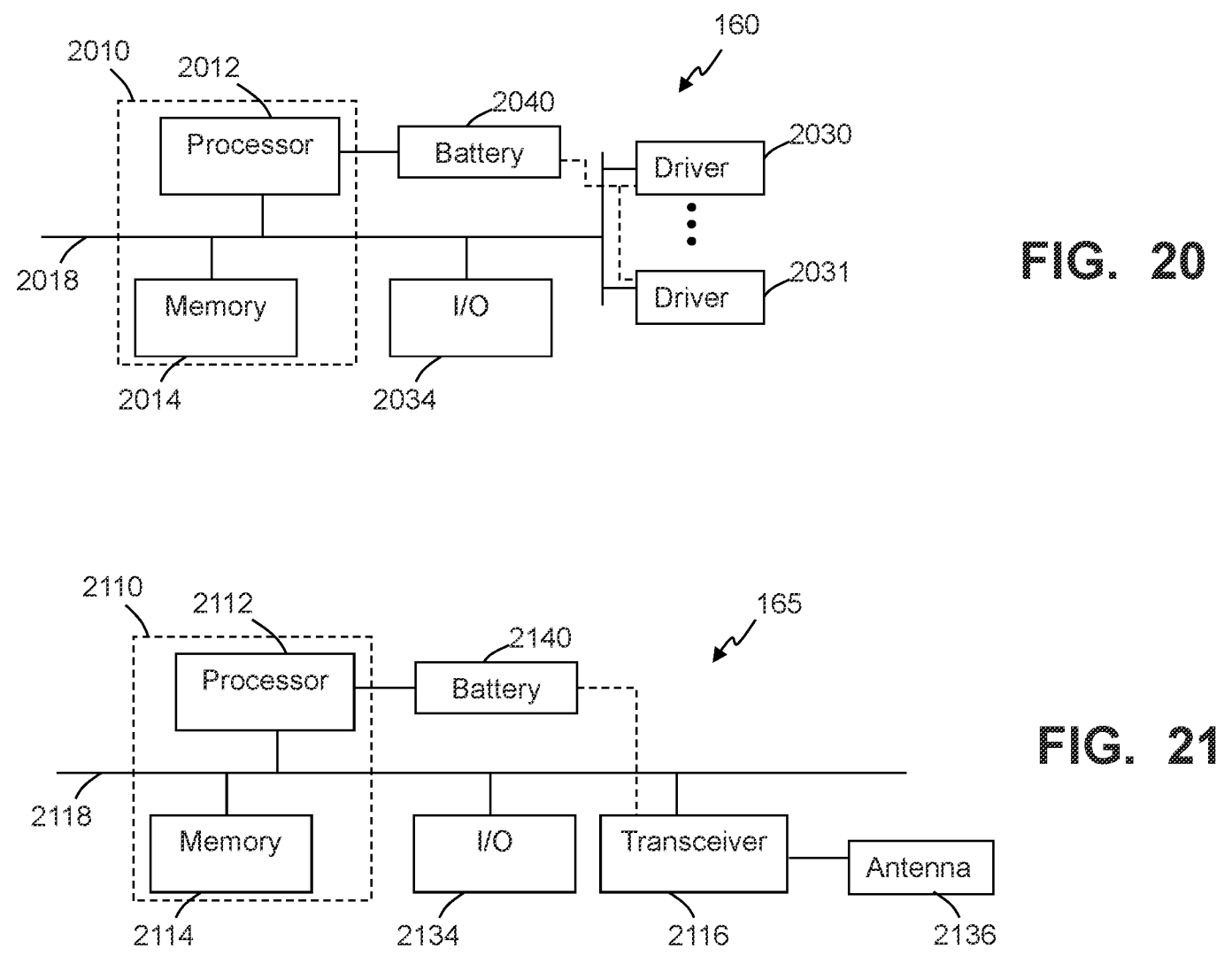

FIG. 20 depicts a simplified block diagram of a control module 160 in accordance with some embodiments. In this embodiment, the control module 160 includes a controller 2010 that includes one or more processors 2012 and memory 2014, one or more I/O interfaces 2034, one or more valve drivers 2030-2031, links, paths, interconnections, buses or the like 2018, and a battery power source 2040. The controller 2010, processors 2012, memory 2014, I/O interfaces 2034, valve drivers 2030-2031, and interconnections 2018 can be similar to those described above with reference to FIG. 19 or other such devices as described above and below. The I/O interface 2034 is configured to allow communication with at least a radio adapter 165 and/or the field transmitter 125. For example, in some embodiments, the I/O interface comprises an optical communication interface (e.g., Infrared). In some embodiments, the battery power source 2040 provides the sole source of power for the control module 160.

FIG. 21 depicts a simplified block diagram of a radio adapter 165 in accordance with some embodiments. In this embodiment, the radio adapter 165 includes a controller 2110 that includes one or more processors 2112 and memory 2114, one or more I/O interfaces 2134, one or more wireless transceivers 2116 (e.g., radio frequency transceiver), an antenna 2136, links, paths, interconnections, buses or the like 2118, and a battery power source 2140. The controller 2110, processors 2112, memory 2114, I/O interfaces 2134, transceivers 2116, antenna 2136, and interconnections 2118 can be similar to those described above with reference to FIG. 19 or other such devices as described above and below. The I/O interface 2134 is configured to allow communication with at least a control module 160. For example, in some embodiments, the I/O interface comprises an optical communication interface (e.g., Infrared). In some embodiments, the battery power source 2140 provides the sole source of power for the radio adapter 165.

FIG. 22 depicts a simplified block diagram of an MRM 130 in accordance with some embodiments. In this embodiment, the MRM 130 includes a controller 2210 that includes one or more processors 2212 and memory 2214, one or more I/O interfaces 2234, one or more wireless transceivers 2216 (e.g., radio frequency transceiver), an antenna 2236, and links, paths, interconnections, buses or the like 2218. The controller 2210, processors 2212, memory 2214, I/O interfaces 2234, transceivers 2216, antenna 2236, and interconnections 2218 can be similar to those described above with reference to FIG. 19 or other such devices as described above and below. The I/O interface 2234, in some embodiments, is configured to allow the MRM to communicate with an NCC 930, a control panel 912 of a satellite irrigation controller 120, or other devices. The transceiver 2216 allows the MRM to wirelessly communicate with at least RRs 135, field transmitters 125, and/or radio adapters 165. Although not shown in FIG. 22, the MRM 130 may include a power source. In some implementations, the power source is power supplied to the MRM through a transformer 934 within a satellite irrigation controller 120 (e.g., through a backplane of the satellite irrigation controller). Alternatively or additionally, a battery or other power source may be included or coupled with the MRM as the power source or an alternate power source.

FIG. 23 depicts a simplified block diagram of an RR 135 in accordance with some embodiments. In this embodiment, the RR 135 includes a controller 2310 that includes one or more processors 2312 and memory 2314, one or more wireless transceivers 2316 (e.g., radio frequency transceiver), an antenna 2336, links, paths, interconnections, buses or the like 2318, and a battery power source 2340. The controller 2310, processors 2312, memory 2314, transceivers 2316, antenna 2336, and interconnections 2318 can be similar to those described above with reference to FIG. 19 or other such devices as described above and below. The transceiver 2316 allows the RR 135 to wirelessly communicate with at least MRMs 130, field transmitters 125, and/or radio adapters 165. In some embodiments, the battery power source 2340 provides the sole source of power for the RR 135. In other embodiments, an external power source may alternatively or additionally be provided (e.g., from a light pole, solar panel, or other such sources).

Figure 24:
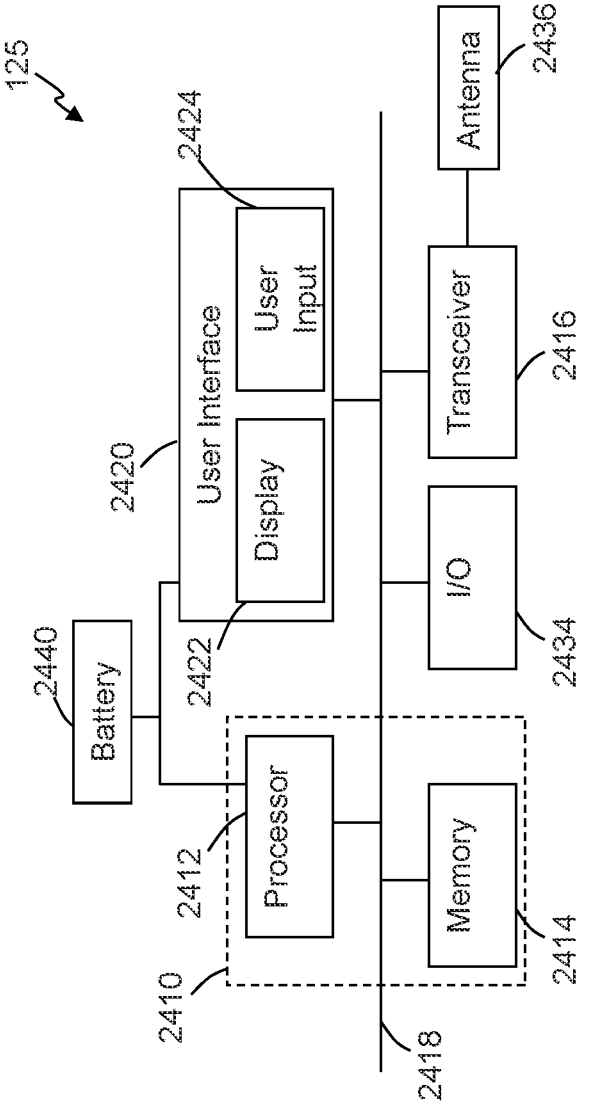
FIG. 24 depicts a simplified block diagram of a field transmitter in accordance with some embodiments.

FIG. 24 depicts a simplified block diagram of a field transmitter 125 in accordance with some embodiments. In this embodiment, the field transmitter 125 includes a controller 2410 that includes one or more processors 2412 and memory 2414, one or more I/O interfaces 2434, a user interface 2420 that can include a display 2422 and/or one or more user inputs 2424, one or more wireless transceivers 2416 (e.g., radio frequency transceiver), an antenna 2436, links, paths, interconnections, buses or the like 2418, and a battery power source 2440. The controller 2410, processors 2412, memory 2414, I/O interfaces 2434, user interface 2420, display 2422, user inputs 2424, transceivers 2416, antenna 2436, interconnections 2418, and a battery power source 2440 can be similar to those described above with reference to FIG. 19 or other such devices as described above and below. The I/O interface 2434 is configured to allow communication with a control module 160 or other devices. For example, in some embodiments, the I/O interface comprises an optical communication interface (e.g., Infrared). The transceiver 2416 allows the field transmitter 125 to wirelessly communicate with MRMs 130, RR 135, and/or radio adapters 165. In some embodiments, the battery power source 2440 provides the sole source of power for the field transmitter 125.

As described above, some embodiments additionally provide secure or private communications. Security software and/or a security chip can be included in a field transmitter 125, MRM 130, RR 135, control modules 160, and/or radio adapter 165 to provide a challenge and/or authenticate security protection to radio and/or optical communications between components of the irrigation system 100. As such, the security provided can ensure that devices are authorized to communicate with each other. For example, the authentication can be similar to the authentication performed between a controller and a module as described in U.S. Pat. No. 7,460,079, entitled MODULAR AND EXPANDABLE IRRIGATION CONTROLLER, and U.S. application Ser. No. 12/638,932, filed Dec. 15, 2009 by Nickerson et al., entitled MODULAR AND EXPANDABLE IRRIGATION CONTROLLER, both of which are incorporated herein by reference in their entirety.

Figure 25:
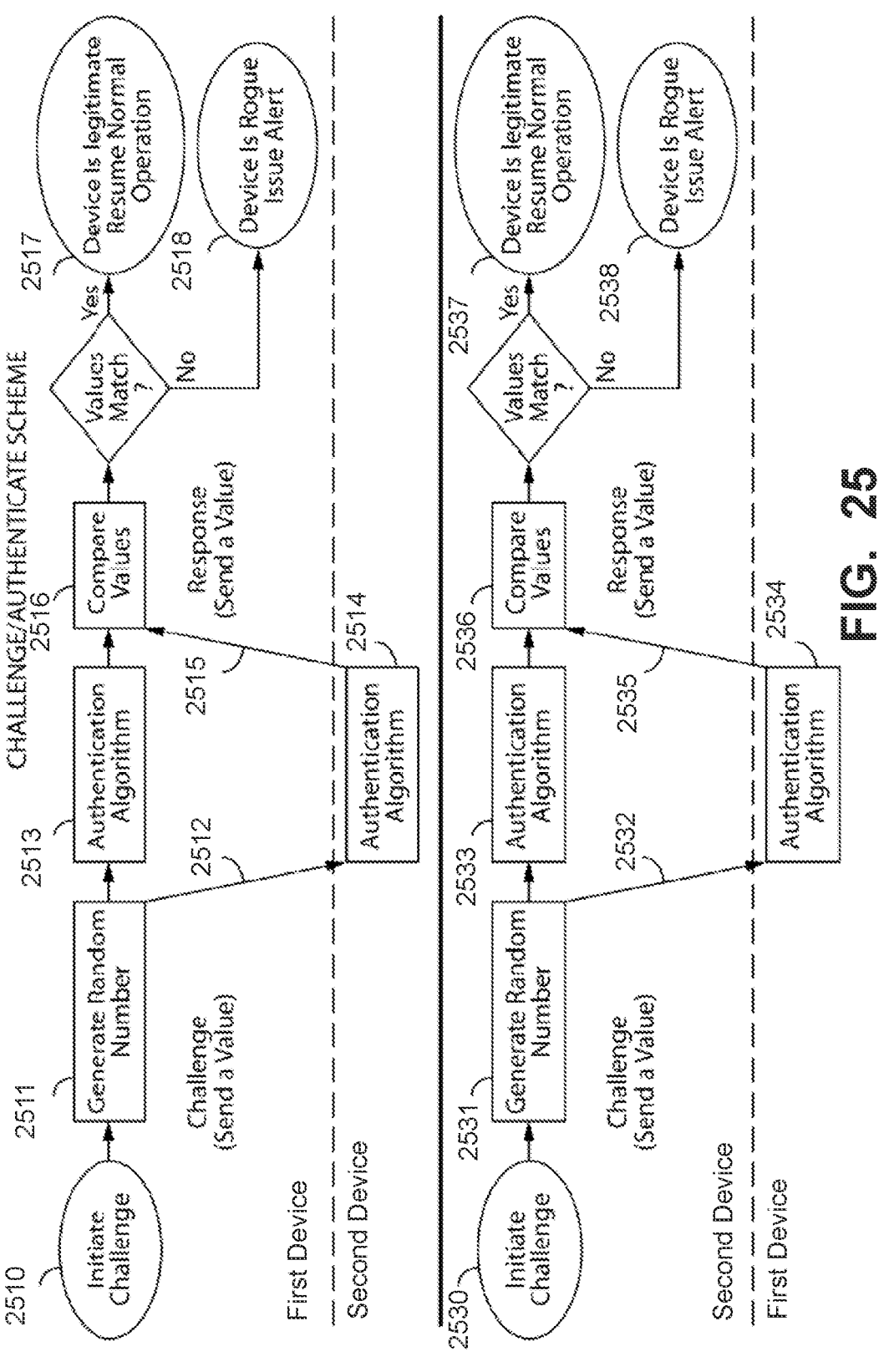
FIG. 25 is an illustration of the challenge/authenticate model in accordance with some embodiments.

In some embodiments, two communicating devices (e.g., the central irrigation controller 110 and a satellite irrigation controller 120; a satellite irrigation controller 120 and an MRM 130; an MRM 130 and an RR 135; an MRM and a radio adapter 165; an RR 135 and a radio adapter 165; a field transmitter 125 and a radio adapter 165; a field transmitter 125 and a control module 160; a control module 160 and a radio adapter 165; or the like) both contain a challenge/authenticate mechanism. This allows for a "mutual authentication" scheme, which typically can be initiated by either of the devices. As shown in FIG. 25, in one form a first device (e.g., an RR 135) initiates the authentication procedure (Step 2510) with the first device generating a random number (Step 2511), passing this random number to the second device (e.g., a radio adapter 165) as a challenge (Step 2512, which can be generically expressed as transmitting an authentication request to the second device), and also processing this random number (Step 2513) through a secret authentication algorithm contained inside the first device. The second device receives this random number and also processes this same random number (Step 2514) through an identical secret authentication algorithm (e.g., contained inside a microcontroller of the second device, a separate security chip, or the like). The second device sends the result (Step 2515) from the secret authentication algorithm as a reply to the first device.

Based on the response from the second device, the first device determines whether the second device is an authorized device with which communications can be exchanged. For example, the first device can compare the result it computed internally with the result provided by the second device (Step 2516). When the results match, then this indicates to the first device that the second device does indeed know the secret authentication algorithm and therefore is a valid and authorized device (Step 2517). The first device can then continue to interact and communicate with that the second device. When the result does not match, the second device is not authorized to operate with the first device. In some instances, when a non-authorized device is detected a rogue alert may be issue (Step 2518), for example to the central irrigation controller 110. The alert may be issued to one or more other devices and/or displayed.

Additionally or alternatively, the second device (e.g., the radio adapter 165) may attempt to receive assurances that it is communicating with an authenticated first device (e.g., an RR 135). In this embodiment, the second device may issue a challenge to the first device (Step 2530), as shown in FIG. 28. The second device, for example, can generate a random number (Step 2531), pass this random number to the first device as a challenge (Step 2532, which can be generically expressed as transmitting an authentication request to the first device), and also process this random number (Step 2533) through a secret authentication algorithm contained inside the second device. The first device receives this random number and also processes this same random number (Step 2534) through an identical secret authentication algorithm contained inside the first device. The first device can then send the result from the secret authentication algorithm as a reply to the second device (Step 2535). Based on the response from the first device, the second device can determine whether the first device is an authorized device. For example, the second device can compare the result it computed internally with the result provided by the first device (Step 2536). When the results match, then this indicates to the second device that the first device does indeed know the secret authentication algorithm and therefore is a valid device with which communication is authorized (Step 2537). The second device can then continue to interact and communicate with the first device. When there is no match, then the first device is identified as not authorized and the second device may issue a rogue alert (Step 2538). It is noted that either the first device or the second device may initiate the authentication. Similarly, both devices may not perform an authentication. In some implementations, the communications between devices are maintained as confident (e.g., steps 2512, 2515, 2532, 2535), for example, by encrypting the data communicated.

Additionally or alternatively, some embodiments perform other authentication. For example, a second device (e.g., a radio adapter 164) may contain a predetermined textual message, e.g., a textual message that is copyright protected. This textual message may be transmitted by the second device to a first device (e.g., a control module 160). The first device expects to receive a valid textual message (e.g., the copyright message) from other authenticated devices. When the first device does not receive such a message, the first device treats that second device as a rogue device and may ignore that second device. Further, the first device may issue an alert. Again, communications may be protected, for example, through encryption.

One or more of the embodiments, methods, processes, approaches, and/or techniques described above or below may be implemented in one or more computer programs executable by a processor-based system. By way of example, such a processor based system may comprise the processor based system 1900, a computer, a satellite irrigation controller, a control module, a radio adapter, an MRM, an RR, a central irrigation controller, etc. Such a computer program may be used for executing various steps and/or features of the above or below described methods, processes and/or techniques. That is, the computer program may be adapted to cause or configure a processor-based system to execute and achieve the functions described above or below. For example, such computer programs may be used for implementing any embodiment of the above or below described steps, processes or techniques for allowing irrigation and/or controlling irrigation. As another example, such computer programs may be used for implementing any type of tool or similar utility that uses any one or more of the above or below described embodiments, methods, processes, approaches, and/or techniques. In some embodiments, program code modules, loops, subroutines, etc., within the computer program may be used for executing various steps and/or features of the above or below described methods, processes and/or techniques. In some embodiments, the computer program may be stored or embodied on a computer readable storage or recording medium or media, such as any of the computer readable storage or recording medium or media described herein.

Accordingly, some embodiments provide a processor or computer program product comprising a medium configured to embody a computer program for input to a processor or computer and a computer program embodied in the medium configured to cause the processor or computer to perform or execute steps comprising any one or more of the steps involved in any one or more of the embodiments, methods, processes, approaches, and/or techniques described herein.

Many of the functional units described in this specification have been labeled as devices, systems or modules, in order to more particularly emphasize their implementation independence. For example, a system, device or module may be implemented as a hardware circuit comprising custom VLSI circuits or gate arrays, off-the-shelf semiconductors such as logic chips, transistors, or other discrete components. A system, device or module may also be implemented in programmable hardware devices such as field programmable gate arrays, programmable array logic, programmable logic devices or the like.

Systems, devices or modules may also be implemented in software for execution by various types of processors. An identified system, device or module of executable code may, for instance, comprise one or more physical or logical blocks of computer instructions that may, for instance, be organized as an object, procedure, or function. Nevertheless, the executables of an identified system, device or module need not be physically located together, but may comprise disparate instructions stored in different locations which, when joined logically together, comprise the system, device or module and achieve the stated purpose for the system, device or module.

Indeed, a system, device or module of executable code could be a single instruction, or many instructions, and may even be distributed over several different code segments, among different programs, and across several memory devices. Similarly, operational data may be identified and illustrated herein within systems, devices or modules, and may be embodied in any suitable form and organized within any suitable type of data structure. The operational data may be collected as a single data set, or may be distributed over different locations including over different storage devices, and may exist, at least partially, merely as electronic signals on a system or network.

Some embodiments provide irrigation systems that comprise: a central irrigation controller; a master radio module (MRM) in communication with the central irrigation controller; a control module; and a radio adapter that is physically cooperated with the control module. The a control module can comprise: a processor, a communication interface, and one or more valve drivers coupled with the processor, where the control module is positioned separate from the central irrigation controller and the MRM, and is further positioned below ground level, where the control module is configured to implement local irrigation programming such that the one or more valve drivers are each configured to control a different irrigation valve in accordance with the irrigation programming. The radio adapter can comprise: a communication interface communicationally coupled with the communication interface of the control module providing direct communication between the radio adapter and the control module, and a wireless radio frequency transceiver configured to provide wireless communication with the MRM where the radio adapter is configured to relay information between the MRM and the control module.

Some embodiments provide irrigation systems that comprise: a central irrigation controller; a radio module in communication with the central irrigation controller; a control module comprising: a processor, a communication interface, and one or more valve drivers coupled with the processor, where the control module is positioned separate from the central irrigation controller and the radio module, where the control module is configured to implement irrigation commands of an irrigation programming such that the one or more valve drivers are each configured to control a different irrigation valve in accordance with the irrigation programming; and a radio adapter in communication with the control module, the radio adapter comprising: a communication interface communicationally coupled with the communication interface of the control module providing direct communication between the radio adapter and the control module, and a wireless radio frequency transceiver configured to provide wireless communication with the radio module where the radio adapter is configured to relay information between the radio module and the control module. Further, in some instances, the control module further comprises a control module battery, where the control module battery provides the only power to the control module.

The radio adapter can further comprise a radio adapter battery, where the radio adapter battery provides the only power to the radio adapter. In some embodiments, the system further comprises a radio relay (RR) configured to wirelessly communicate with the radio module and the radio adapter such that the RR relays communications between the radio module and the radio adapter. Additionally, some embodiments include a satellite irrigation controller, where the radio module is coupled with the satellite irrigation controller and the satellite irrigation controller is communicationally coupled with the central irrigation controller. The satellite irrigation controller can further comprise station outputs configured to activate irrigation valves in accordance with irrigation programming implemented by the satellite irrigation controller. Further, the central irrigation controller can comprise irrigation central software executed by the central irrigation controller in coordinating irrigation over the system. In some embodiments, the control module is further positioned below ground level. The control module may be configured to receive and locally implement the irrigation programming that specifies the irrigation commands. In some embodiments, the control module may be configured to receive the irrigation commands communicated from the radio adaptor. The radio adaptor can be configured to wirelessly receive the irrigation commands and communicate the irrigation commands to the control module. In some implementations, the radio adapter can be physically cooperated with the control module.

Other embodiments provide methods of controlling irrigation. Some of these methods comprise: wirelessly receiving, at a radio module, sensor information obtained by a remote first control module directly coupled with a first sensor, where the first control module comprises one or more valve drivers, and the first control module being configured to control, as dictated by irrigation programming, the one or more valve drivers to each control a different irrigation valve in accordance with the irrigation programming; identifying, at the radio module, one or more other control modules that are associated with the first sensor, where the one or more other control modules are not directly coupled with the first sensor; and wirelessly communicating, from the radio module, control information based on the sensor information to each of the one or more other control modules such that each of the one or more other control modules implements adjusted irrigation programming in accordance with the control information. Some embodiments further comprise communicating, from the radio module, the sensor information to a central irrigation controller. The wirelessly communicating the control information can comprises wirelessly communicating the control information from the radio module to separate radio adapters directly cooperated with and communicationally coupled with at least one of the one or more other control modules, such that each of the radio adapters forwards the control information to the respective one of the one or more other control modules.

In some implementations, the method can further comprise wirelessly communicating, from the radio module, control information based on the sensor information to each of one or more radio adapters, where each of the one or more radio adapters is directly cooperated with and communicationally coupled with a corresponding one of still other control modules, where each of the one or more radio adapters is configured to adjust irrigation programming being locally and independently implemented through the radio adapter in accordance with the control information and communicates irrigation control signals to the corresponding one of the still other control modules to implement adjusted irrigation programming. The first control module is configured to implement the irrigation programming can be configured to implement local irrigation programming stored at the first control module. The wirelessly communicating the control information can comprise wirelessly communicating the control information such that each of the one or more other control modules adjusts irrigation programming being locally and independently implemented at each of the one or more other control modules in accordance with the control information.

Some embodiments provide methods of implementing irrigation, comprising: wirelessly transmitting, from a hand-held field transmitter, irrigation programming to a wireless radio relay, where the field transmitter is configured to directly communicate with a control module and to wirelessly communicate with a radio adapter cooperated with the control module comprising a valve driver directly coupled with an irrigation valve; and wirelessly relaying the irrigation programming from the wireless radio relay to the radio adapter where that the control module is configured to activate the irrigation valve according to the irrigation programming. In some instances, the methods can further comprise transmitting, from the radio adapter, the irrigation programming to the control module such that the control module is configured to implement the irrigation programming. Similarly, some methods further comprise: generating, at the radio adapter, an irrigation command based on the irrigation programming; and communicating the irrigation command from the radio adapter to the control module such that the control module activates the irrigation valve in response to the irrigation command.

Further embodiments provide methods of controlling irrigation that comprise: wirelessly communicating, from a radio module, a radio relay (RR) find command directed to potential RRs; identifying, at the radio module, each RR that responds to the RR find command; wirelessly communicating, from the radio module, a radio adapter find command to potential radio adapters within wireless range of the radio module; identifying, at the radio module, each radio adapter that responds to the radio adapter find command; wirelessly transmitting, from the radio module, a command to one or more of the identified RRs to find potential radio adapters that are within range of each RR; and receiving, at the radio module, one or more responses from each of the one or more identified RRs where the one or more responses identify those radio adapters that are within range of the one or more identified RRs. Some methods further comprise: wirelessly transmitting, from the radio module, a command to each of the one or more identified RRs instructing each of the one or more RRs to find potential additional RRs that may be within wireless communication range of each of the one or more identified RRs; and wirelessly receiving, at the radio module, one or more replies from at least one of the one or more identified RRs identifying one or more surrounding additional RRs within range; wherein the wirelessly transmitting, from the radio module, the command to each of the one or more identified RRs to find the potential radio adapters that are within range of each of the one or more identified RRs further comprises causing the command to be wirelessly transmitted to the surrounding one or more additional RRs to find the potential radio adapters that are within range of the surrounding one or more additional RRs.

In some implementations, the method further comprises selecting, at the radio module, one or more of the responding radio adapters to be supported directly by the radio module. Further, some embodiments further comprise resolving, at the radio module, radio adapter conflicts between two or more of the identified RRs when one of the radio adapters is within range of each of the two or more of the identified RRs; and wirelessly transmitting, from the radio module, radio adapter assignments in response to the resolving the radio adapter conflicts to the two or more of the identified RRs. Additionally, some embodiments further include communicating, from the radio module, the results of a radio module network configuration to a central irrigation controller.

Still other embodiments provide methods of controlling irrigation, comprising: wirelessly communicating, from a radio relay (RR), an RR find command requesting a reply from other RRs within wireless range of the wirelessly communicated RR find command; storing, at the RR, an identification of each of the other RRs that responded to the RR find command; wirelessly communicating, from the RR, a radio adapter find request; and storing, at the RR, radio adapter identifier information for each radio adapter that responds to the radio adapter find request. In some instances, the method further comprises wirelessly receiving, at the RR, a command to find potential RRs that may be within wireless communication range of the RR, such that the wirelessly communicating the RR find command is communicated in response to the command to find potential RRs that may be within wireless communication range of the RR. Additionally or alternatively, some embodiments further include receiving, at the RR, a request from a radio module to find potential radio adapters that are within wireless range of the RR, such that the wirelessly transmitting the radio adapter find request is transmitted in response to the request from the radio module to find the potential radio adapters what are within wireless range of the RR.

In some instances, the methods can further comprise wirelessly transmitting, from the RR, a radio adapter list to a radio module with the radio adapter identifier information for each radio adapter that responded to the radio adapter find request. Some embodiments further comprise: receiving, at the RR and from the radio module, radio adapter conflict resolution information; and excluding one or more radio adapters from an RR network associated with the RR based on the radio adapter conflict resolution information.

Additionally, some embodiments further comprise: receiving, at the RR, responses to the radio adapter find request from a plurality of radio adapters; identifying, based on the responses received from each of the plurality of radio adapters, a signal strength corresponding to each of the responses; and excluding one or more of the plurality of radio adapters from an RR network associated with the RR based on the signal strengths. Some implementations further include determining that a first communication path between the RR and a first radio adapter of the plurality of radio adapters is greater than a second communication path between another RR and the first radio adapter; and excluding the first radio adapters from the RR network in response to determining that the first communication path is greater than the second communication path. Still further, some embodiments comprise identifying that a first communication path between the RR and a first radio adapter is longer than a second communication path between another RR and the first radio adapter; and excluding the first radio adapters from an RR network associated with the RR in response to determining that the first communication path is longer than the second communication path.

Some embodiments provide methods of implementing irrigation, comprising: wirelessly transmitting, from a hand-held field transmitter, irrigation programming to a radio module, where the handheld field transmitter is configured to directly communicate with a control module and to wirelessly communicate with a radio adapter cooperated with the control module, wherein the control module comprises a valve driver directly coupled with an irrigation valve; and wirelessly relaying the irrigation programming from the radio module to the radio adapter where that the control module is configured to activate the irrigation valve according to the irrigation programming. Additionally in some implementations, the method can further comprise transmitting, from the radio adapter, the irrigation programming to the control module such that the control module is configured to implement the irrigation programming.

Still other embodiments provide methods of controlling irrigation, comprising: wirelessly broadcasting, from a radio module, an RR find command directed to potential RRs; identifying, at the radio module, each RR that responds to the RR find command; wirelessly broadcasting, from the radio module, a radio adapter find command to potential radio adapters within wireless range of the radio module; identifying, at the radio module, each radio adapter that responds to the radio adapter find command; wirelessly transmitting, from the radio module, a command to one or more identified RRs for each of the one or more identified RRs to find potential radio adapters that are within range of each identified RR; and receiving, at the radio module, one or more responses from each of the one or more identified RRs, where the one or more responses identify those radio adapters that are within range of the one or more identified RRs.

Further, some embodiments provide methods of controlling irrigation, comprising: wirelessly transmitting, from a radio relay (RR), an RR find command requesting a reply from other RRs within wireless range of the wirelessly transmitted RR find command; storing, at the RR, an identification of each of the other RRs that responded to the RR find command; wirelessly transmitting, from the RR, a radio adapter find request; and storing, at the RR, radio adapter identifier information for each radio adapter that responds to the radio adapter find request.

Other embodiments provide irrigation systems, comprising: a control module comprising: a communication interface; a control module processor coupled with control module processor readable memory; and one or more valve drivers coupled with the control module processor, where the one or more valve drivers are each configured to control an irrigation valve in response to instructions from the control module processor; and a radio adapter comprising: a communication interface that is configured to communicate with the communication interface of the control module to enable communication between the radio adapter and the control module; a wireless radio frequency transceiver configured to provide wireless communicate with one or more other devices; and a radio adapter processor coupled with memory storing code; where the radio adapter processor is configured, when implementing the code, to: determine whether the control module communicationally coupled with the radio adapter is an earlier version of the control module with a reduced function set relative to a function set of a later version of the control module; store irrigation programming when the control module is the earlier version; and implement the irrigation programming when the control module is the earlier version, where the implementing the irrigation programming comprises instructing the control module to activate at least one of the one or more valve drivers. In some implementations, the wireless radio frequency transceiver is configured to wirelessly receive the irrigation programming, and/or the radio adapter processor is further configured, when implementing the code, to: determine that the control module is the later version; and transfer the irrigation programming to the control module to be implemented by the control module when the control module is the later version. In some embodiments, the radio adapter processor, when implementing the code, is configured to operate such that the combination of the radio adapter and the earlier version of the control module provides irrigation control capabilities substantially the same as irrigation control capabilities provided by the later version of the control module.

Still other embodiments provide irrigation systems and/or methods, comprising: wirelessly receiving irrigation programming; detecting a communication link with a control module, where the control module comprises one or more valve drivers each configured to control an irrigation valve; determining whether the control module is a legacy control module; transferring, when the control module is not a legacy control module, the irrigation programming to the control module to be implemented by the control module; locally storing the irrigation programming when the control module is a legacy control module; and implementing the irrigation programming when the control module is a legacy control module, where the implementing the irrigation programming comprises instructing the legacy control module to activate at least one of the one or more valve drivers in accordance with the irrigation programming.

While the invention herein disclosed has been described by means of specific embodiments, examples and applications thereof, numerous modifications and variations could be made thereto by those skilled in the art without departing from the scope of the invention set forth in the claims.

The invention claimed is:

1. An irrigation system, the system comprising:
a computer based central irrigation controller configured to allow generation of irrigation schedules and configured to communicate with a wide area computer network;
a radio module in communication with the central irrigation controller via the wide area computer network, and wherein the radio module is configured to communicate using an unlicensed ISM frequency band and spread spectrum modulation with at least one wireless device located within about 3000 feet of the radio module; and a control module located within about 3000 feet from the radio module and comprising:

a housing;

a processor within the housing;

one or more valve drivers within the housing and coupled with the processor, wherein the control module is positioned separate from the central irrigation controller and the radio module, wherein the control module is configured to implement irrigation commands of an irrigation programming such that the one or more valve drivers are each configured to control a different irrigation valve in accordance with the irrigation programming;

a battery within the housing, wherein the battery provides the only power to the control module; and a communication unit within the housing wherein the communication unit is configured to:

communicate using the unlicensed ISM frequency band and the spread spectrum modulation with the radio module;

relay information between the radio module and the control module;

communicate with a handheld control device powered by a rechargeable battery, wherein the handheld control device comprises a touch sensitive display and is configured with different user interface programming options depending on the functionality of the control module;

provide irrigation schedule parameters received from the handheld control device to the processor, wherein the irrigation schedule parameters comprise one or more of a manual water command, an irrigation schedule, a watering program, a rain delay command, and a water budget command; and provide irrigation station status information and schedule information received from the processor to the handheld control device;

wherein the control module is further configured to:

receive, from the handheld control device based on input through a different user interface programming options displayed on the handheld control device, a name assigned to the control module, and the irrigation schedule including watering days, start times and durations; and operate a respective valve driver of the one or more valve drivers based on the received irrigation schedule parameters and the irrigation schedule.

2. The system of claim 1, wherein the communicating with the handheld control device is not via a central irrigation controller and is directly between the communication unit and the handheld control device.

3. The system of claim 1, further comprising:

a radio relay (RR) configured to wirelessly communicate with the radio module and the communication unit such that the RR relays communications between the radio module and the communication unit.

4. The system of claim 1, further comprising:

a satellite irrigation controller, wherein the radio module is coupled with the satellite irrigation controller and configured to relay information to the satellite irrigation controller and wireless communicate at least some of the irrigation commands received from the satellite irrigation controller.

5. The system of claim 1, wherein the communication unit is configured to wirelessly relay sensor information received from a sensor to a different control module enabling the different control module to adjust irrigation based on the sensor information.

6. The system of claim 5, wherein the control module applies a first sensor threshold relative to the sensor information, and the first sensor threshold is different than a second sensor threshold applied by the different control module relative to the sensor information.

7. The system of claim 1, wherein the control module is configured to receive and locally implement the irrigation programming that specifies the irrigation commands.

8. The system of claim 1, wherein the control module is configured to receive, from the handheld control device, other irrigation schedule parameters received at the handheld control device from the central irrigation controller, and implement at least one of the irrigation commands based on the other irrigation schedule parameters.

9. The system of claim 1, wherein the communication unit of the control module is further configured to transmit a battery power level indication to the handheld control device to be displayed on the touch sensitive display of the handheld control device.

10. The system of claim 1, wherein the battery comprises a non-rechargeable battery.

11. The system of claim 1, wherein the battery comprises an alkaline battery.

12. A method of controlling irrigation, the method comprising:

allowing generation of irrigation schedules through a computer based central irrigation controller configured to communicate with a wide area computer network;

communicating, by a radio module in communication with the central irrigation controller via the wide area computer network, using an unlicensed ISM frequency band and spread spectrum modulation with at least one wireless device located within about 3000 feet of the radio module;

communicating by a control module with the radio module using the unlicensed ISM frequency band and the spread spectrum modulation and located within about 3000 feet from the radio module, wherein the control module comprises a housing, a processor within the housing, one or more valve drivers within the housing and coupled with the processor, wherein the control module is positioned separate from the central irrigation controller and the radio module, wherein the control module is configured to implement irrigation commands of an irrigation programming such that the one or more valve drivers are each configured to control a different irrigation valve in accordance with the irrigation programming, a battery within the housing, wherein the battery provides the only power to the control module and a communication unit within the housing;

relaying, by the communication unit, information between the radio module and the control module;

communicating, by the communication unit, with a handheld control device powered by a rechargeable battery, wherein the handheld control device comprises a touch sensitive display and is configured with different user interface programming options depending on the functionality of the control module;

providing, by the communication unit, irrigation schedule parameters received from the handheld control device to the processor, wherein the irrigation schedule parameters comprise one or more of a manual water command, an irrigation schedule, a watering program, a rain delay command, and a water budget command;

providing, by the communication unit, irrigation station status information and schedule information received from the processor to the handheld control device;

receiving, from the handheld control device based on input through the different user interface programming options displayed on the handheld control device, a name assigned to the control module, and the irrigation schedule including watering days, start times and durations; and operating a respective valve driver of the one or more valve drivers based on the received irrigation schedule parameters and the irrigation schedule.

13. The method of claim 12, wherein the communicating with the handheld control device comprises communicating directly between the communication unit and the handheld control device and not communicating through a central irrigation controller.

14. The method of claim 12, further comprising:

wirelessly relaying, through a radio relay (RR), communications between the radio module and the communication unit.

15. The method of claim 12, further comprising:

relaying, through the radio module, information to a satellite irrigation controller; and wirelessly communicating from the radio module at least some of the irrigation commands received from the satellite irrigation controller.

16. The method of claim 12, further comprising:

wirelessly relaying, through the communication unit, sensor information received from a sensor to a different control module and enabling the different control module to adjust irrigation based on the sensor information.

17. The method of claim 16, further comprising:

applying, by the control module, a first sensor threshold relative to the sensor information, wherein the first sensor threshold is different than a second sensor threshold applied by the different control module relative to the sensor information.

18. The method of claim 12, further comprising:

receiving, at the control module, is configured to receive the irrigation programming that specifies the irrigation commands; and locally implementing, by the control module, the irrigation programming.

19. The method of claim 12, further comprising:

receiving, at the control module from the handheld control device, other irrigation schedule parameters received at the handheld control device from the central irrigation controller; and implementing by the control module at least one of the irrigation commands based on the other irrigation schedule parameters.

* * * * *